(12) United States Patent
Beechuk et al.

(10) Patent No.: US 11,983,484 B2
(45) Date of Patent: May 14, 2024

(54) SYSTEMS AND METHODS FOR CREATING CUSTOM ACTIONS

(71) Applicant: salesforce.com, inc., San Francisco, CA (US)

(72) Inventors: Scott D. Beechuk, San Francisco, CA (US); Steven Tamm, San Francisco, CA (US); Orjan N. Kjellberg, Walnut Creek, CA (US); Arvind Krishnan, San Francisco, CA (US); Benjamin Snyder, Royal Oak, MI (US); Luke A. Ball, Berkeley, CA (US); Shannon Hale, San Francisco, CA (US); Khanh Kim P. Nguyen, Berkeley, CA (US); William Gradin, San Francisco, CA (US); Anna Bonner Mieritz, Moss Beach, CA (US); Beril Guvendik Maples, Oakland, CA (US); Gregg Johnson, Orinda, CA (US); Andrew Waite, Novato, CA (US); Evan Michael Moses, San Francisco, CA (US); Weiping Peng, San Jose, CA (US); Scott Peter Perket, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 2 days.

(21) Appl. No.: 17/651,307

(22) Filed: Feb. 16, 2022

(65) Prior Publication Data

US 2022/0245329 A1 Aug. 4, 2022

Related U.S. Application Data

(63) Continuation of application No. 17/249,589, filed on Mar. 5, 2021, now Pat. No. 11,295,067, which is a
(Continued)

(51) Int. Cl.
*G06F 40/143* (2020.01)
*G06F 3/0481* (2022.01)
(Continued)

(52) U.S. Cl.
CPC .......... *G06F 40/143* (2020.01); *G06F 3/0481* (2013.01); *G06F 3/0482* (2013.01);
(Continued)

(58) Field of Classification Search
CPC ...... G06F 40/143; G06F 40/106; G06F 40/14; G06F 3/0481; G06F 3/0482;
(Continued)

(56) References Cited

U.S. PATENT DOCUMENTS 5,577,188 A 11/1996 Zhu
5,608,872 A 3/1997 Schwartz et al.
(Continued)

FOREIGN PATENT DOCUMENTS

EP 2972981 A1 1/2016
JP 2007183849 A 7/2007
(Continued)

OTHER PUBLICATIONS

"Create, change, or delete an OLE object," (2014) [retrieved on Nov. 12, 2014 at http://office.microsoft.com/en-us/powerpoint-help/create-change-or-delete-an-ole-object-HA010199192.aspx], Microsoft, 13 pages.
(Continued)

*Primary Examiner* — Nicholas Augustine
(74) *Attorney, Agent, or Firm* — Weaver Austin Villeneuve & Sampson LLP

(57) ABSTRACT

Disclosed are methods, apparatus, systems, and computer readable storage media for interacting with one or more data objects in an online social network. A user interface includes a publisher with a custom action. The custom action is
(Continued)

defined in accordance with custom action instructions provided by a first entity via an application programming interface (API). Such custom action instructions may declaratively or programmatically define the data object, the interaction to be performed with the data object, and other attributes associated with the custom action. A user may request to interact with the data object via selection of the custom action by a second entity. Information may be submitted through the publisher to interact with the data object to update a database system associated with the data object. A feed item may be presented for inclusion in the information feed based on the update.

20 Claims, 68 Drawing Sheets

Related U.S. Application Data continuation of application No. 15/354,755, filed on Nov. 17, 2016, now Pat. No. 10,970,468, which is a continuation of application No. 13/943,636, filed on Jul. 16, 2013, now Pat. No. 9,529,488.

(60) Provisional application No. 61/852,089, filed on Mar. 15, 2013.

(51) Int. Cl.
| | |
|---|---|
| *G06F 3/0482* | (2013.01) |
| *G06F 3/04842* | (2022.01) |
| *G06F 40/106* | (2020.01) |
| *G06F 40/14* | (2020.01) |
| *G06Q 10/00* | (2023.01) |
| *G06Q 30/01* | (2023.01) |
| *G06Q 50/00* | (2012.01) |
| *H04L 67/00* | (2022.01) |
| *H04L 67/10* | (2022.01) |
| *H04L 67/50* | (2022.01) |
| *H04W 4/21* | (2018.01) |
| *H04W 4/60* | (2018.01) |
| *G06F 3/048* | (2013.01) |

(52) U.S. Cl.
CPC ........ *G06F 3/04842* (2013.01); *G06F 40/106* (2020.01); *G06F 40/14* (2020.01); *G06Q 10/00* (2013.01); *G06Q 30/01* (2013.01); *G06Q 50/01* (2013.01); *H04L 67/00* (2013.01); *H04L 67/10* (2013.01); *H04L 67/535* (2022.05); *H04W 4/21* (2018.02); *H04W 4/60* (2018.02)

(58) Field of Classification Search
CPC ....... G06F 3/04842; H04W 4/60; H04W 4/21; H04L 67/535; H04L 67/00; H04L 67/10; G06Q 10/00; G06Q 30/01; G06Q 50/01
See application file for complete search history.

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,269,369 B1 | 7/2001 | Robertson | |
| 6,288,717 B1 | 9/2001 | Dunkle | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 7,062,502 B1 | 6/2006 | Kesler | |
| 7,069,231 B1 | 6/2006 | Cinarkaya et al. | |
| 7,069,497 B1 | 6/2006 | Desai | |
| 7,100,111 B2 | 8/2006 | McElfresh et al. | |
| 7,159,184 B2 * | 1/2007 | Ullah | G06F 9/5027 |
| | | | 717/121 |
| 7,181,758 B1 | 2/2007 | Chan | |
| 7,269,590 B2 | 9/2007 | Hull et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,356,770 B1 * | 4/2008 | Jackson | G06F 9/5072 |
| | | | 715/969 |
| 7,373,599 B2 | 5/2008 | McELFRESH et al. | |
| 7,401,094 B1 | 7/2008 | Kesler | |
| 7,406,501 B2 | 7/2008 | Szeto et al. | |
| 7,406,522 B2 * | 7/2008 | Riddle | H04L 47/70 |
| | | | 709/224 |

(56) References Cited

U.S. PATENT DOCUMENTS

| | | | |
|---|---|---|---|
| 7,412,455 B2 | 8/2008 | Dillon | |
| 7,454,509 B2 | 11/2008 | Boulter et al. | |
| 7,508,789 B2 | 3/2009 | Chan | |
| 7,599,283 B1* | 10/2009 | Varier | H04L 41/0896 370/254 |
| 7,599,935 B2 | 10/2009 | La et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,644,122 B2 | 1/2010 | Weyer et al. | |
| 7,668,861 B2 | 2/2010 | Steven | |
| 7,698,160 B2 | 4/2010 | Beaven et al. | |
| 7,730,478 B2 | 6/2010 | Weissman | |
| 7,747,648 B1 | 6/2010 | Kraft et al. | |
| 7,773,530 B2* | 8/2010 | Varier | H04L 45/586 370/503 |
| 7,779,039 B2 | 8/2010 | Weissman et al. | |
| 7,779,475 B2 | 8/2010 | Jakobson et al. | |
| 7,827,208 B2 | 11/2010 | Bosworth et al. | |
| 7,853,881 B1 | 12/2010 | Aly et al. | |
| 7,945,653 B2 | 5/2011 | Zuckerberg et al. | |
| 8,001,010 B2 | 8/2011 | Ho et al. | |
| 8,005,896 B2 | 8/2011 | Cheah | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,069,166 B2 | 11/2011 | Alvarado et al. | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,531 B2 | 1/2012 | Weissman et al. | |
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,364,969 B2 | 1/2013 | King | |
| 8,381,133 B2 | 2/2013 | Iwema et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,549,047 B2 | 10/2013 | Beechuk et al. | |
| 8,560,554 B2 | 10/2013 | Gradin et al. | |
| 8,560,575 B2 | 10/2013 | Gradin et al. | |
| 8,566,301 B2 | 10/2013 | Rueben et al. | |
| 8,646,103 B2 | 2/2014 | Jakobson et al. | |
| 8,713,530 B2 | 4/2014 | Waite et al. | |
| 8,732,150 B2 | 5/2014 | Gradin et al. | |
| 8,892,573 B2 | 11/2014 | Gradin et al. | |
| 8,898,582 B2 | 11/2014 | Law et al. | |
| 8,914,438 B2 | 12/2014 | Pletter et al. | |
| 8,959,483 B2 | 2/2015 | Waite et al. | |
| 8,996,987 B2 | 3/2015 | Rivera et al. | |
| 9,021,435 B2 | 4/2015 | Pletter et al. | |
| 9,063,632 B2 | 6/2015 | Beechuk et al. | |
| 9,177,007 B2 | 11/2015 | Winters et al. | |
| 9,195,648 B2 | 11/2015 | Giraudy et al. | |
| 9,241,017 B2 | 1/2016 | Beechuk et al. | |
| 9,529,488 B2 | 12/2016 | Beechuk et al. | |
| 9,544,307 B2 | 1/2017 | Engelking | |
| 9,823,813 B2 | 11/2017 | Beechuk et al. | |
| 10,147,054 B2 | 12/2018 | Dayon et al. | |
| 10,970,468 B2 | 4/2021 | Beechuk et al. | |
| 11,295,067 B2 | 4/2022 | Beechuk et al. | |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0087611 A1* | 7/2002 | Tanaka | G06F 9/5077 718/1 |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0172357 A1* | 9/2004 | Padgette | G06Q 20/10 705/36 R |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0249911 A1 | 12/2004 | Alkhatib et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0197846 A1 | 9/2005 | Pezaris et al. | |
| 2005/0278647 A1 | 12/2005 | Leavitt et al. | |
| 2006/0173985 A1 | 8/2006 | Moore | |
| 2007/0176898 A1 | 8/2007 | Suh | |
| 2007/0239507 A1 | 10/2007 | Madhogarhia | |
| 2008/0036743 A1 | 2/2008 | Westerman et al. | |
| 2008/0052371 A1 | 2/2008 | Partovi et al. | |
| 2008/0134173 A1* | 6/2008 | Abbondanzio | G06F 9/5077 718/1 |
| 2008/0249972 A1 | 10/2008 | Dillon | |
| 2009/0063415 A1 | 3/2009 | Chatfield et al. | |
| 2009/0069912 A1 | 3/2009 | Stefik | |
| 2009/0100342 A1 | 4/2009 | Jakobson | |
| 2009/0125910 A1* | 5/2009 | Lazarus | G06F 9/5011 715/764 |
| 2009/0125911 A1* | 5/2009 | Lazarus | G06F 9/5011 715/764 |
| 2009/0144741 A1 | 6/2009 | Tsuda et al. | |
| 2009/0177744 A1 | 7/2009 | Marlow et al. | |
| 2009/0254838 A1 | 10/2009 | Rao et al. | |
| 2009/0282121 A1 | 11/2009 | Robertson et al. | |
| 2009/0292786 A1 | 11/2009 | McCabe et al. | |
| 2010/0076937 A1 | 3/2010 | Abdelnur et al. | |
| 2010/0306824 A1 | 12/2010 | Gurney et al. | |
| 2011/0106808 A1 | 5/2011 | Hersans et al. | |
| 2011/0154268 A1 | 6/2011 | Trent, Jr. et al. | |
| 2011/0178866 A1 | 7/2011 | Levine et al. | |
| 2011/0202668 A1 | 8/2011 | Tarrago et al. | |
| 2011/0214086 A1 | 9/2011 | Narayanan et al. | |
| 2011/0218958 A1 | 9/2011 | Warshavsky et al. | |
| 2011/0247051 A1 | 10/2011 | Bulumulla et al. | |
| 2011/0252346 A1 | 10/2011 | Chaudhri | |
| 2011/0270748 A1 | 11/2011 | Graham, III et al. | |
| 2011/0276535 A1 | 11/2011 | Pin et al. | |
| 2011/0276601 A1 | 11/2011 | Pin et al. | |
| 2011/0276875 A1 | 11/2011 | McCabe et al. | |
| 2011/0283181 A1 | 11/2011 | Waite et al. | |
| 2011/0289140 A1 | 11/2011 | Pletter et al. | |
| 2011/0289141 A1 | 11/2011 | Pletter et al. | |

(56) References Cited

U.S. PATENT DOCUMENTS

| | | |
|---|---|---|
| 2011/0289425 A1 | 11/2011 | Pletter et al. |
| 2011/0289476 A1 | 11/2011 | Pletter et al. |
| 2011/0289479 A1 | 11/2011 | Pletter et al. |
| 2011/0314371 A1 | 12/2011 | Peterson et al. |
| 2012/0013540 A1 | 1/2012 | Hogan |
| 2012/0027256 A1 | 2/2012 | Kiyohara et al. |
| 2012/0042218 A1 | 2/2012 | Cinarkaya et al. |
| 2012/0078727 A1 | 3/2012 | Lee |
| 2012/0078953 A1 | 3/2012 | Araya |
| 2012/0084151 A1 | 4/2012 | Kozak et al. |
| 2012/0084348 A1 | 4/2012 | Lee et al. |
| 2012/0084349 A1 | 4/2012 | Lee et al. |
| 2012/0086544 A1 | 4/2012 | Kemp |
| 2012/0089610 A1 | 4/2012 | Agrawal et al. |
| 2012/0096041 A1 | 4/2012 | Rao et al. |
| 2012/0102114 A1 | 4/2012 | Dunn et al. |
| 2012/0102402 A1 | 4/2012 | Kwong |
| 2012/0130973 A1 | 5/2012 | Tamm et al. |
| 2012/0136905 A1 | 5/2012 | Pullara |
| 2012/0209586 A1 | 8/2012 | Mieritz et al. |
| 2012/0210377 A1 | 8/2012 | Wong et al. |
| 2012/0223951 A1 | 9/2012 | Dunn et al. |
| 2012/0226803 A1 | 9/2012 | Bharadwaj |
| 2012/0233137 A1 | 9/2012 | Jakobson et al. |
| 2012/0278725 A1 | 11/2012 | Gordon et al. |
| 2012/0290407 A1 | 11/2012 | Hubbard et al. |
| 2012/0330644 A1 | 12/2012 | Giraudy et al. |
| 2012/0331053 A1 | 12/2012 | Dunn |
| 2013/0007148 A1 | 1/2013 | Olsen |
| 2013/0018960 A1 | 1/2013 | Knysz et al. |
| 2013/0019289 A1 | 1/2013 | Gonser et al. |
| 2013/0024454 A1 | 1/2013 | Dunn |
| 2013/0024788 A1 | 1/2013 | Olsen et al. |
| 2013/0031487 A1 | 1/2013 | Olsen et al. |
| 2013/0054517 A1 | 2/2013 | Beechuk et al. |
| 2013/0067391 A1 | 3/2013 | Pittappilly et al. |
| 2013/0151231 A1 | 6/2013 | Giraudy et al. |
| 2013/0212497 A1 | 8/2013 | Zelenko et al. |
| 2013/0218845 A1 | 8/2013 | Kleppner et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0254397 A1 | 9/2013 | Lai et al. |
| 2013/0318589 A1 | 11/2013 | Ford et al. |
| 2013/0326597 A1 | 12/2013 | Matsushita et al. |
| 2013/0346362 A1 | 12/2013 | Beechuk et al. |
| 2014/0013246 A1 | 1/2014 | Beechuk et al. |
| 2014/0013247 A1 | 1/2014 | Beechuk et al. |
| 2014/0032597 A1 | 1/2014 | Ellis et al. |
| 2014/0032713 A1 | 1/2014 | Phan et al. |
| 2014/0033076 A1 | 1/2014 | Al-Alami et al. |
| 2014/0041038 A1 | 2/2014 | Lessin et al. |
| 2014/0047560 A1 | 2/2014 | Meyer et al. |
| 2014/0075286 A1 | 3/2014 | Harada |
| 2014/0101149 A1 | 4/2014 | Winters et al. |
| 2014/0122592 A1 | 5/2014 | Houston et al. |
| 2014/0122622 A1 | 5/2014 | Castera et al. |
| 2014/0222814 A1 | 8/2014 | Gradin et al. |
| 2014/0250491 A1 | 9/2014 | Fleischman et al. |
| 2014/0280134 A1 | 9/2014 | Horen et al. |
| 2014/0280329 A1 | 9/2014 | Beechuk et al. |
| 2014/0280577 A1 | 9/2014 | Beechuk et al. |
| 2014/0282100 A1 | 9/2014 | Beechuk et al. |
| 2014/0282101 A1 | 9/2014 | Beechuk et al. |
| 2014/0299662 A1 | 10/2014 | Harrison |
| 2014/0304618 A1 | 10/2014 | Carriero et al. |
| 2014/0307863 A1 | 10/2014 | Snyder et al. |
| 2014/0310608 A1 | 10/2014 | Snyder et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0019575 A1 | 1/2015 | Dayon et al. |
| 2015/0020010 A1 | 1/2015 | Hale et al. |
| 2015/0026260 A1* | 1/2015 | Worthley .............. G06F 16/958 709/204 |
| 2015/0032688 A1 | 1/2015 | Dayon et al. |
| 2015/0095162 A1 | 4/2015 | Jakobson et al. |
| 2015/0121299 A1 | 4/2015 | Snyder et al. |
| 2015/0135300 A1 | 5/2015 | Ford |
| 2015/0142596 A1 | 5/2015 | Jakobson et al. |
| 2015/0143248 A1 | 5/2015 | Beechuk et al. |
| 2015/0163206 A1 | 6/2015 | McCarthy et al. |
| 2015/0172321 A1 | 6/2015 | Kirti et al. |
| 2015/0172563 A1 | 6/2015 | Jakobson et al. |
| 2015/0199080 A1 | 7/2015 | Pletter et al. |
| 2015/0312292 A1 | 10/2015 | Zigoris et al. |
| 2016/0026650 A1 | 1/2016 | Winters et al. |
| 2016/0026670 A1 | 1/2016 | Winters et al. |
| 2016/0085787 A1 | 3/2016 | Beechuk et al. |
| 2016/0103591 A1 | 4/2016 | Beechuk et al. |
| 2016/0104067 A1 | 4/2016 | Xu et al. |
| 2016/0127358 A1 | 5/2016 | Engelking |
| 2016/0253360 A1 | 9/2016 | Gradin et al. |
| 2017/0068646 A1 | 3/2017 | Beechuk et al. |
| 2021/0319169 A1 | 10/2021 | Beechuk et al. |

FOREIGN PATENT DOCUMENTS

| | | |
|---|---|---|
| JP | 2016517596 A | 6/2016 |
| WO | WO-2014144796 A1 | 9/2014 |

OTHER PUBLICATIONS

Dale Technologies, LLC., (Copyright 2011) "vMailTM for Salesforce® Users Guide", pp. 9-11 and 17, vMailSalesforceUsersGuide_v2.1 [1].pdf, 29 pp.

European Decision of Refusal dated Jan. 18, 2019 issued in Application No. EP 14765571.6.

European Extended Search Report dated Jul. 13, 2016 issued in Application No. EP 14 76 5571.

European First Office Action dated Dec. 7, 2017 issued in Application No. EP 14 76 5571.6.

Fulton, Scott M. (Aug. 31, 2011) "Live From Dreamforce '11—Benioff Says You Can Now Store Salesforce Data Locally", [Retrieved from the Internet on Nov. 17, 2013 at http://readwrite.com/2011/08/31/ livefrom-dreamforce-11—sale.pdf, 22 pp.

"Google Plus Users", Google+Ripples, Oct. 31, 2011 [retrieved on Feb. 21, 2012 from Internet at http://www.googleplusers.com/google-ripples.html], 3 pages.

Japanese First Office Action dated Feb. 12, 2019 issued in Application No. JP 2017-211841.

Japanese First Office Action dated Nov. 15, 2016 issued in Application No. JP 2016-503070.

Japanese Office Action [Decision to Refuse] dated Jul. 4, 2017 issued in Application No. JP 2016-503070.

Japanese Second Office Action dated Feb. 18, 2020 issued in Application No. JP 2017-211841.

Katsuhiro Ogawa, Special No. 3, Learning know-how from on-site developers, crucial points on Facebook App., Nikkei Sofware, Nikkei Business Publications, Inc., Jan. 24, 2012, 15(3):62-71, ISSN1347-4685 [Japanese, no English translation].

Miei Ogawa, Linkup, The world's easiest guide for creating and managing Facebook page, Gijutsu-Hyohron Co., Ltd., Feb. 1, 2013, pp. 1-143, ISBN978-4-7741-5409-1 [Japanese, no English translation].

Notice of Allowance dated Nov. 17, 2021 in U.S. Appl. No. 17/249,589.

PCT International Preliminary Report on Patentability and Written Opinion dated Sep. 24, 2015 issued in PCT/US2014/029355.

PCT International Search Report and Written Opinion dated Aug. 28, 2014 issued in PCT/US2014/029355.

U.S. Corrected Notice of Allowance dated Mar. 11, 2022, in U.S. Appl. No. 17/249,589.

U.S. Final Office Action dated Oct. 3, 2019 issued in U.S. Appl. No. 15/354,755.

U.S. Final Office Action dated Feb. 24, 2020 issued in U.S. Appl. No. 15/354,755.

(56) References Cited

OTHER PUBLICATIONS

U.S. Final Office Action dated Mar. 21, 2016 issued in U.S. Appl. No. 13/943,640.
U.S. Final Office Action dated Jun. 26, 2014 issued in U.S. Appl. No. 13/943,657.
U.S. Final Office Action dated Jun. 8, 2016 issued in U.S. Appl. No. 14/527,465.
U.S. Final Office Action dated Aug. 11, 2016 issued in U.S. Appl. No. 14/137,202.
U.S. Final Office Action dated Aug. 17, 2020 issued in U.S. Appl. No. 15/354,755.
U.S. Notice of Allowance dated Nov. 27, 2020 issued in U.S. Appl. No. 15/354,755.
U.S. Notice of Allowance dated Dec. 16, 2014 issued in U.S. Appl. No. 13/943,657.
U.S. Notice of Allowance dated Mar. 27, 2015 issued in U.S. Appl. No. 13/943,657.
U.S. Notice of Allowance dated Jun. 30, 2016 issued in U.S. Appl. No. 13/943,636.
U.S. Notice of Allowance dated Aug. 16, 2016 issued in U.S. Appl. No. 13/943,636.
U.S. Notice of Allowance dated Aug. 25, 2017 issued in U.S. Appl. No. 14/537,656.
U.S. Notice of Allowance dated Sep. 14, 2021 issued in U.S. Appl. No. 17/249,589.
U.S. Notice of Allowance dated Sep. 6, 2016 issued in U.S. Appl. No. 14/527,465.
U.S. Office Action dated Nov. 21, 2013 issued in U.S. Appl. No. 13/943,657.
U.S. Office Action dated Feb. 1, 2016 issued in U.S. Appl. No. 14/137,202.
U.S. Office Action dated Feb. 1, 2016 issued in U.S. Appl. No. 14/527,465.
U.S. Office Action dated Feb. 16, 2016 issued in U.S. Appl. No. 13/943,636.
U.S. Office Action dated Feb. 24, 2017 issued in U.S. Appl. No. 14/537,656.
U.S. Office Action dated Mar. 21, 2019 issued in U.S. Appl. No. 15/354,755.
U.S. Office Action dated Mar. 27, 2015 issued in U.S. Appl. No. 13/943,629.
U.S. Office Action dated Aug. 7, 2015 issued in U.S. Appl. No. 13/943,640.
U.S. Appl. No. 14/336,988, Inventors Dayon et al., filed Jul. 21, 2014.
U.S. Appl. No. 14/469,354, Inventors Snyder et al., filed Aug. 26, 2014.
U.S. Appl. No. 15/059,174, Inventors Hausler et al., filed Mar. 2, 2016.
U.S. Appl. No. 15/085,515, Inventors Hausler et al., filed Mar. 30, 2016.
U.S. Appl. No. 15/373,317, Inventors Engelking et al., filed Dec. 8, 2016.

\* cited by examiner

Event History Table 910

| Event ID 911 | Object ID 912 | Created by ID 913 |
|---|---|---|
| E1 | O615 | U5 |
| E2 | O489 | U101 |
| ⋮ | | |

Comment Table 930

| Event ID 931 | Comment 932 | Time/Date 933 |
|---|---|---|
| E37 | " " | 10-21-2010 5:32 PM |
| E37 | " " | 9-17-2010 |
| ⋮ | | |

Field Change Table 920

| Event ID 921 | Old value 922 | New value 923 |
|---|---|---|
| E37 | 300 | 400 |
| E37 | 4.23 | 4.10 |
| ⋮ | | |

Post Table 950

| Event ID 951 | Post Text 952 | Time/Date 953 |
|---|---|---|
| E69 | " " | 10-11-2010 4:12 PM |
| E90 | " " | 8-12-2010 |
| ⋮ | | |

User Subscription Table 940

| User ID 941 | Object ID 942 |
|---|---|
| U819 | O615 |
| U819 | O489 |
| U719 | O615 |

News Feed Table 960

| User ID 961 | Event ID 962 |
|---|---|
| U819 | E37 |
| U819 | E90 |
| U719 | E37 |

*FIGURE 9A*

```
                                                    ┌─1800
    ╭─────────────────────────────────────────────╮
    │ Computer implemented method to interact with│
    │    an application using a publisher in an   │
    │             online social network           │
    ╰─────────────────────────────────────────────╯
                            │
                            ▼                        ┌─1804
    ┌─────────────────────────────────────────────┐
    │ Provide data to generate a user interface   │
    │ including a publisher and an information    │
    │ feed, where the publisher is configured to  │
    │ publish information to the information feed │
    └─────────────────────────────────────────────┘
                            │
                            ▼                        ┌─1808
    ┌─────────────────────────────────────────────┐
    │ Receive a request to expose an application  │
    │             using the publisher             │
    └─────────────────────────────────────────────┘
                            │
                            ▼                        ┌─1812
    ┌─────────────────────────────────────────────┐
    │ Expose content from the application in the  │
    │    publisher via an application programming │
    │                interface (API)              │
    └─────────────────────────────────────────────┘
                            │
                            ▼                        ┌─1816
    ┌─────────────────────────────────────────────┐
    │ Receive a user input regarding the exposed  │
    │     content to interact with the application│
    └─────────────────────────────────────────────┘
                            │
                            ▼                        ┌─1820
    ┌─────────────────────────────────────────────┐
    │ Perform, using the user input, the          │
    │  interaction with the application via the API│
    └─────────────────────────────────────────────┘
                            │
                            ▼                        ┌─1824
    ┌─────────────────────────────────────────────┐
    │ Update the information feed via the API in  │
    │   the user interface according to the       │
    │    performed interaction with the application│
    └─────────────────────────────────────────────┘
```

Home  Chatter  Campaigns  Accounts  Contacts  Opportunities  Contracts  Cases  Solutions  Products  Reports  Documents 3 Corncob Lane
Cowpatch, TN 12345
US
(415) 555-1212
cbroadus15@salesforce.com ★ Title Farmer   Created Date 10/9/2012 4:12 PM

Mr. JimBob Lead — 2816

Interesting guy, but speaks a little funny.

Rating Hot
Lead Status Open
Annual Reven... USD 10,000.00

Create a Task
Create a Case
Convert Lead — 2806
Write Lead Note
View Lead Details FEED FILTERS
All Updates
Text Posts Convert Lead — 2802
Service Agent — 2818a   Account
Opportunity Name                Convert Status   ☐ Do not create new opportunity
                                Qualified
Task Information — 2818b
Subject                         Due Date   11/6/2012
Description Status            Priority
In Progress       Normal All Updates for this Lead — 2804

Service Agent created a task.
Send JimBob a welcome gift.
Assigned to: Service Agent Due Date: 11/15/2012
View Task
Comment · Like · October 10, 2012 at 6:02 PM Service Agent
JimBob is in town next week, let's be sure to schedule a meeting with him.
Comment · Like · October 10, 2012 at 6:02 PM ✓ Following ✖
Show All (1)
Followers

Convert Lead — 2810

Sort by: Post Date ▼

*FIGURE 28*

| Home | Chatter | Campaigns | Leads | Accounts | Contacts | Opportunities | Contracts | Cases | Solutions | Products | Reports | Documents |

Service Agent
salesforce.com

○ Opportunity Name Sample Opportunity 1   Created Date 10/9/2012 4:12 PM

Mr. JimBob Opportunity — 2916
Salesforce.com is interested in our widgets!

2918

Stage Perception An...
Probability (%) 70%
Amount USD 100,000.00
Expected Rev... USD 70,000.00

✓ Following ⊗

Show All (1)
Followers

| Contract Name | salesforce.com | 🔍 |
| Start Date | 11/6/2012 | End Date | 11/6/2012 |

2902

Create Contract

2910 — 2904

- Create a Task
- Log a Call
- Create a Case — 2906
- Create a Service Contract
- Write Opportunity Note
- View Opportunity Details

FEED FILTERS
- All Updates
- Text Posts

All Updates for this Opportunity     Sort by: Post Date ▼

Service Agent
We should keep an eye on this opportunity, things are moving fast!
Comment · Like · October 9, 2012 at 6:00 PM

Service Agent
Be sure to share the new Live Agent integration with this customer, great stuff!
🔗 Customer Website
http://www.verisign.com
Comment · Like · October 9, 2012 at 6:00 PM

Service Agent
Be sure to share the new Live Agent integration with this customer, great stuff!
The file is no longer available.
Comment · Like · October 9, 2012 at 5:59 PM

*FIGURE 29*

Home   Chatter   Campaigns   Leads   Accounts   Contacts   Opportunities   Service Contracts   Contracts   Cases   Solutions   Products   Rep The Landmark @ One Marke..
San Francisco, CA 94105

⊙ Contract Number 00000002   Service Contract Owner Service Agent   Status Expired
service contract ← 3016   Price Book Enterprise
No Description   Total Price USD 200.00

↙ 3006

Product
[BeechukView 2000 [BV2000]]   ← 3002

[Quantity]   ⊕ Follow
[Sales Price]   Followers
   No followers.
← 3004   [Add] ← 3010

← 3018

Add a Product

Write Service Contract Note

View Service Contract Details

FEED FILTERS

[All Updates]

Text Posts

All Updates for this ServiceContract   Sort by: Post Date ▾

👤 Service Agent created a Contract Line Item
   BeechukView 2000
   Comment · Like · Today at 8:58 AM

Global Actions

Introducing Actions!

What are Actions?
Actions let you use Chatter in new ways, such as to create records directly in the feed

How can I create Actions?
Click New Action below to create an action, then use the action layout editor specify its fields and page layout editor to add it to pages Watch a short video and check out the actions implementation guide for detailed info Create, edit and view global actions which can be used on detail page, the Home Page and Chatter page.

Actions — New Action — 4210

| Action | Label | API Name | Description | Target Object | Type | Content Source — 4208 | Icon |
|---|---|---|---|---|---|---|---|
| Edit \| Del \| Layout | Account | New_Account | Create account anywhere | Account | Create a Record | Action Layout Editor | |
| Edit \| Del \| Layout | Case | New_Case | Generic new case form | Case | Create a Record | Action Layout Editor | |
| Edit \| Del \| Layout | Case | Quick_Case | Quick case for the sidebar | Case | Custom Action | Action Layout Editor | |
| Edit \| Del \| Layout | Contact | Contact | Generic contact form | Contact | Create a Record | Action Layout Editor | |
| Edit \| Del \| Layout | Contact | New_Creature | Create new partner contact | Contact | Custom Action | Action Layout Editor | |
| Edit \| Del \| Layout | Contact | Quick_Contact | Quick contact create | Contact | Create a Record | Action Layout Editor | |
| Edit \| Del \| Layout | Creature | New_Creature | Generic creature form | Creature | Create a Record | Action Layout Editor | |
| Edit \| Del | Opportunity | New_Creature | New Opptny and Account | Account | Custom Action | Testing (Visualforce) | |

Expense Report — 5106

5102

Name* — 5104

Policy*  Purpose*
[Select ▼]  [Select ▼]

Amount  Item  Receipt
[$ ]  [ ]  [📎] +

Share something about this Task... — 5108

5112  5110

To my manager 🔒 ⓘ  [Share]

FIGURE 51A

Daniel Cheng created an expense report
Couldn't find the official company policy around this, but here's what I emailed about

| Add topics |
| Bookmark |
| Create a Task... |
| Delete |

Seattle Trip — 5114
Total: $1203.09
Policy: Standard
Purpose: Release Planning
Status: Pending Approval ⊙ Following ▼

Relate To...
Edit

Today at 1:34 PM - Comment

FIGURE 51B

Daniel Cheng created an expense report
Look at the input fields in IE10. No border radius as in other browsers.

Seattle Trip — 5116
Total: $1203.09
Policy: Standard
Purpose: Release Planning — 5118

[Approve] [Reject] [▼]

Today at 1:34 PM - Comment - Like - Share

SYSTEMS AND METHODS FOR CREATING CUSTOM ACTIONS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This patent document relates generally to providing on-demand services in an online social network using a database system and, more specifically, to techniques for interacting with records and applications from a publisher in an online social network.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, and methods for interacting with one or more records in a single user interface in an online social network. These drawings in no way limit any changes in form and detail that may be made by one skilled in the art without departing from the spirit and scope of the disclosed implementations.

FIG. 7 shows an example of a group feed on a group page according to some implementations.

FIG. 8 shows an example of a record feed containing a feed tracked update, post, and comments according to some implementations.

FIG. 9A shows an example of a plurality of tables that may be used in tracking events and creating feeds according to some implementations.

FIG. 18 shows a flowchart of an example of a computer implemented method 1800 for interacting with an application using a publisher in an online social network, performed in accordance with some implementations.

FIG. 24 shows an example of a record with a user interface including a publisher and an information feed, according to some implementations.

FIG. 25 shows an example of the record in FIG. 24 with a user interface displaying a plurality of empty data fields upon selection of a publisher action, according to some implementations.

FIG. 26 shows an example of the record in FIG. 25 with a user interface displaying a plurality of filled data fields upon receiving user input, according to some implementations.

FIG. 28 shows an example of a record with a user interface including a publisher, a custom action, and an information feed, according to some implementations.

FIG. 29 shows an example of a converted record of the record in FIG. 28, with a user interface including a publisher, a custom action, and an information feed, according to some implementations.

FIG. 30 shows an example of a child record of the converted record in FIG. 29, with a user interface including a publisher, a custom action, and an information feed, according to some implementations.

FIG. 32A shows an example of a record with a user interface displaying the information feed for an account page, according to some implementations.

FIG. 32B shows an example of a record with a user interface displaying the record details for the account page in FIG. 32A, according to some implementations.

FIG. 32C shows an example of a record with a user interface displaying the record relationship information for the account page in FIG. 32A, according to some implementations.

FIG. 33B shows an example of a user profile with a news feed including a feed item cross-referenced from the feed item in FIG. 33A with a link to the contacts record, according to some implementations.

FIG. 33C shows an example of another user profile with a news feed including a feed item cross-referenced from the feed item in FIG. 33A with a link to the contacts record, according to some implementations.

FIG. 34 shows an example of a user interface of a database service configured for users to create a custom action, according to some implementations.

FIG. 35 shows an example of a user interface including a publisher configured for users to create a custom action from the publisher, according to some implementations.

FIG. 39 shows an example of a user interface for a page layout editor displaying publisher actions associated with a record, according to some implementations.

FIG. 40 shows an example of a user interface displaying details, page layouts, and predefined field values associated with a custom action, according to some implementations.

FIG. 42 shows an example of a user interface of a database service configured for users to create a global action, according to some implementations.

FIG. 49 shows an example of a user interface including a publisher displaying a plurality of data fields for a publisher action, and validation rules associated with one or more data fields, according to some implementations.

FIG. 51A shows an example of a publisher for filing an expense report, according to some implementations.

FIG. 51B shows an example of a feed item from publisher data provided in FIG. 51A, according to some implementations.

FIG. 51C shows an example of another feed item with approval control to update a status of the expense report in FIG. 51A, according to some implementations.

FIG. 53A shows an example of a record with a customized Visualforce page layout.

FIG. 54 shows an example of a user interface with a publisher exposing data fields for a custom action hosted natively in an on-demand service environment, according to some implementations.

FIG. 56A shows an example of a user interface with a publisher exposing content from an application hosted on a third-party platform, according to some implementations.

FIG. 56B shows an example of a user interface with a feed item displaying data based on a user input regarding content from the application hosted on the third-party platform in FIG. 56A, according to some implementations.

DETAILED DESCRIPTION

Figure 1A:
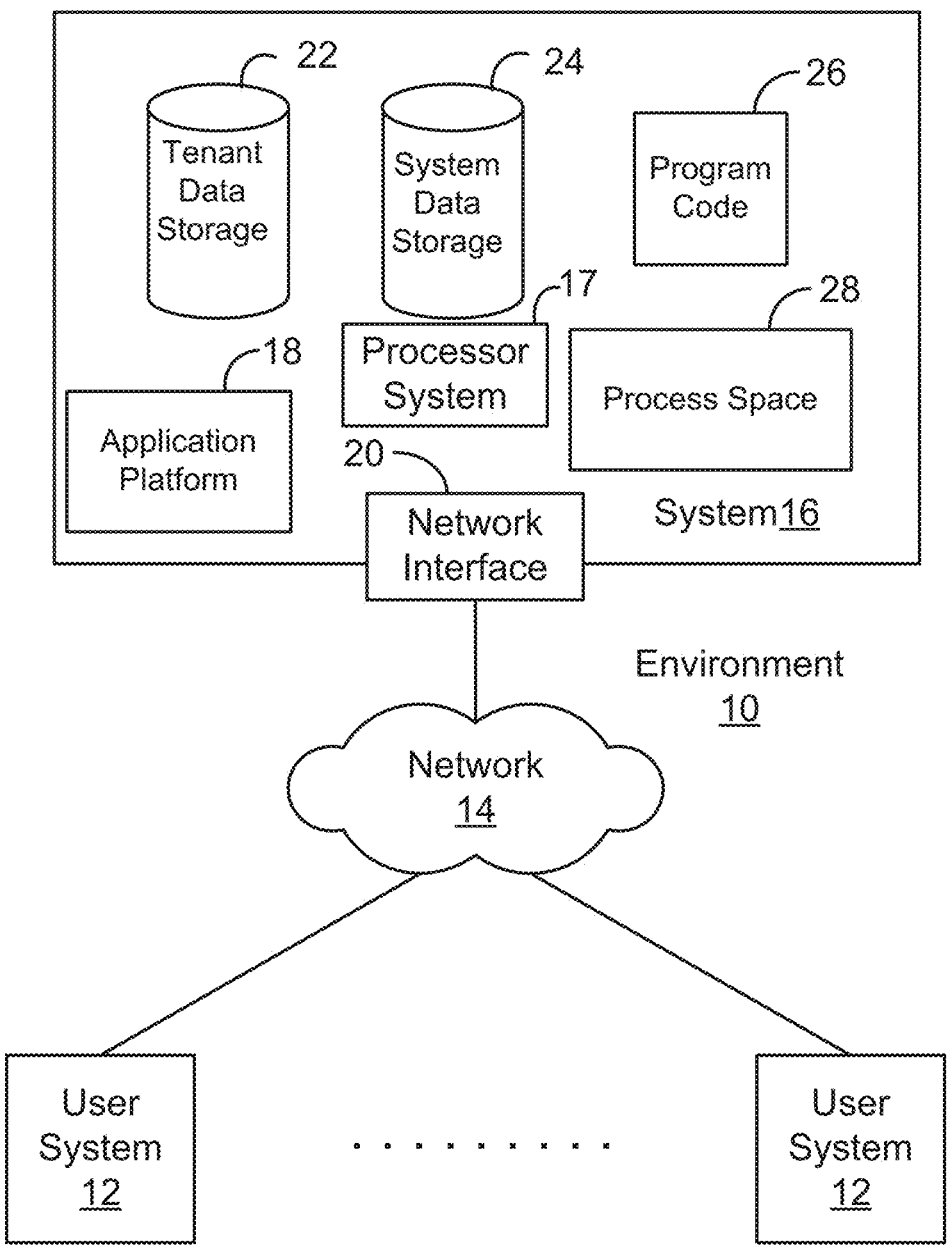
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer-readable storage media for interacting with one or more records in a single user interface in an online social network, also referred to herein as a social networking system. One example of an online social network is Chatter®, provided by salesforce.com, inc. of San Francisco, California Online social networks are increasingly becoming a common way to facilitate communication among people and groups of people, any of whom can be recognized as users of a social networking system. Some online social networks can be implemented in various settings, including organizations, e.g., enterprises such as companies or business partnerships, academic institutions, or groups within such an organization. For instance, Chatter® can be used by employee users in a division of a business organization to share data, communicate, and collaborate with each other for various purposes.

In some online social networks, users can access one or more information feeds, which include information updates presented as items or entries in the feed. Such a feed item can include a single information update or a collection of individual information updates. A feed item can include various types of data including character-based data, audio data, image data and/or video data. An information feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on an information feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and hyperlinks to social network data or other network data such as various documents and/or web pages on the Internet. Posts can include alphanumeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed, also referred to herein as the user's "wall," which is one example of an information feed displayed on the user's profile page.

In some implementations, an information feed may be specific to a group of users of an online social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to an information feed for a particular user, group, object, or other construct within an online social network, an email notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

Some implementations of the disclosed systems, apparatus, methods, and computer readable storage media are configured to interact with records or applications across a single user interface in an online social network. The single user interface provides a unified user interface including a publisher and an information feed. The publisher can include one or more publisher actions configured to interact with a record or application. In some implementations, the record can be a customer relationship management (CRM) object, such as a lead, a case, an account, an opportunity, a task, a contact, a campaign, a contract, an event, a custom object, and a Visualforce page. In some implementations, the application can be an application hosted on a third-party platform.

Some of the publisher actions can be custom actions configured to interact with a data object or application. The custom action may be defined in accordance with custom action instructions declaratively or programmatically. The custom action instructions may define the data object and the interaction to be performed with the data object. The custom action instructions may also define attributes of the custom action, including data fields associated with the data object, validation rules associated with the one or more data fields, the page layout of the custom action in the publisher, and the action layout of the one or more data fields in the publisher. In some instances, the custom action instructions may be defined using a customization tool, such as Visualforce. This allows a user or organization to make customized user interfaces to meet their business needs.

The publisher is configured to publish information to the information feed. In some instances, a feed item is created upon performing an interaction with the record or application, and the feed item may include one or more actionable selections. The one or more actionable selections may provide a reference to the record or application. Selection of one of the actionable selections may cause the publisher to be operable to receive additional information and/or perform additional operations on the record or application. Having such actionable selections in the feed item enables a user to efficiently perform actions on the record or application without having to navigate and switch among different user interfaces. For example, a user can interact with multiple records without leaving a common user interface. This can be useful in efficiently advancing CRM as well as non-CRM lifecycles through the publisher and information feed.

The feed item may be presented for inclusion in an information feed, such as a parent record of the child record being acted upon. However, the feed item can be propagated and cross-referenced for display not only in the record feed of the parent record, but in other related feeds. Identification of such related feeds can occur by, for example, a user defining values in a payload or a system administrator hard-coding the values. Any interactions performed on a cross-referenced feed item are also presented on every other cross-referenced feed item so that a single conversation thread is preserved. This can allow users or organizations to view and interact with the same feed item from multiple page layouts.

Not only can the publisher interact with data objects, the publisher may also be configured to interact with applications. Such applications may be hosted natively in the on-demand service environment or hosted on a third-party platform. Custom actions may be defined to interact with the application via an API. Regardless of whether the application is hosted natively or on a third-party platform, the API can enable integration of the application into the on-demand service environment. Interactions with the application can be updated to an information feed. Such updates may occur without refreshing the user interface.

As more and more users and organizations move toward more collaborative sharing models to communicate and conduct business, there is a desire to better expose, enhance, and utilize information. Conventionally, accessing information and interacting with information in an online social network can involve navigating and switching among several different applications and interfaces. This can be cumbersome, time-consuming, and unproductive.

As noted above, some of the implementations described herein are directed at mechanisms to provide a unified user interface that enables a user to interact with a data object or application in an online social network. Such interactions can include, for example, a request to create the data object, a request to delete the data object, a request to update the data object, a request to convert the data object, a request to download data from the data object, a request to upload data to the data object, a request to attach a file to the data object, a request to view information associated with the data object, and a request to otherwise perform an operation having a reference to the data object. A unified user interface may include an information feed and a publisher with a custom action, where the custom action is configured to perform one of the aforementioned interactions with the data object or application. Such interactions may occur via an API and published to an information feed in the form of a feed item. The feed item may be cross-referenced in other related feeds to provide a single conversation thread, and the feed item may have actionable selections to perform further operations on the data object. As such, the publisher and the feed item become the main interface to interact with and view relevant information without the need to switch among different applications and interfaces.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
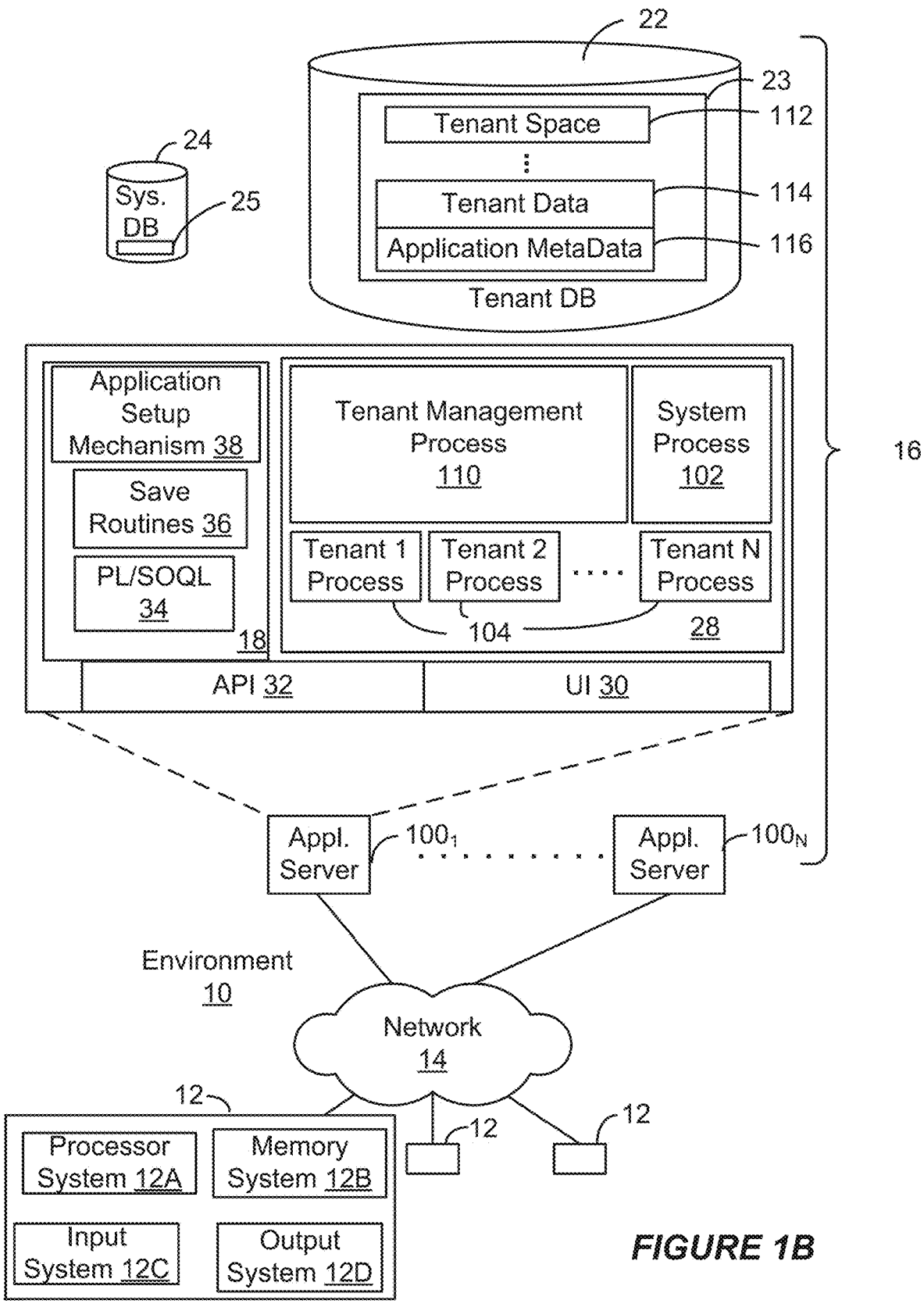
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
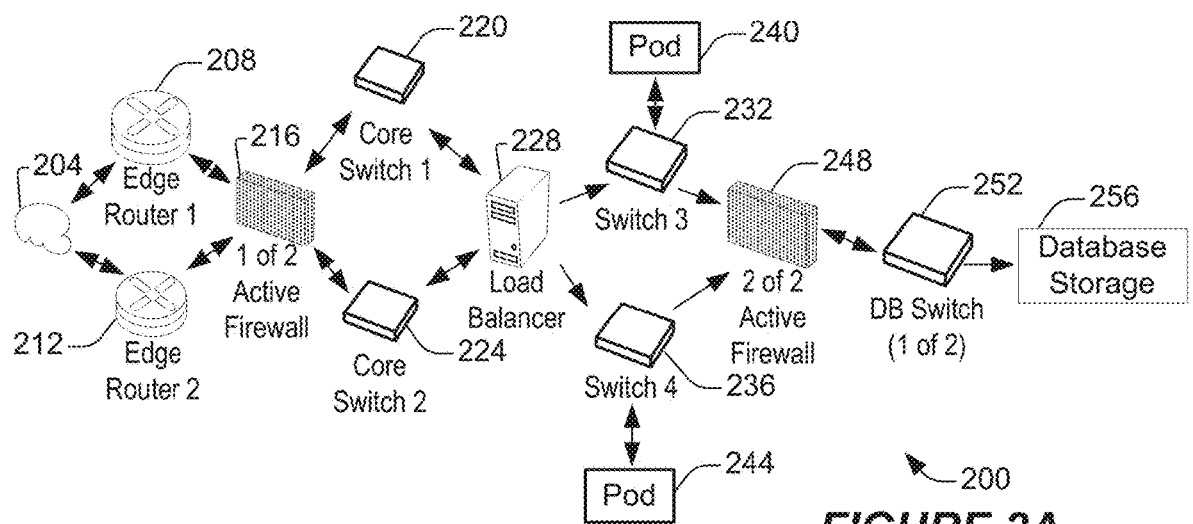
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
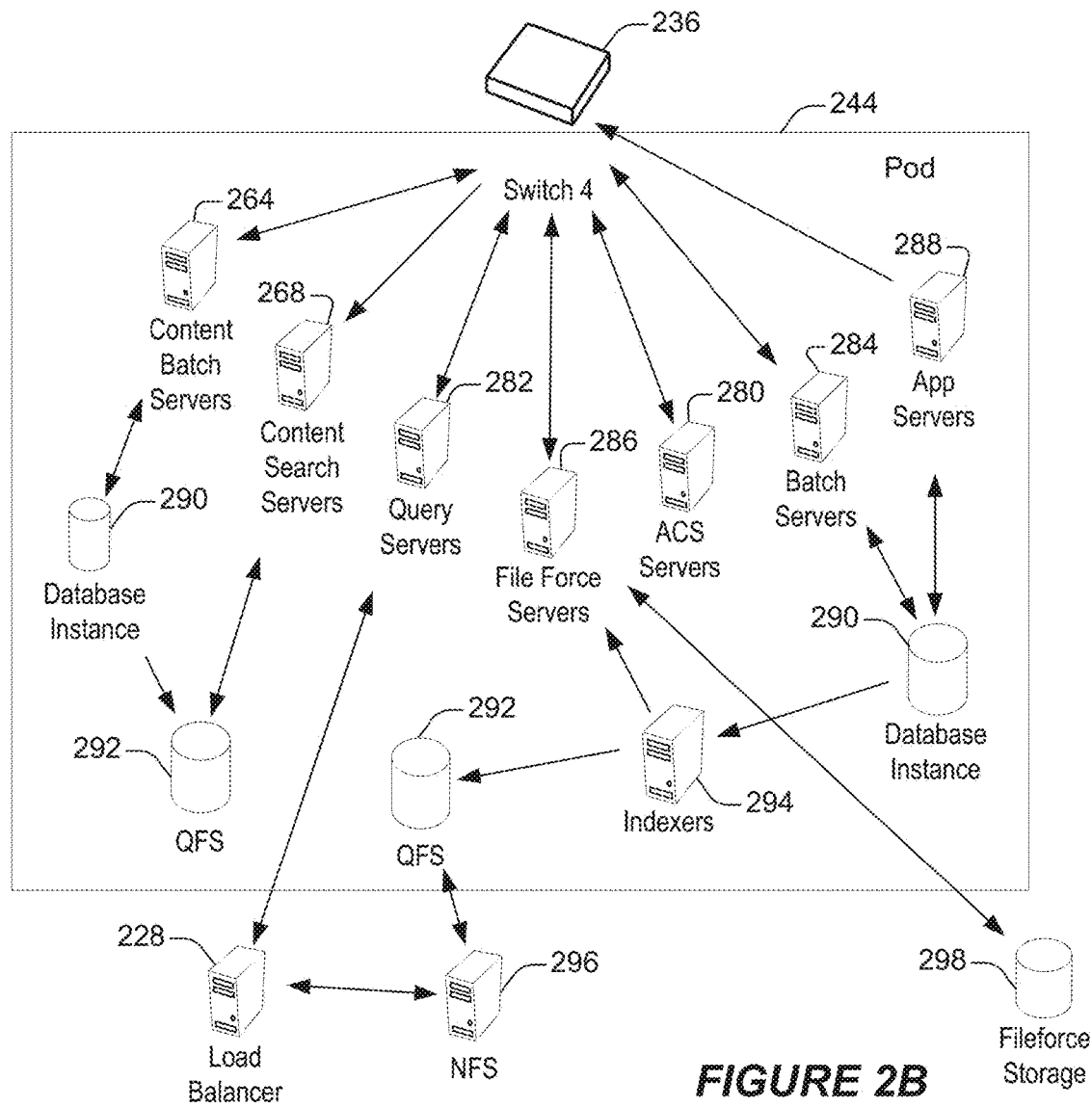
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 15-56C. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, California. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

III. Tracking Updates to a Record Stored in a Database

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

Figure 3:
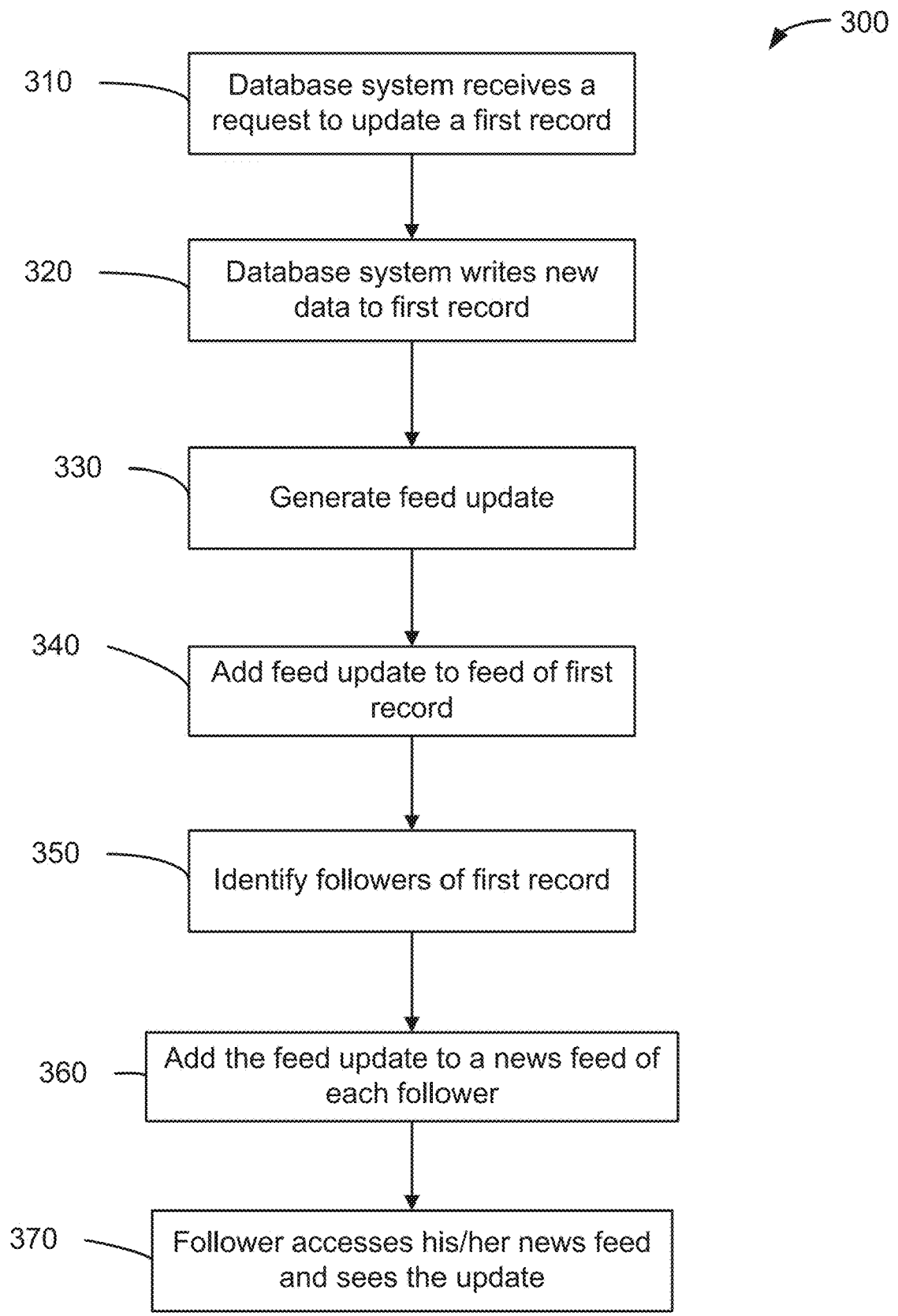
FIG. 3 shows a flowchart of an example of a method 300 for tracking updates to a record stored in a database system, performed in accordance with some implementations.

FIG. 3 shows a flowchart of an example of a method 300 for tracking updates to a record stored in a database system, performed in accordance with some implementations. Method 300 (and other methods described herein) may be implemented at least partially with multi-tenant database system 16, e.g., by one or more processors configured to receive or retrieve information, process the information, store results, and transmit the results. In other implementations, method 300 may be implemented at least partially with a single tenant database system. In various implementations, blocks may be omitted, combined, or split into additional blocks for method 300, as well as for other methods described herein.

In block 310, the database system receives a request to update a first record. In one implementation, the request is received from a first user. For example, a user may be accessing a page associated with the first record, and may change a displayed field and hit save. In another implementation, the database system can automatically create the request. For instance, the database system can create the request in response to another event, e.g., a request to change a field could be sent periodically at a particular date and/or time of day, or a change to another field or object. The database system can obtain a new value based on other fields of a record and/or based on parameters in the system.

The request for the update of a field of a record is an example of an event associated with the first record for which a feed tracked update may be created. In other implementations, the database system can identify other events besides updates to fields of a record. For example, an event can be a submission of approval to change a field. Such an event can also have an associated field (e.g., a field showing a status of whether a change has been submitted). Other examples of events can include creation of a record, deletion of a record, converting a record from one type to another (e.g., converting a lead to an opportunity), closing a record (e.g., a case type record), and potentially any other state change of a record—any of which could include a field change associated with the state change. Any of these events update the record whether by changing a field of the record, a state of the record, or some other characteristic or property of the record. In one implementation, a list of supported events for creating a feed tracked update can be maintained within the database system, e.g., at a server or in a database.

In block 320, the database system writes new data to the first record. In one implementation, the new data may include a new value that replaces old data. For example, a field is updated with a new value. In another implementation, the new data can be a value for a field that did not contain data before. In yet another implementation, the new data could be a flag, e.g., for a status of the record, which can be stored as a field of the record.

In some implementations, a "field" can also include records, which are child objects of the first record in a parent-child hierarchy. A field can alternatively include a pointer to a child record. A child object itself can include further fields. Thus, if a field of a child object is updated with a new value, the parent record also can be considered to have a field changed. In one example, a field could be a list of related child objects, also called a related list.

In block 330, a feed tracked update is generated about the update to the record. In one implementation, the feed tracked update is created in parts for assembling later into a display version. For example, event entries can be created and tracked in a first table, and changed field entries can be tracked in another table that is cross-referenced with the first table. More specifics of such implementations are provided later, e.g., with respect to FIG. 9A. In another implementation, the feed tracked update is automatically generated by the database system. The feed tracked update can convey in words that the first record has been updated and provide details about what was updated in the record and who performed the update. In some implementations, a feed tracked update is generated for only certain types of event and/or updates associated with the first record.

In one implementation, a tenant (e.g., through an administrator) can configure the database system to create (enable) feed tracked updates only for certain types of records. For example, an administrator can specify that records of designated types such as accounts and opportunities are enabled. When an update (or other event) is received for the enabled record type, then a feed tracked update would be generated. In another implementation, a tenant can also specify the fields of a record whose changes are to be tracked, and for which feed tracked updates are created. In one aspect, a maximum number of fields can be specified for tracking, and may include custom fields. In one implementation, the type of change can also be specified, for example, that the value change of a field is to be larger than a threshold (e.g., an absolute amount or a percentage change). In yet another implementation, a tenant can specify which events are to cause a generation of a feed tracked update. Also, in one implementation, individual users can specify configurations specific to them, which can create custom feeds as described in more detail below.

In one implementation, changes to fields of a child object are not tracked to create feed tracked updates for the parent record. In another implementation, the changes to fields of a child object can be tracked to create feed tracked updates for the parent record. For example, a child object of the parent type can be specified for tracking, and certain fields of the child object can be specified for tracking. As another example, if the child object is of a type specified for tracking, then a tracked change for the child object is propagated to parent records of the child object.

In block 340, the feed tracked update is added to a feed for the first record. In one implementation, adding the feed tracked update to a feed can include adding events to a table (which may be specific to a record or be for all or a group of objects), where a display version of a feed tracked update can be generated dynamically and presented in a GUI as a feed item when a user requests a feed for the first record. In another implementation, a display version of a feed tracked update can be added when a record feed is stored and maintained for a record. As mentioned above, a feed may be maintained for only certain records. In one implementation, the feed of a record can be stored in the database associated with the record. For example, the feed can be stored as a field (e.g., as a child object) of the record. Such a field can store a pointer to the text to be displayed for the feed tracked update.

In some implementations, only the current feed tracked update (or other current feed item) may be kept or temporarily stored, e.g., in some temporary memory structure. For example, a feed tracked update for only a most recent change to any particular field is kept. In other implementations, many previous feed tracked updates may be kept in the feed. A time and/or date for each feed tracked update can be tracked. Herein, a feed of a record is also referred to as an entity feed, as a record is an instance of a particular entity object of the database.

In block 350, followers of the first record can be identified. A follower is a user following the first record, such as a subscriber to the feed of the first record. In one implementation, when a user requests a feed of a particular record, such an identification of block 350 can be omitted. In another implementation where a record feed is pushed to a user (e.g., as part of a news feed), then the user can be identified as a follower of the first record. Accordingly, this block can include the identification of records and other objects being followed by a particular user.

In one implementation, the database system can store a list of the followers for a particular record. In various implementations, the list can be stored with the first record or associated with the record using an identifier (e.g., a pointer) to retrieve the list. For example, the list can be stored in a field of the first record. In another implementation, a list of the records that a user is following is used. In one implementation, the database system can have a routine that runs for each user, where the routine polls the records in the list to determine if a new feed tracked update has been added to a feed of the record. In another implementation, the routine for the user can be running at least partially on a user device, which contacts the database to perform the polling.

In block 360, in one implementation, the feed tracked update can be stored in a table, as described in greater detail below. When the user opens a feed, an appropriate query is sent to one or more tables to retrieve updates to records, also described in greater detail below. In some implementations, the feed shows feed tracked updates in reverse chronological order. In one implementation, the feed tracked update is pushed to the feed of a user, e.g., by a routine that determines the followers for the record from a list associated with the record. In another implementation, the feed tracked update is pulled to a feed, e.g., by a user device. This pulling may occur when a user requests the feed, as occurs in block 370. Thus, these actions may occur in a different order. The creation of the feed for a pull may be a dynamic creation that identifies records being followed by the requesting user, generates the display version of relevant feed tracked updates from stored information (e.g., event and field change), and adds the feed tracked updates into the feed. A feed of feed tracked updates of records and other objects that a user is following is also generally referred to herein as a news feed, which can be a subset of a larger information feed in which other types of information updates appear, such as posts.

In yet another implementation, the feed tracked update could be sent as an email to the follower, instead of in a feed. In one implementation, email alerts for events can enable people to be emailed when certain events occur. In another implementation, emails can be sent when there are posts on a user profile and posts on entities to which the user subscribes. In one implementation, a user can turn on/off email alerts for all or some events. In an implementation, a user can specify what kind of feed tracked updates to receive about a record that the user is following. For example, a user can choose to only receive feed tracked updates about certain fields of a record that the user is following, and potentially about what kind of update was performed (e.g., a new value input into a specified field, or the creation of a new field).

In block 370, a follower can access his/her news feed to see the feed tracked update. In one implementation, the user has just one news feed for all of the records that the user is following. In one aspect, a user can access his/her own feed by selecting a particular tab or other object on a page of an interface to the database system. Once selected the feed can be provided as a list, e.g., with an identifier (e.g., a time) or including some or all of the text of the feed tracked update. In another implementation, the user can specify how the feed tracked updates are to be displayed and/or sent to the user. For example, a user can specify a font for the text, a location of where the feed can be selected and displayed, amount of text to be displayed, and other text or symbols to be displayed (e.g., importance flags).

Figure 4:
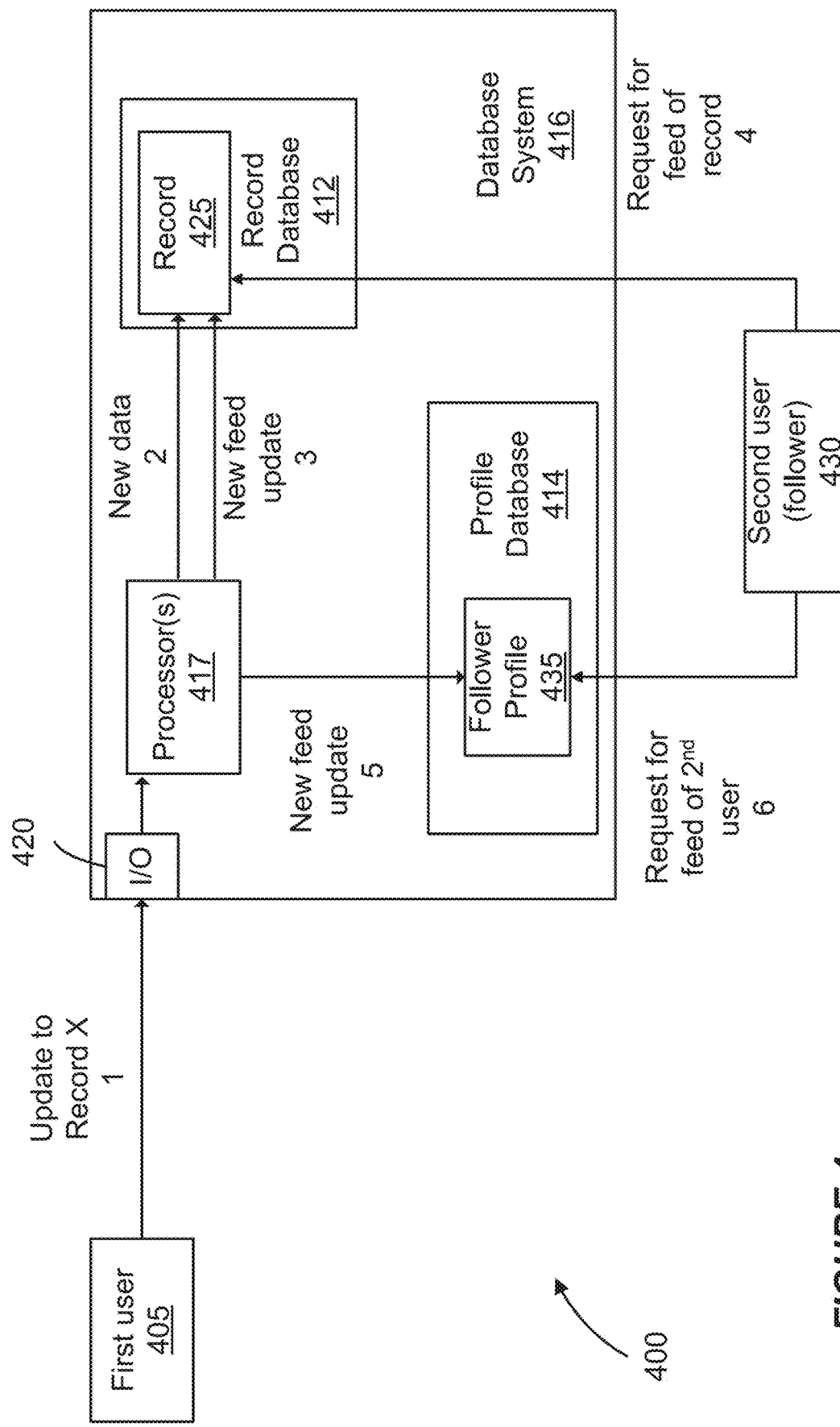
FIG. 4 shows a block diagram of an example of components of a database system configuration 400 performing a method for tracking an update to a record according to some implementations.

FIG. 4 shows a block diagram of an example of components of a database system configuration 400 performing a method for tracking an update to a record according to some implementations. Database system configuration 400 can perform implementations of method 300, as well as implementations of other methods described herein.

A first user 405 sends a request 1 to update record 425 in database system 416. Although an update request is described, other events that are being tracked are equally applicable. In various implementations, the request 1 can be sent via a user interface (e.g., 30 of FIG. 1B) or an application program interface (e.g., API 32). An I/O port 420 can accommodate the signals of request 1 via any input interface, and send the signals to one or more processors 417. The processor 417 can analyze the request and determine operations to be performed. Herein, any reference to a processor 417 can refer to a specific processor or any set of processors in database system 416, which can be collectively referred to as processor 417.

Processor 417 can determine an identifier for record 425, and send commands with the new data 2 of the request to record database 412 to update record 425. In one implementation, record database 412 is where tenant storage space 112 of FIG. 1B is located. The request 1 and new data commands 2 can be encapsulated in a single write transaction sent to record database 412. In one implementation, multiple changes to records in the database can be made in a single write transaction.

Processor 417 can also analyze request 1 to determine whether a feed tracked update is to be created, which at this point may include determining whether the event (e.g., a change to a particular field) is to be tracked. This determination can be based on an interaction (i.e., an exchange of data) with record database 412 and/or other databases, or based on information stored locally (e.g., in cache or RAM) at processor 417. In one implementation, a list of record types that are being tracked can be stored. The list may be different for each tenant, e.g., as each tenant may configure the database system to its own specifications. Thus, if the record 425 is of a type not being tracked, then the determination of whether to create a feed tracked update can stop there.

The same list or a second list (which can be stored in a same location or a different location) can also include the fields and/or events that are tracked for the record types in the first list. This list can be searched to determine if the event is being tracked. A list may also contain information having the granularity of listing specific records that are to be tracked (e.g., if a tenant can specify the particular records to be tracked, as opposed to just type).

As an example, processor 417 may obtain an identifier associated with record 425 (e.g., obtained from request 1 or database 412), potentially along with a tenant identifier, and cross-reference the identifier with a list of records for which feed tracked updates are to be created. Specifically, the record identifier can be used to determine the record type and a list of tracked types can be searched for a match. The specific record may also be checked if such individual record tracking was enabled. The name of the field to be changed can also be used to search a list of tracking-enabled fields. Other criteria besides field and events can be used to determine whether a feed tracked update is created, e.g., type of change in the field. If a feed tracked update is to be generated, processor 417 can then generate the feed tracked update.

In some implementations, a feed tracked update is created dynamically when a feed (e.g., the entity feed of record 425) is requested. Thus, in one implementation, a feed tracked update can be created when a user requests the entity feed for record 425. In this implementation, the feed tracked update may be created (e.g., assembled), including re-created, each time the entity feed is to be displayed to any user. In one implementation, one or more event history tables can keep track of previous events so that the feed tracked update can be re-created.

In another implementation, a feed tracked update can be created at the time the event occurs, and the feed tracked update can be added to a list of feed items. The list of feed items may be specific to record 425, or may be an aggregate of feed items including feed items for many records. Such an aggregate list can include a record identifier so that the feed items for the entity feed of record 425 can be easily retrieved. For example, after the feed tracked update has been generated, processor 417 can add the new feed tracked update 3 to a feed of record 425. As mentioned above, in one implementation, the feed can be stored in a field (e.g., as a child object) of record 425. In another implementation, the feed can be stored in another location or in another database, but with a link (e.g., a connecting identifier) to record 425. The feed can be organized in various ways, e.g., as a linked list, an array, or other data structure.

A second user 430 can access the new feed tracked update 3 in various ways. In one implementation, second user 430 can send a request 4 for the record feed. For example, second user 430 can access a home page (detail page) of the record 425 (e.g., with a query or by browsing), and the feed can be obtained through a tab, button, or other activation object on the page. The feed can be displayed on the screen or downloaded.

In another implementation, processor 417 can add the new feed tracked update 5 to a feed (e.g., a news feed) of a user that is following record 425. In one implementation, processor 417 can determine each of the followers of record 425 by accessing a list of the users that have been registered as followers. This determination can be done for each new event (e.g., update 1). In another implementation, processor 417 can poll (e.g., with a query) the records that second user 430 is following to determine when new feed tracked updates (or other feed items) are available. Processor 417 can use a follower profile 435 of second user 430 that can contain a list of the records that the second user 430 is following. Such a list can be contained in other parts of the database as well. Second user 430 can then send a request 6 to his/her profile 435 to obtain a feed, which contains the new feed tracked update. The user's profile 435 can be stored in a profile database 414, which can be the same or different than database 412.

In some implementations, a user can define a news feed to include new feed tracked updates from various records, which may be limited to a maximum number. In one implementation, each user has one news feed. In another implementation, the follower profile 435 can include the specifications of each of the records to be followed (with the criteria for what feed tracked updates are to be provided and how they are displayed), as well as the feed.

Some implementations can provide various types of record (entity) feeds. Entity Feeds can exist for record types like account, opportunity, case, and contact. An entity feed can tell a user about the actions that people have taken on that particular record or on one its related records. The entity feed can include who made the action, which field was changed, and the old and new values. In one implementation, entity feeds can exist on all supported records as a list that is linked to the specific record. For example, a feed could be stored in a field that allows lists (e.g., linked lists) or as a child object.

IV. Tracking Actions of a User

In addition to knowing about events associated with a particular record, it can be helpful for a user to know what a particular user is doing. In particular, it might be nice to know what the user is doing without the user having to generate the feed tracked update (e.g., a user submitting a synopsis of what the user has done). Accordingly, implementations can automatically track actions of a user that trigger events, and feed tracked updates can be generated for certain events.

Figure 5:
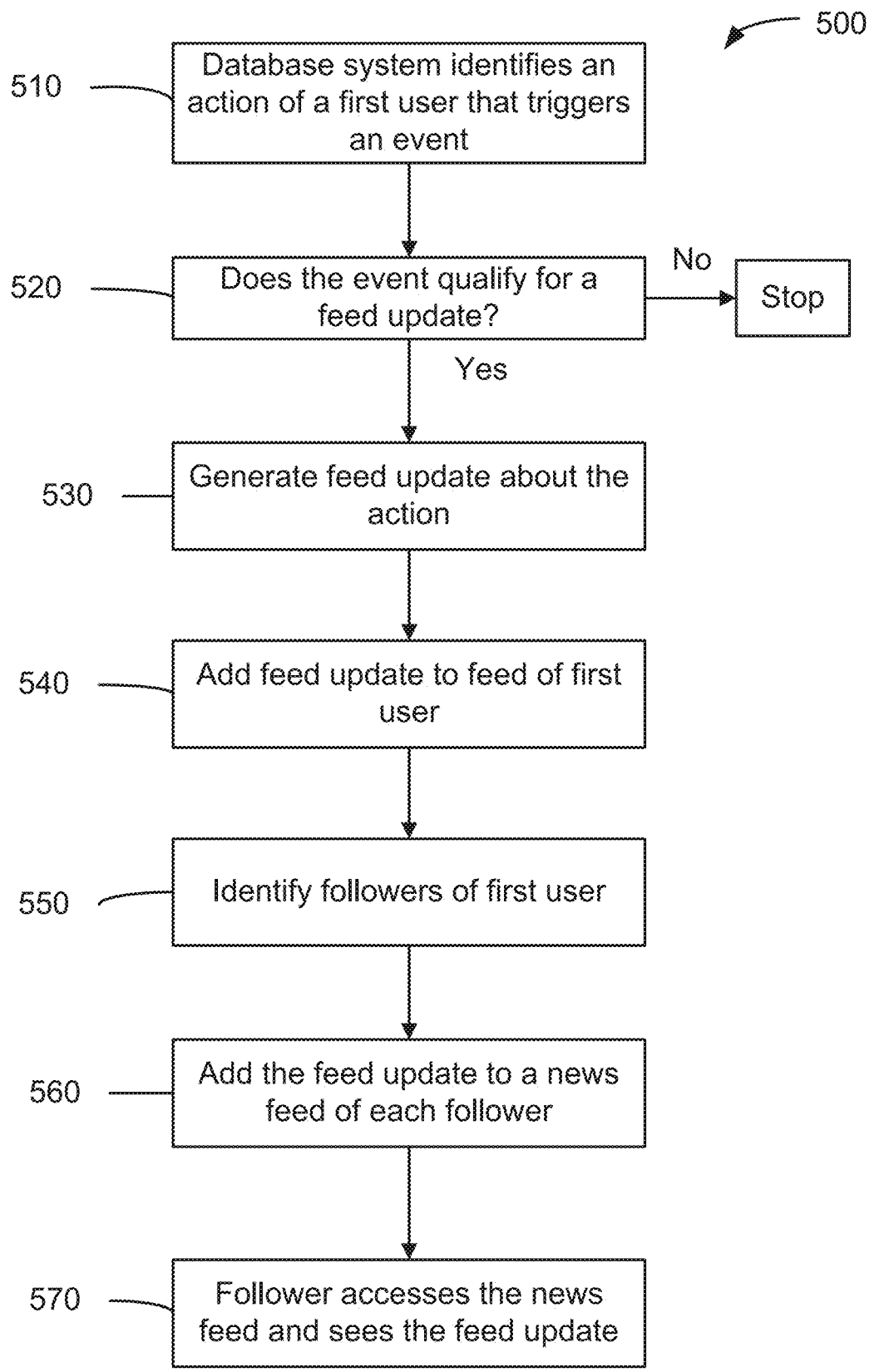
FIG. 5 shows a flowchart of an example of a method 500 for tracking actions of a user of a database system, performed in accordance with some implementations.

FIG. 5 shows a flowchart of an example of a method 500 for tracking actions of a user of a database system, performed in accordance with some implementations. Method 500 may be performed in addition to method 300. The operations of method 300, including order of blocks, can be performed in conjunction with method 500 and other methods described herein. Thus, a feed can be composed of changes to a record and actions of users.

In block 510, a database system (e.g., 16 of FIGS. 1A and 1B) identifies an action of a first user. In one implementation, the action triggers an event, and the event is identified. For example, the action of a user requesting an update to a record can be identified, where the event is receiving a request or is the resulting update of a record. The action may thus be defined by the resulting event. In another implementation, only certain types of actions (events) are identified. Which actions are identified can be set as a default or can be configurable by a tenant, or even configurable at a user level. In this way, processing effort can be reduced since only some actions are identified.

In block 520, it is determined whether the event qualifies for a feed tracked update. In one implementation, a predefined list of events (e.g., as mentioned herein) can be created so that only certain actions are identified. In one implementation, an administrator (or other user) of a tenant can specify the type of actions (events) for which a feed tracked update is to be generated. This block may also be performed for method 300.

In block 530, a feed tracked update is generated about the action. In an example where the action is an update of a record, the feed tracked update can be similar or the same as the feed tracked update created for the record. The description can be altered though to focus on the user as opposed to the record. For example, "John D. has closed a new opportunity for account XYZ" as opposed to "an opportunity has been closed for account XYZ."

In block 540, the feed tracked update is added to a profile feed of the first user when, e.g., the user clicks on a tab to open a page in a browser program displaying the feed. In one implementation, a feed for a particular user can be accessed on a page of the user's profile, in a similar manner as a record feed can be accessed on a detail page of the record. In another implementation, the first user may not have a profile feed and the feed tracked update may just be stored temporarily before proceeding. A profile feed of a user can be stored associated with the user's profile. This profile feed can be added to a news feed of another user.

In block 550, followers of the first user are identified. In one implementation, a user can specify which type of actions other users can follow. Similarly, in one implementation, a follower can select what actions by a user the follower wants to follow. In an implementation where different followers follow different types of actions, which users are followers of that user and the particular action can be identified, e.g., using various lists that track what actions and criteria are being followed by a particular user. In various implementations, the followers of the first user can be identified in a similar manner as followers of a record, as described above for block 350.

In block 560, the feed tracked update is added to a news feed of each follower of the first user when, e.g., the follower clicks on a tab to open a page displaying the news feed. The feed tracked update can be added in a similar manner as the feed items for a record feed. The news feed can contain feed tracked updates both about users and records. In another implementation, a user can specify what kind of feed tracked updates to receive about a user that the user is following. For example, a user could specify feed tracked updates with particular keywords, of certain types of records, of records owned or created by certain users, particular fields, and other criteria as mentioned herein.

In block 570, a follower accesses the news feed and sees the feed tracked update. In one implementation, the user has just one news feed for all of the records that the user is following. In another implementation, a user can access his/her own feed (i.e. feed about his/her own actions) by selecting a particular tab or other object on a page of an interface to the database system. Thus, a feed can include feed tracked updates about what other users are doing in the database system. When a user becomes aware of a relevant action of another user, the user can contact the co-worker, thereby fostering teamwork.

V. Generation of a Feed Tracked Update

As described above, some implementations can generate text describing events (e.g., updates) that have occurred for a record and actions by a user that trigger an event. A database system can be configured to generate the feed tracked updates for various events in various ways.

In one implementation, the feed tracked update is a grammatical sentence, thereby being easily understandable by a person. In another implementation, the feed tracked update provides detailed information about the update. In various examples, an old value and new value for a field may be included in the feed tracked update, an action for the update may be provided (e.g., submitted for approval), and the names of particular users that are responsible for replying or acting on the feed tracked update may be also provided. The feed tracked update can also have a level of importance based on settings chosen by the administrator, a particular user requesting an update, or by a following user who is to receive the feed tracked update, which fields is updated, a percentage of the change in a field, the type of event, or any combination of these factors.

The system may have a set of heuristics for creating a feed tracked update from the event (e.g., a request to update). For example, the subject may be the user, the record, or a field being added or changed. The verb can be based on the action requested by the user, which can be selected from a list of verbs (which may be provided as defaults or input by an administrator of a tenant). In one implementation, feed tracked updates can be generic containers with formatting restrictions, As an example of a feed tracked update for a creation of a new record, "Mark Abramowitz created a new Opportunity for IBM—20,000 laptops with Amount as $3.5M and Sam Palmisano as Decision Maker." This event can be posted to the profile feed for Mark Abramowitz and the entity feed for record of Opportunity for IBM—20,000 laptops. The pattern can be given by (AgentFullName) created a new (ObjectName)(RecordName) with [(FieldName) as (FieldValue) [,/and]]*[[added/changed/removed] (RelatedListRecordName) [as/to/as] (RelatedListRecordValue) [,/and]]*. Similar patterns can be formed for a changed field (standard or custom) and an added child record to a related list.

VI. Tracking Commentary from or about a User

Some implementations can also have a user submit text, instead of the database system generating a feed tracked update. As the text is submitted as part or all of a message by a user, the text can be about any topic. Thus, more information than just actions of a user and events of a record can be conveyed. In one implementation, the messages can be used to ask a question about a particular record, and users following the record can provide comments and responses.

Figure 6:
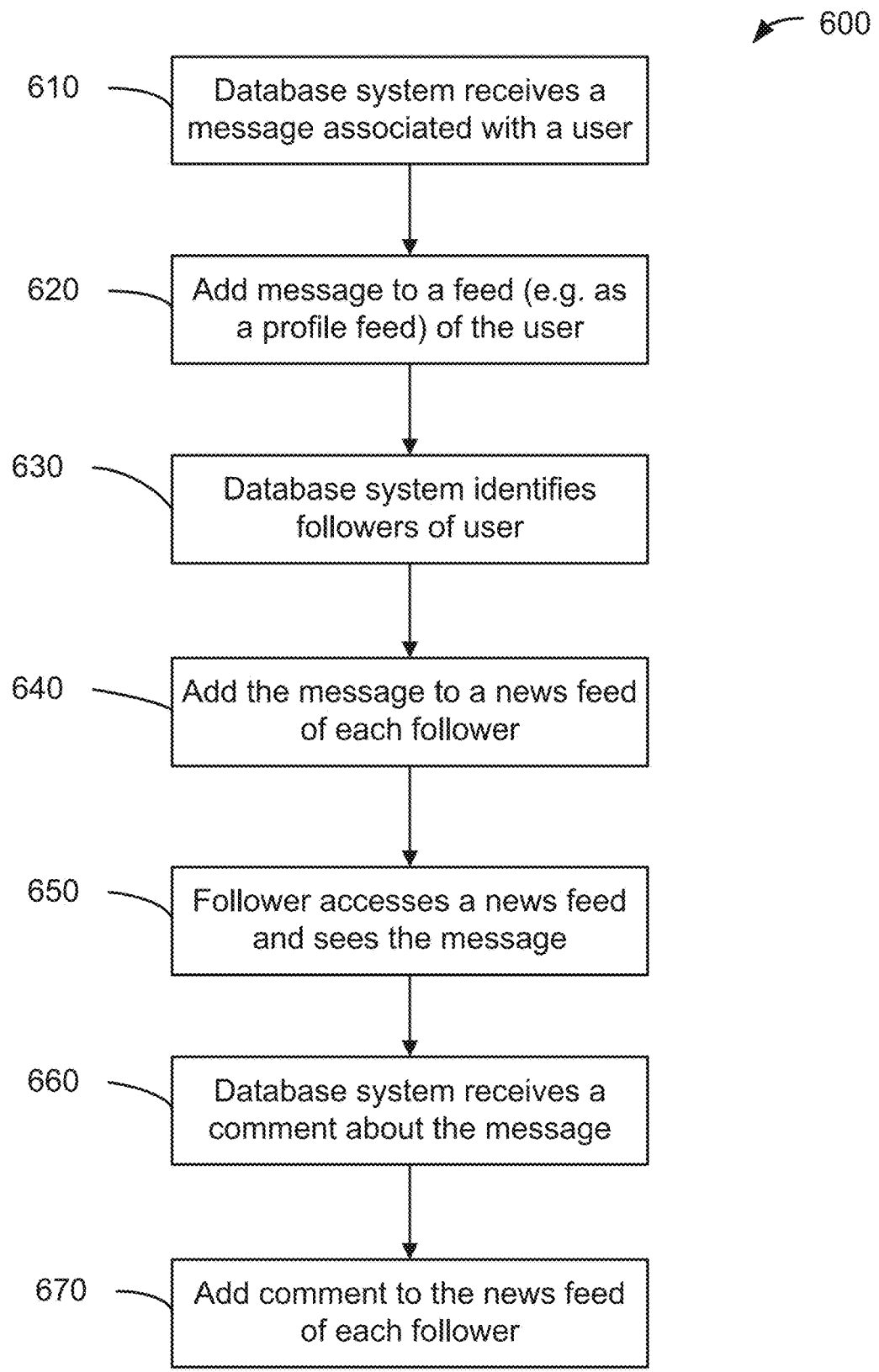
FIG. 6 shows a flowchart of an example of a method 600 for creating a news feed from messages created by a user about a record or another user, performed in accordance with some implementations.

FIG. 6 shows a flowchart of an example of a method 600 for creating a news feed from messages created by a user about a record or another user, performed in accordance with some implementations. In one implementation, method 600 can be combined with methods 300 and 500. In one aspect, a message can be associated with the first user when the first user creates the message (e.g., a post or comment about a record or another user). In another aspect, a message can be associated with the first user when the message is about the first user (e.g., posted by another user on the first user's profile feed).

In block 610, the database system receives a message (e.g., a post or status update) associated with a first user. The message (e.g., a post or status update) can contain text and/or multimedia content submitted by another user or by the first user. In one implementation, a post is for a section of the first user's profile page where any user can add a post, and where multiple posts can exist. Thus, a post can appear on the first user's profile page and can be viewed when the first user's profile is visited. For a message about a record, the post can appear on a detail page of a record. Note the message can appear in other feeds as well. In another implementation, a status update about the first user can only be added by the first user. In one implementation, a user can only have one status message.

In block 620, the message is added to a table, as described in greater detail below. When the feed is opened, a query filters one or more tables to identify the first user, identify other persons that the user is following, and retrieve the message. Messages and record updates are presented in a combined list as the feed. In this way, in one implementation, the message can be added to a profile feed of the first user, which is associated (e.g., as a related list) with the first user's profile. In one implementation, the posts are listed indefinitely. In another implementation, only the most recent posts (e.g., last 50) are kept in the profile feed. Such implementations can also be employed with feed tracked updates. In yet another implementation, the message can be added to a profile of the user adding the message.

In block 630, the database system identifies followers of the first user. In one implementation, the database system can identify the followers as described above for method 500. In various implementations, a follower can select to follow a feed about the actions of the first user, messages about the first user, or both (potentially in a same feed).

In block 640, the message is added to a news feed of each follower. In one implementation, the message is only added to a news feed of a particular follower if the message matches some criteria, e.g., the message includes a particular keyword or other criteria. In another implementation, a message can be deleted by the user who created the message. In one implementation, once deleted by the author, the message is deleted from all feeds to which the message had been added.

In block 650, the follower accesses a news feed and sees the message. For example, the follower can access a news feed on the follower's own profile page. As another example, the follower can have a news feed sent to his/her own desktop without having to first go to a home page.

In block 660, the database system receives a comment about the message. The database system can add the comment to a feed of the same first user, much as the original message was added. In one implementation, the comment can also be added to a feed of a second user who added the comment. In one implementation, users can also reply to the comment. In another implementation, users can add comments to a feed tracked update, and further comments can be associated with the feed tracked update. In yet another implementation, making a comment or message is not an action to which a feed tracked update is created. Thus, the message may be the only feed item created from such an action.

In one implementation, if a feed tracked update or post is deleted, its corresponding comments are deleted as well. In another implementation, new comments on a feed tracked update or post do not update the feed tracked update timestamp. Also, the feed tracked update or post can continue to be shown in a feed (profile feed, record feed, or news feed) if it has had a comment within a specified timeframe (e.g., within the last week). Otherwise, the feed tracked update or post can be removed in an implementation.

In some implementations, all or most feed tracked updates can be commented on. In other implementations, feed tracked updates for certain records (e.g., cases or ideas) are not commentable. In various implementations, comments can be made for any one or more records of opportunities, accounts, contacts, leads, and custom objects.

In block 670, the comment is added to a news feed of each follower. In one implementation, a user can make the comment within the user's news feed. Such a comment can propagate to the appropriate profile feed or record feed, and then to the news feeds of the following users. Thus, feeds can include what people are saying, as well as what they are doing. In one aspect, feeds are a way to stay up-to-date (e.g., on users, opportunities, etc.) as well as an opportunity to reach out to co-workers/partners and engage them around common goals.

In some implementations, users can rate feed tracked updates or messages (including comments). A user can choose to prioritize a display of a feed so that higher rated feed items show up higher on a display. For example, in an implementation where comments are answers to a specific question, users can rate the different status posts so that a best answer can be identified. As another example, users are able to quickly identify feed items that are most important as those feed items can be displayed at a top of a list. The order of the feed items can be based on an importance level (which can be determined by the database system using various factors, some of which are mentioned herein) and based on a rating from users. In one implementation, the rating is on a scale that includes at least 3 values. In another implementation, the rating is based on a binary scale.

Besides a profile for a user, a group can also be created. In various implementations, the group can be created based on certain attributes that are common to the users, can be created by inviting users, and/or can be created by receiving requests to join from a user. In one implementation, a group feed can be created, with messages being added to the group feed when someone submits a message to the group as a whole through a suitable user interface. For example, a group page may have a group feed or a section within the feed for posts, and a user can submit a post through a publisher component in the user interface by clicking on a "Share" or similar button. In another implementation, a message can be added to a group feed when the message is submitted about any one of the members. Also, a group feed can include feed tracked updates about actions of the group as a whole (e.g., when an administrator changes data in a group profile or a record owned by the group), or about actions of an individual member.

Figure 7:
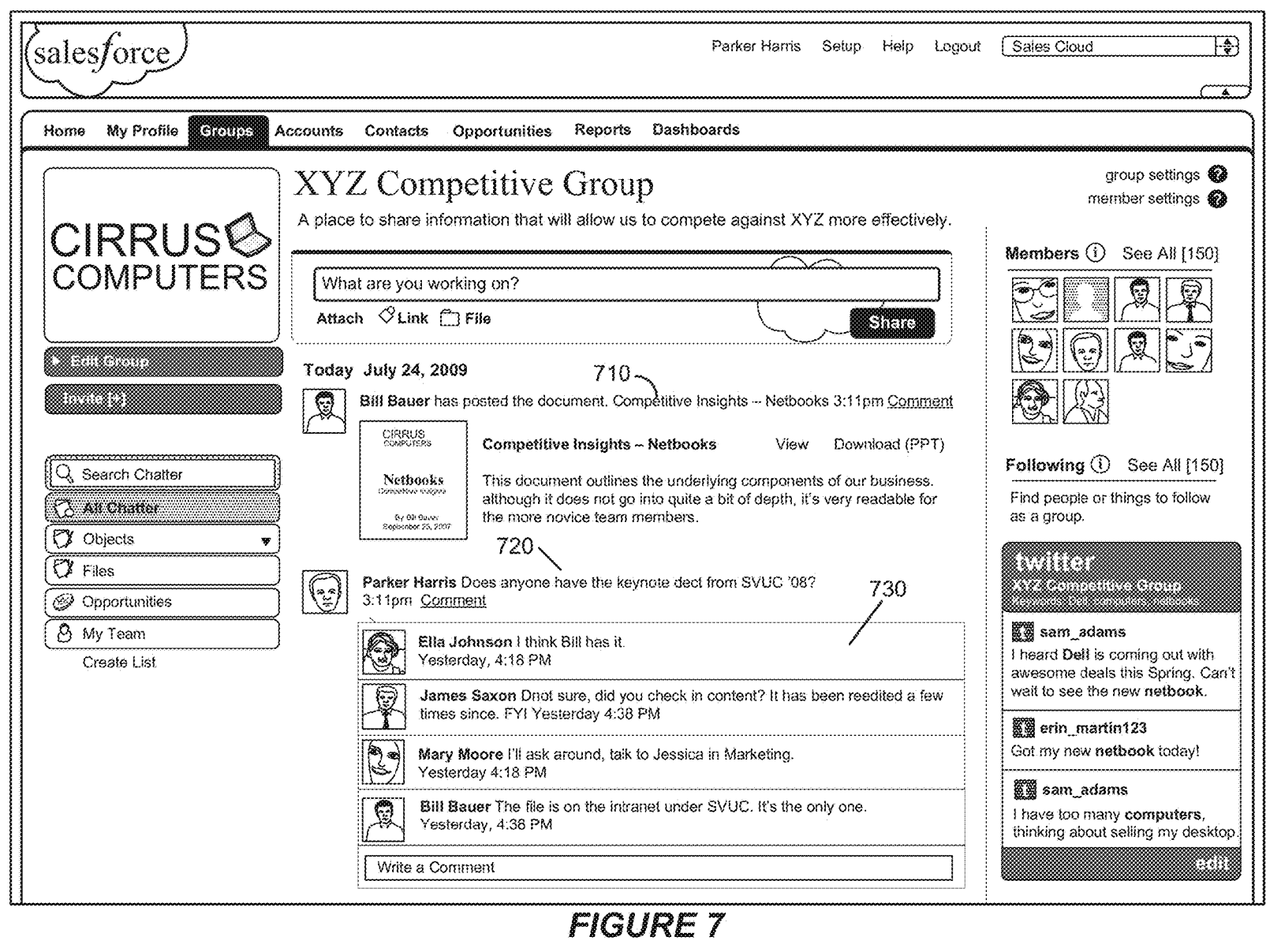

FIG. 7 shows an example of a group feed on a group page according to some implementations. As shown, a feed item 710 shows that a user has posted a document to the group object. The text "Bill Bauer has posted the document Competitive Insights" can be generated by the database system in a similar manner as feed tracked updates about a record being changed. A feed item 720 shows a post to the group, along with comments 730 from Ella Johnson, James Saxon, Mary Moore and Bill Bauer.

Figure 8:
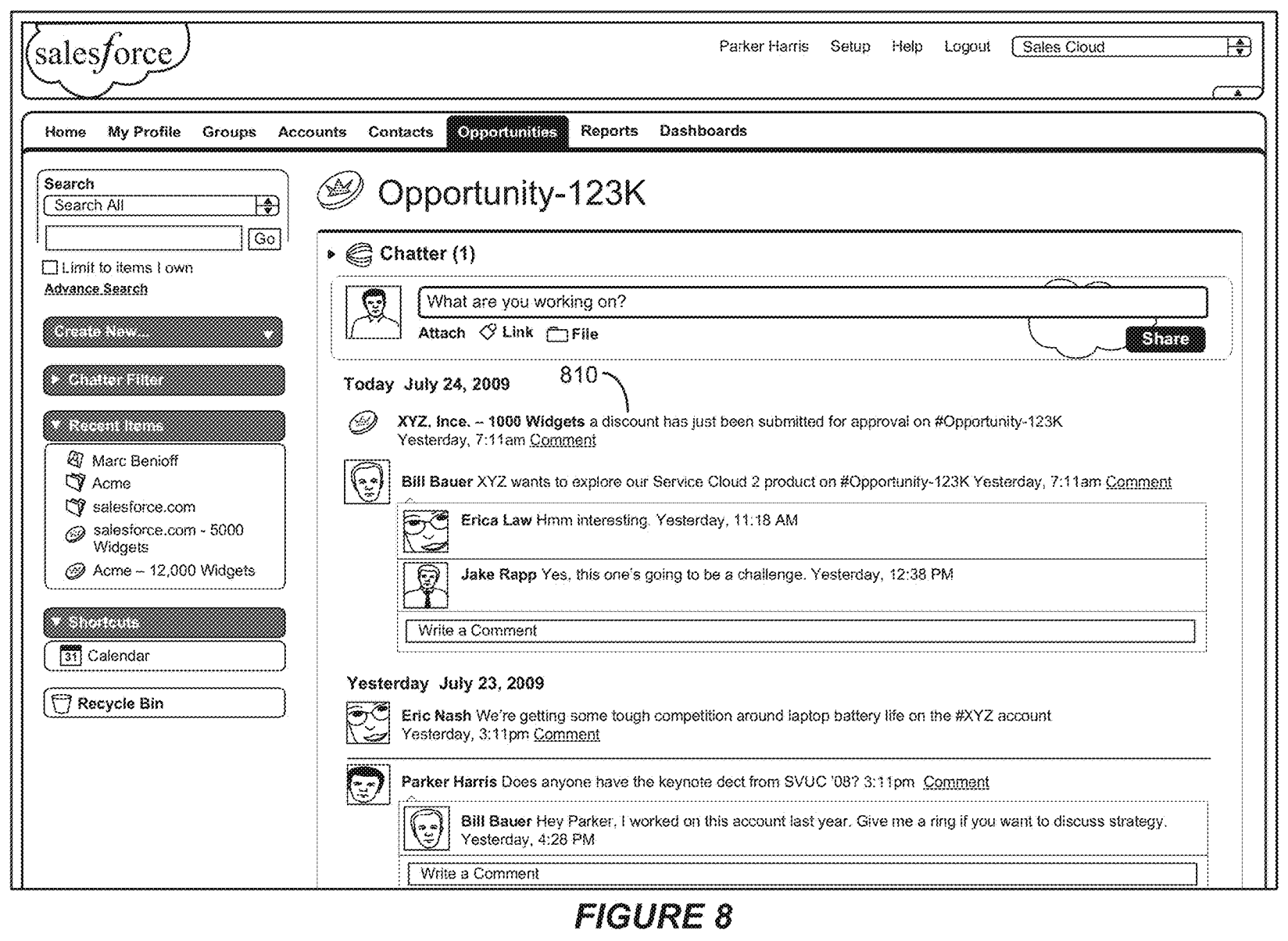

FIG. 8 shows an example of a record feed containing a feed tracked update, post, and comments according to some implementations. Feed item 810 shows a feed tracked update based on the event of submitting a discount for approval. Other feed items show posts, e.g., from Bill Bauer, that are made to the record and comments, e.g., from Erica Law and Jake Rapp, that are made on the posts.

VII. Infrastructure for a Feed

A. Tables Used to Create a Feed FIG. 9A shows an example of a plurality of feed tracked update tables that may be used in tracking events and creating feeds according to some implementations. The tables of FIG. 9A may have entries added, or potentially removed, as part of tracking events in the database from which feed items are creates or that correspond to feed items. In one implementation, each tenant has its own set of tables that are created based on criteria provided by the tenant.

An event history table 910 can provide a feed tracked update of events from which feed items are created. In one aspect, the events are for objects that are being tracked. Thus, table 910 can store and change feed tracked updates for feeds, and the changes can be persisted. In various implementations, event history table 910 can have columns of event ID 911, object ID 912 (also called parent ID), and created by ID 913. The event ID 911 can uniquely identify a particular event and can start at 1 (or other number or value).

Each new event can be added chronologically with a new event ID, which may be incremented in order. An object ID 912 can be used to track which record or user's profile is being changed. For example, the object ID can correspond to the record whose field is being changed or the user whose feed is receiving a post. The created by ID 913 can track the user who is performing the action that results in the event, e.g., the user that is changing the field or that is posting a message to the profile of another user.

In one implementation, a name of an event can also be stored in table 910. In one implementation, a tenant can specify events that they want tracked. In an implementation, event history table 910 can include the name of the field that changed (e.g., old and new values). In another implementation, the name of the field, and the values, are stored in a separate table. Other information about an event (e.g., text of comment, feed tracked update, post or status update) can be stored in event history table 910, or in other tables, as is now described.

A field change table 920 can provide a feed tracked update of the changes to the fields. The columns of table 920 can include an event ID 921 (which correlates to the event ID 911), an old value 922 for the field, and the new value 923 for the field. In one implementation, if an event changes more than one field value, then there can be an entry for each field changed. As shown, event ID 921 has two entries for event E37.

A comment table 930 can provide a feed tracked update of the comments made regarding an event, e.g., a comment on a post or a change of a field value. The columns of table 930 can include an event ID 921 (which correlates to the event ID 911), the comment column 932 that stores the text of the comment, and the time/date 933 of the comment. In one implementation, there can be multiple comments for each event. As shown, event ID 921 has two entries for event E37.

A user subscription table 940 can provide a list of the objects being followed (subscribed to) by a user. In one implementation, each entry has a user ID 941 of the user doing the following and one object ID 942 corresponding to the object being followed. In one implementation, the object being followed can be a record or a user. As shown, the user with ID U819 is following object IDs O615 and O489. If user U819 is following other objects, then additional entries may exist for user U819. Also as shown, user U719 is also following object O615. The user subscription table 940 can be updated when a user adds or deletes an object that is being followed.

In one implementation, regarding a profile feed and a news feed, these are read-only views on the event history table 910 specialized for these feed types. Conceptually the news feed can be a semi-join between the user subscription table 940 and the event history table 910 on the object IDs 912 and 942 for the user. In one aspect, these entities can have polymorphic parents and can be subject to a number of restrictions detailed herein, e.g., to limit the cost of sharing checks.

In one implementation, entity feeds are modeled in the API as a feed associate entity (e.g., AccountFeed, CaseFeed, etc). A feed associate entity includes information composed of events (e.g., event IDs) for only one particular record type. Such a list can limit the query (and sharing checks) to a specific record type. In one aspect, this structuring of the entity feeds can make the query run faster. For example, a request for a feed of a particular account can include the record type of account. In one implementation, an account feed table can then be searched, where the table has account record IDs and corresponding event IDs or pointers to particular event entries in event history table 910. Since the account feed table only contains some of the records (not all), the query can run faster.

In one implementation, there may be objects with no events listed in the event history table 910, even though the record is being tracked. In this case, the database service can return a result indicating that no feed items exist.

A feed item can represent an individual field change of a record, creation and deletion of a record, or other events being tracked for a record or a user. In one implementation, all of the feed items in a single transaction (event) can be grouped together and have the same event ID. A single transaction relates to the operations that can be performed in a single communication with the database. In another implementation where a feed is an object of the database, a feed item can be a child of a profile feed, news feed, or entity feed. If a feed item is added to multiple feeds, the feed item can be replicated as a child of each feed to which the feed item is added.

In some implementations, a comment exists as an item that depends from feed tracked updates, posts, status updates, and other items that are independent of each other. Thus, a feed comment object can exist as a child object of a feed item object. For example, comment table 930 can be considered a child table of event history table 910. In one implementation, a feed comment can be a child of a profile feed, news feed, or entity feed that is separate from other feed items.

In one implementation, viewing a feed pulls up the most recent messages or feed tracked updates (e.g., 25) and searches the most recent (e.g., 4) comments for each feed item. The comments can be identified via the comment table 930. In one implementation, a user can request to see more comments, e.g., by selecting a see more link.

After feed items have been generated, they can be filtered so that only certain feed items are displayed, which may be tailored to a specific tenant and/or user. In one implementation, a user can specify changes to a field that meet certain criteria for the feed item to show up in a feed displayed to the user, e.g., a news feed or even an entity feed displayed directly to the user. In one implementation, the criteria can be combined with other factors (e.g., number of feed items in the feed) to determine which feed items to display. For instance, if a small number of feed items exist (e.g., below a threshold), then all of the feed items may be displayed.

In one implementation, a user can specify the criteria via a query on the feed items in his/her new feed, and thus a feed may only return objects of a certain type, certain types of events, feed tracked updates about certain fields, and other criteria mentioned herein. Messages can also be filtered according to some criteria, which may be specified in a query. Such an added query can be added onto a standard query that is used to create the news feed for a user. A first user could specify the users and records that the first user is following in this manner, as well as identify the specific feed items that the first user wants to follow. The query could be created through a graphical interface or added by a user directly in a query language. Other criteria could include receiving only posts directed to a particular user or record, as opposed to other feed items.

In one implementation, a user can access a feed of a record if the user can access the record. The security rules for determining whether a user has access to a record can be performed in a variety of ways, some of which are described in commonly assigned U.S. Pat. No. 8,095,531, titled METHODS AND SYSTEMS FOR CONTROLLING ACCESS TO CUSTOM OBJECTS IN A DATABASE, by Weissman et al., issued on Jan. 10, 2012, and hereby incorporated by reference in its entirety and for all purposes.

In one implementation, a user can edit a feed of a record if the user has access to the record, e.g., deleting or editing a feed item. In another implementation, a user (besides an administrator) cannot edit a feed item, except for performing an action from which a feed item can be created. In one example, a user is first has to have access to a particular record and field for a feed item to be created based on an action of the user. In this case, an administrator can be considered to be a user with MODIFY-ALL-DATA security level. In yet another implementation, a user who created the record can edit the feed.

In one implementation, the text of posts are stored in a child table (post table 950), which can be cross-referenced with event history table 910. Post table 950 can include event ID 951 (to cross-reference with event ID 911), post text 952 to store the text of the post, and time/date 953. An entry in post table 950 can be considered a feed post object.

VIII. Subscribing to Users and Records to Follow

As described above, a user can follow users, groups, and records. Implementations can provide mechanisms for a user to manage which users, groups, and records that the user is currently following. In one implementation, a user can be limited to the number of users and records (collectively or separately) that the user can follow. For example, a user may be restricted to only following 10 users and 15 records, or as another example, 25 total. Alternatively, the user may be permitted to follow more or less users.

In one implementation, a user can go to a page of a record and then select to follow that object (e.g., with a button marked "follow" or "join"). In another implementation, a user can search for a record and have the matching records show up in a list. The search can include criteria of records that the user might want to follow. Such criteria can include the owner, the creation date, last comment date, and numerical values of particular fields (e.g., an opportunity with a value of more than $10,000).

A follow button (or other activation object) can then reside next to each record in the resulting list, and the follow button can be selected to start following the record. Similarly, a user can go to a profile page of a user and select to follow the user, or a search for users can provide a list, where one or more users can be selected for following from the list. The selections of subscribing and unsubscribing can add and delete rows in table 920.

In some implementations, a subscription center acts as a centralized place in a database application (e.g., application platform 18) to manage which records a user subscribes to, and which field updates the user wants to see in feed tracked updates. The subscription center can use a subscription table to keep track of the subscriptions of various users. In one implementation, the subscription center shows a list of all the items (users and records) a user is subscribed to. In another implementation, a user can unsubscribe to subscribed objects from the subscription center.

A. Automatic Subscription

Figure 9B:
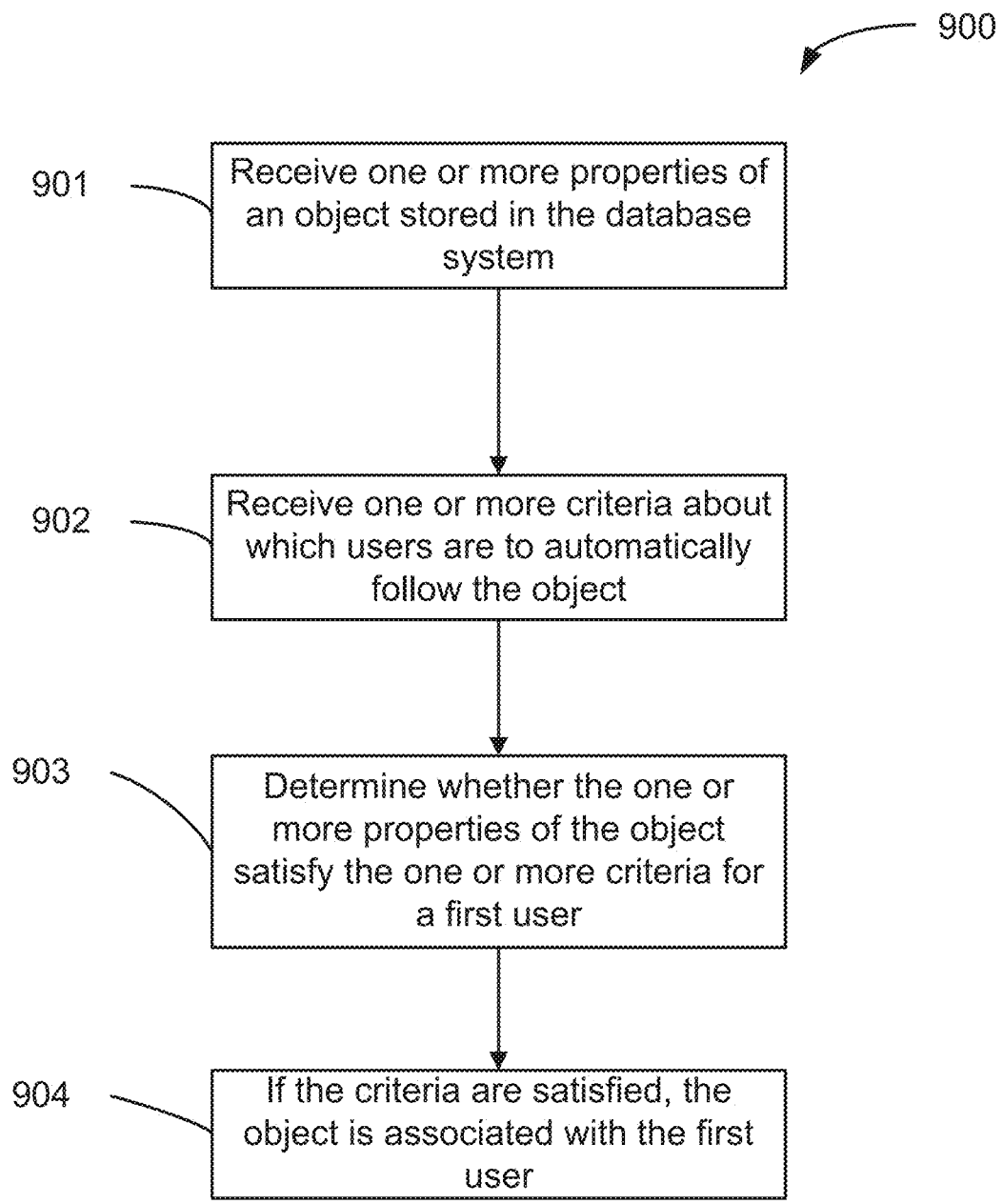
FIG. 9B shows a flowchart of an example of a method 900 for automatically subscribing a user to an object in a database system, performed in accordance with some implementations.

FIG. 9B shows a flowchart of an example of a method 900 for automatically subscribing a user to an object in a database system, performed in accordance with some implementations. Any of the following blocks can be performed wholly or partially with the database system, and in particular by one or more processor of the database system.

In block 901, one or more properties of an object stored in the database system are received. The properties can be received from administrators of the database system, or from users of the database system (which may be an administrator of a customer organization). The properties can be records or users, and can include any of the fields of the object that are stored in the database system. Examples of properties of a record include: an owner of the record, a user that converted the record from one record type to another record type, whether the first user has viewed the record, and a time the first user viewed the record. Examples of properties of a user include: which organization (tenant) the user is associated with, the second user's position in the same organization, and which other users the user had emailed or worked with on projects.

In block 902, the database system receives one or more criteria about which users are to automatically follow the object. Examples of the criteria can include: an owner or creator of a record is to follow the record, subordinates of an owner or creator of a record are to follow the record, and a user is to follow his/her manager, the user's peers, other users in the same business group as the user, and other users that the user has emailed or worked with on a project. The criteria can be specific to a user or group of users (e.g., users of a tenant).

In block 903, the database system determines whether the one or more properties of the object satisfy the one or more criteria for a first user. In one implementation, this determination can occur by first obtaining the criteria and then determining objects that satisfy the criteria. The determination can occur periodically, at time of creation of an object, or at other times.

In block 904, if the criteria are satisfied, the object is associated with the first user. The association can be in a list that stores information as to what objects are being followed by the first user. User subscription table 940 is an example of such a list. In one implementation, the one or more criteria are satisfied if one property satisfies at least one criterion. Thus, if the criteria are that a user follows his/her manager and the object is the user's manager, then the first user will follow the object.

In one implementation, a user can also be automatically unsubscribed, e.g., if a certain action happens. The action could be a change in the user's position within the organization, e.g., a demotion or becoming a contractor. As another example, if a case gets closed, then users following the case may be automatically unsubscribed.

IX. Adding Items to a Feed

As described above, a feed includes feed items, which include feed tracked updates and messages, as defined herein. Various feeds can be generated. For example, a feed can be generated about a record or about a user. Then, users can view these feeds. A user can separately view a feed of a record or user, e.g., by going to a home page for the user or the record. As described above, a user can also follow another user or record and receive the feed items of those feeds through a separate feed application. The feed application can provide each of the feeds that a user is following and, in some examples, can combine various feeds in a single information feed.

A feed generator can refer to any software program running on a processor or a dedicated processor (or combination thereof) that can generate feed items (e.g., feed tracked updates or messages) and combine them into a feed. In one implementation, the feed generator can generate a feed item by receiving a feed tracked update or message, identifying what feeds the item should be added to, and adding the feed. Adding the feed can include adding additional information (metadata) to the feed tracked update or message (e.g., adding a document, sender of message, a determined importance, etc.). The feed generator can also check to make sure that no one sees feed tracked updates for data that they don't have access to see (e.g., according to sharing rules). A feed generator can run at various times to pre-compute feeds or to compute them dynamically, or combinations thereof.

In one implementation, processor 417 in FIG. 4 can identify an event that meets criteria for a feed tracked update, and then generate the feed tracked update. Processor 417 can also identify a message. For example, an application interface can have certain mechanisms for submitting a message (e.g., "submit" buttons on a profile page, detail page of a record, "comment" button on post), and use of these mechanisms can be used to identify a message to be added to a table used to create a feed or added directly to a list of feed items ready for display.

A. Adding Items to a Pre-Computed Feed

In some implementations, a feed of feed items is created before a user requests the feed. Such an implementation can run fast, but have high overall costs for storage. In one implementation, once a profile feed or a record feed has been created, a feed item (messages and feed tracked updates) can be added to the feed. The feed can exist in the database system in a variety of ways, such as a related list. The feed can include mechanisms to remove items as well as add them.

As described above, a news feed can be an aggregated feed of all the record feeds and profile feeds to which a user has subscribed. The news feed can be provided on the home page of the subscribing user. Therefore, a news feed can be created by and exist for a particular user. For example, a user can subscribe to receive entity feeds of certain records that are of interest to the user, and to receive profile feeds of people that are of interest (e.g., people on a same team, that work for the user, are a boss of the user, etc.). A news feed can tell a user about all the actions across all the records (and people) whom have explicitly (or implicitly) been subscribed to via the subscriptions center (described above).

In one implementation, only one instance of each feed tracked update is shown on a user's news feed, even if the feed tracked update is published in multiple entities to which the user is subscribed. In one aspect, there may be delays in publishing news articles. For example, the delay may be due to queued up messages for asynchronous entity feed tracked update persistence. Different feeds may have different delays (e.g., delay for new feeds, but none of profile and entity feeds). In another implementation, certain feed tracked updates regarding a subscribed profile feed or an entity feed are not shown because the user is not allowed access, e.g., due to sharing rules (which restrict which users can see which data). Also, in one implementation, data of the record that has been updated (which includes creation) can be provided in the feed (e.g., a file or updated value of a feed can be added as a flash rendition).

B. Dynamically Generating Feeds

In some implementations, a feed generator can generate the feed items dynamically when a user requests to see a particular feed, e.g., a profile feed, entity feed, or the user's news feed. In one implementation, the most recent feed items (e.g., top 50) are generated first. In one aspect, the other feed items can be generated as a background process, e.g., not synchronously with the request to view the feed. However, since the background process is likely to complete before a user gets to the next 50 feed items, the feed generation may appear synchronous. In another aspect, the most recent feed items may or may not include comments, e.g., that are tied to feed tracked updates or posts.

In one implementation, the feed generator can query the appropriate subset of tables shown in FIG. 9A and/or other tables as necessary, to generate the feed items for display. For example, the feed generator can query the event history table 910 for the updates that occurred for a particular record. The ID of the particular record can be matched against the ID of the record. In one implementation, changes to a whole set of records can be stored in one table. The feed generator can also query for status updates, posts, and comments, each of which can be stored in different parts of a record or in separate tables, as shown in FIG. 9A. What gets recorded in the entity event history table (as well as what is displayed) can be controlled by a feed settings page in setup, which can be configurable by an administrator and can be the same for the entire organization, as is described above for custom feeds.

In one implementation, there can be two feed generators. For example, one generator can generate the record and profile feeds and another generator can generate news feeds. For the former, the feed generator can query identifiers of the record or the user profile. For the latter, the news feed generator can query the subscribed profile feeds and record feeds, e.g., user subscription table 940. In one implementation, the feed generator looks at a person's subscription center to decide which feeds to query for and return a list of feed items for the user. The list can be de-duped, e.g., by looking at the event number and values for the respective table, such as field name or ID, comment ID, or other information.

C. Adding Information to Feed Tracked Update Tables

Figure 10:
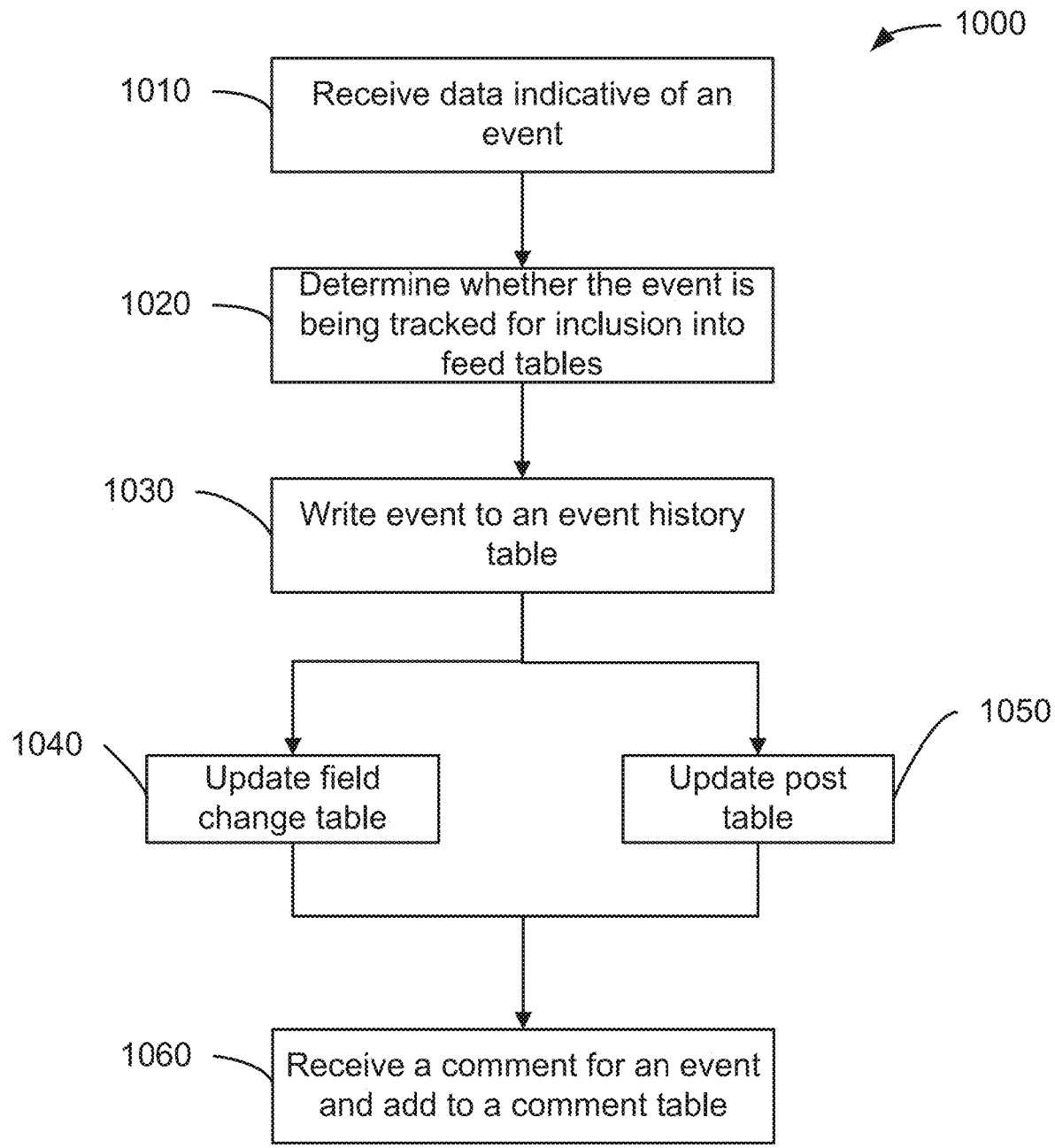
FIG. 10 shows a flowchart of an example of a method 1000 for saving information to feed tracking tables, performed in accordance with some implementations.

FIG. 10 shows a flowchart of an example of a method 1000 for saving information to feed tracking tables, performed in accordance with some implementations. In one implementation, some of the blocks may be performed regardless of whether a specific event or part of an event (e.g., only one field of an update is being tracked) is being tracked. In various implementations, a processor or set of processors (hardwired or programmed) can perform method 1000 and any other method described herein.

In block 1010, data indicative of an event is received. The data may have a particular identifier that specifies the event. For example, there may be a particular identifier for a field update. In another implementation, the transaction may be investigated for keywords identifying the event (e.g., terms in a query indicating a close, change field, or create operations).

In block 1020, it is determined whether the event is being tracked for inclusion into feed tracked update tables. The determination of what is being tracked can be based on a tenant's configuration as described above. In one aspect, the event has an actor (person performing an event), and an object of the event (e.g., record or user profile being changed).

In block 1030, the event is written to an event history table (e.g., table 910). In one implementation, this feed tracking operation can be performed in the same transaction that performs a save operation for updating a record. In another implementation, a transaction includes at least two roundtrip database operations, with one roundtrip being the database save (write), and the second database operation being the saving of the update in the feed tracked update table. In one implementation, the event history table is chronological. In another implementation, if user A posts on user B's profile, then user A is under the "created by" 913 and user B is under the object ID 912.

In block 1040, a field change table (e.g., field change table 920) can be updated with an entry having the event identifier and fields that were changed in the update. In one implementation, the field change table is a child table of the event history table. This table can include information about each of the fields that are changed. For example, for an event that changes the name and balance for an account record, an entry can have the event identifier, the old and new name, and the old and new balance. Alternatively, each field change can be in a different row with the same event identifier. The field name or ID can also be included to determine which field the values are associated.

In block 1050, when the event is a post, a post table (e.g., post table 950) can be updated with an entry having the event identifier and text of the post. In one implementation, the field change table is a child table of the event history table. In another implementation, the text can be identified in the transaction (e.g., a query command), stripped out, and put into the entry at the appropriate column. The various tables described herein can be combined or separated in various ways. For example, the post table and the field change table may be part of the same table or distinct tables, or may include overlapping portions of data.

In block 1060, a comment is received for an event and the comment is added to a comment table (e.g., comment table 930). The comment could be for a post or an update of a record, from which a feed tracked update can be generated for display. In one implementation, the text can be identified in the transaction (e.g., a query command), stripped out, and put into the entry at the appropriate column.

D. Reading Information from Feed Tracked Update Tables

Figure 11:
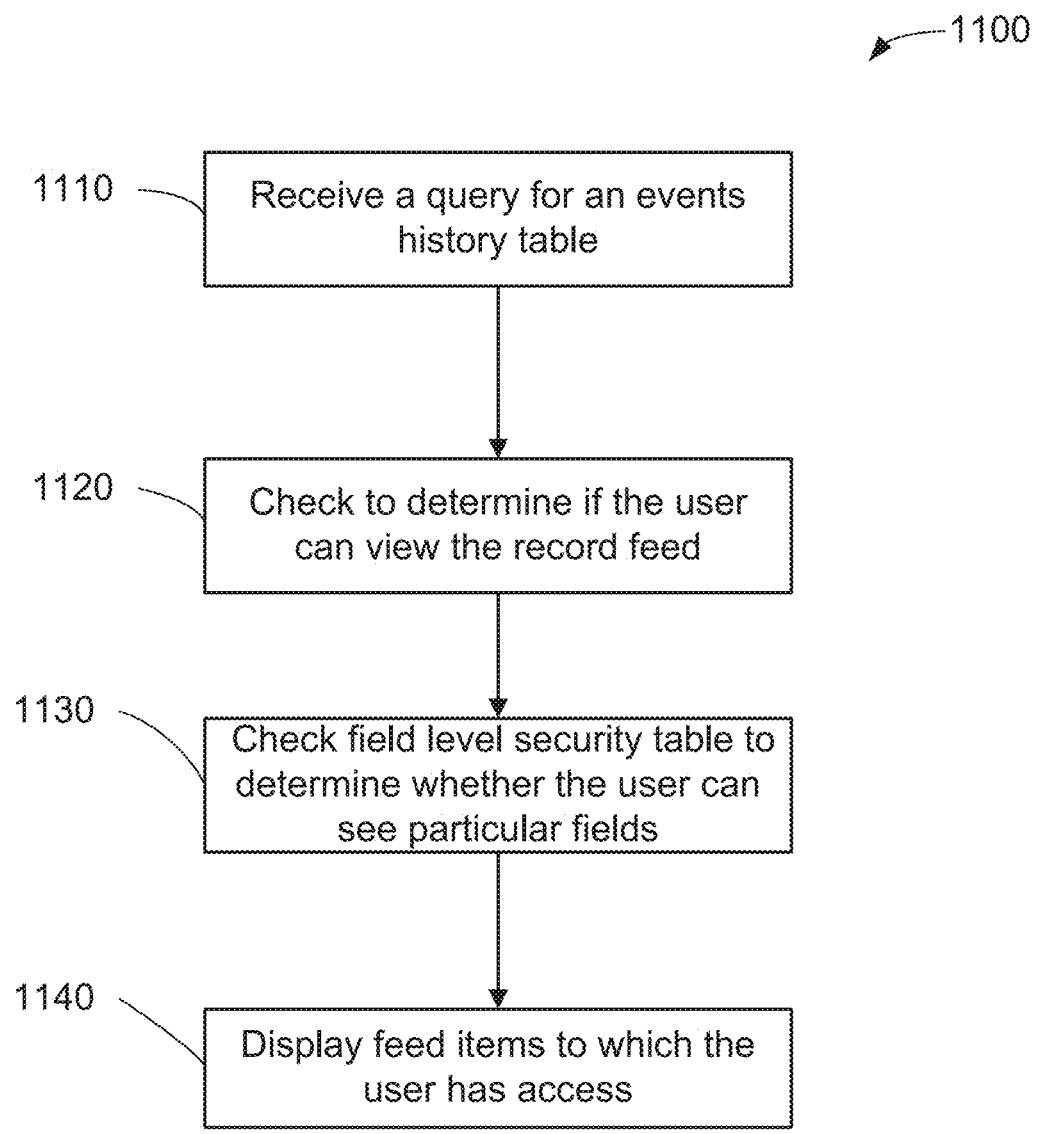
FIG. 11 shows a flowchart of an example of a method 1100 for reading a feed item as part of generating a feed for display, performed in accordance with some implementations.

FIG. 11 shows a flowchart of an example of a method 1100 for reading a feed item as part of generating a feed for display, performed in accordance with some implementations. In one implementation, the feed item may be read as part of creating a feed for a record.

In block 1110, a query is received for an events history table (e.g., event history table 910) for events related to a particular record. In one implementation, the query includes an identifier of the record for which the feed is being requested. In various implementations, the query may be initiated from a detail page of the record, a home page of a user requesting the record feed, or from a listing of different records (e.g., obtained from a search or from browsing).

In block 1120, the user's security level can be checked to determine if the user can view the record feed. Typically, a user can view a record feed, if the user can access the record. This security check can be performed in various ways. In one implementation, a first table is checked to see if the user has a classification (e.g., a security level that allows him to view records of the given type). In another implementation, a second table is checked to see if the user is allowed to see the specific record. The first table can be checked before the second table, and both tables can be different sections of a same table. If the user has requested the feed from the detail page of the record, one implementation can skip the security level check for the record since the check was already done when the user requested to view the detail page.

In one implementation, a security check is determined upon each request to view the record feed. Thus, whether or not a feed item is displayed to a user is determined based on access rights, e.g., when the user requests to see a feed of a record or a news feed of all the objects the user is following. In this manner, if a user's security changes, a feed automatically adapts to the user's security level when it is changed. In another implementation, a feed can be computed before being requested and a subsequent security check can be made to determine whether the person still has access right to view the feed items. The security (access) check may be at the field level, as well as at the record level.

In block 1130, if the user can access the record, a field level security table can be checked to determine whether the user can see particular fields. In one implementation, only those fields are displayed to the user. Alternatively, a subset of those the user has access to is displayed. The field level security check may optionally be performed at the same time and even using the same operation as the record level check. In addition, the record type check may also be performed at this time. If the user can only see certain fields, then any feed items related to those fields (e.g., as determined from field change table 920) can be removed from the feed being displayed.

In block 1140, the feed items that the user has access to are displayed. In one implementation, a predetermined number (e.g., 20) of feed items are displayed at a time. The method can display the first 20 feed items that are found to be readable, and then determine others while the user is viewing the first 20. In another implementation, the other feed items are not determined until the user requests to see them, e.g., by activating a see more link.

Figure 12:
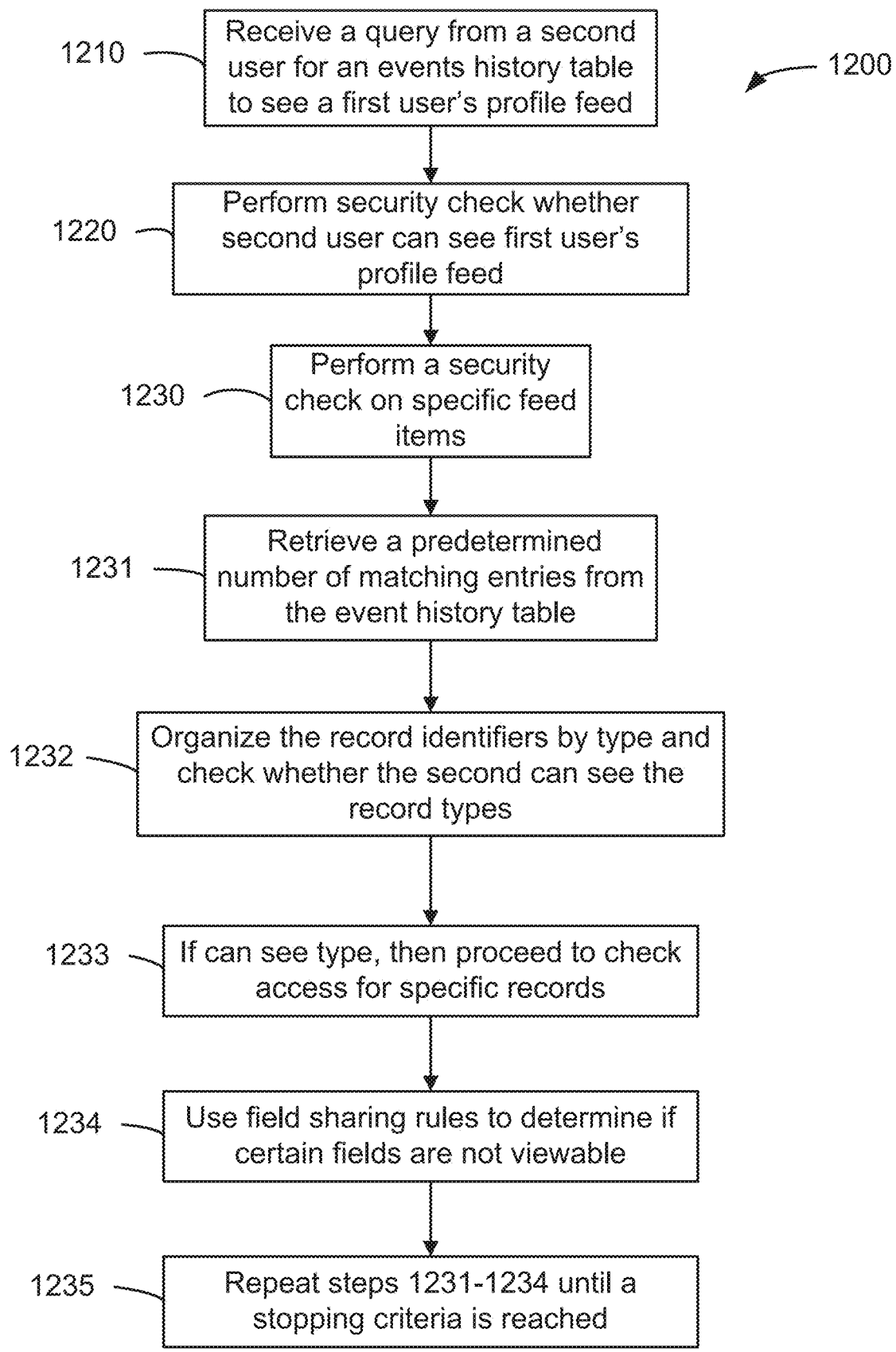
FIG. 12 shows a flowchart of an example of a method 1200 for reading a feed item of a profile feed for display, performed in accordance with some implementations.

FIG. 12 shows a flowchart of an example of a method 1200 for reading a feed item of a profile feed for display, performed in accordance with some implementations. In one implementation, the query includes an identifier of the user profile feed that is being requested. Certain blocks may be optional, as is also true for other methods described herein. For example, security checks may not be performed.

In block 1210, a query is directed to an event history table (e.g., event history table 910) for events having a first user as the actor of the event (e.g., creation of an account) or on which the event occurred (e.g., a post to the user's profile). In various implementations, the query may be initiated by a second user from the user's profile page, a home page of a user requesting the profile feed (e.g., from a list of users being followed), or from a listing of different users (e.g., obtained from a search or from browsing). Various mechanisms for determining aspects of events and obtaining information from tables can be the same across any of the methods described herein.

In block 1220, a security check may also be performed on whether the second user can see the first user's profile. In one implementation any user can see the profile of another user of the same tenant, and block 1220 is optional.

In block 1230, a security (access) check can be performed for the feed tracked updates based on record types, records, and/or fields, as well security checks for messages. In one implementation, only the feed tracked updates related to records that the person has updated are the ones that need security check as the feed items about the user are readable by any user of the same tenant. Users of other tenants are not navigable, and thus security can be enforced at a tenant level. In another implementation, messages can be checked for keywords or links to a record or field that the second user does not have access.

As users can have different security classifications, it is important that a user with a low-level security cannot see changes to records that have been performed by a user with high-level security. In one implementation, each feed item can be checked and then the viewable results displayed, but this can be inefficient. For example, such a security check may take a long time, and the second user would like to get some results sooner rather than later. The following blocks illustrate one implementation of how security might be checked for a first user that has a lot of feed items, but the second user cannot see most of them. This implementation can be used for all situations, but can be effective in the above situation.

In block 1231, a predetermined number of entries are retrieved from the event history table (e.g., starting from the most recent, which may be determined from the event identifier). The retrieved entries may just be ones that match the user ID of the query. In one implementation, entries are checked to find the entries that are associated with the user and with a record (i.e. not just posts to the user account). In another implementation, those entries associated with the user are allowed to be viewed, e.g., because the second user can see the profile of the first user as determined in block 1220.

In block 1232, the record identifiers are organized by type and the type is checked on whether the second user can see the record types. Other checks such as whether a record was manually shared (e.g., by the owner) can also be performed. In one implementation, the queries for the different types can be done in parallel.

In block 1233, if a user can see the record type, then a check can be performed on the specific record. In one implementation, if a user can see a record type, then the user can see all of the records of that type, and so this block can be skipped. In another implementation, the sharing model can account for whether a user below the second user (e.g., the second user is a manager) can see the record. In such an implementation, the second user may see such a record. In one implementation, if a user cannot see a specific record, then comments on that record are also not viewable.

In block 1234, field level sharing rules can be used to determine whether the second user can see information about an update or value of certain fields. In one implementation, messages can be analyzed to determine if reference to a particular field name is made. If so, then field level security can be applied to the messages.

In block 1280, blocks 1231-1234 are repeated until a stopping criterion is met. In one implementation, the stopping criteria may be when a maximum number (e.g., 100) of entries that are viewable have been identified. In another implementation, the stopping criteria can be that a maximum number (e.g., 500) of entries from the entity feed tracked update table have been analyzed, regardless of whether the entries are viewable or not.

In one implementation, a news feed can be generated as a combination of the profile feeds and the entity feeds, e.g., as described above. In one implementation, a list of records and user profiles for the queries in blocks 1110 and 1210 can be obtained from user subscription table 940. In one implementation, there is a maximum number of objects that can be followed.

E. Partial Pre-Computing of Items for a Feed

Figure 13:
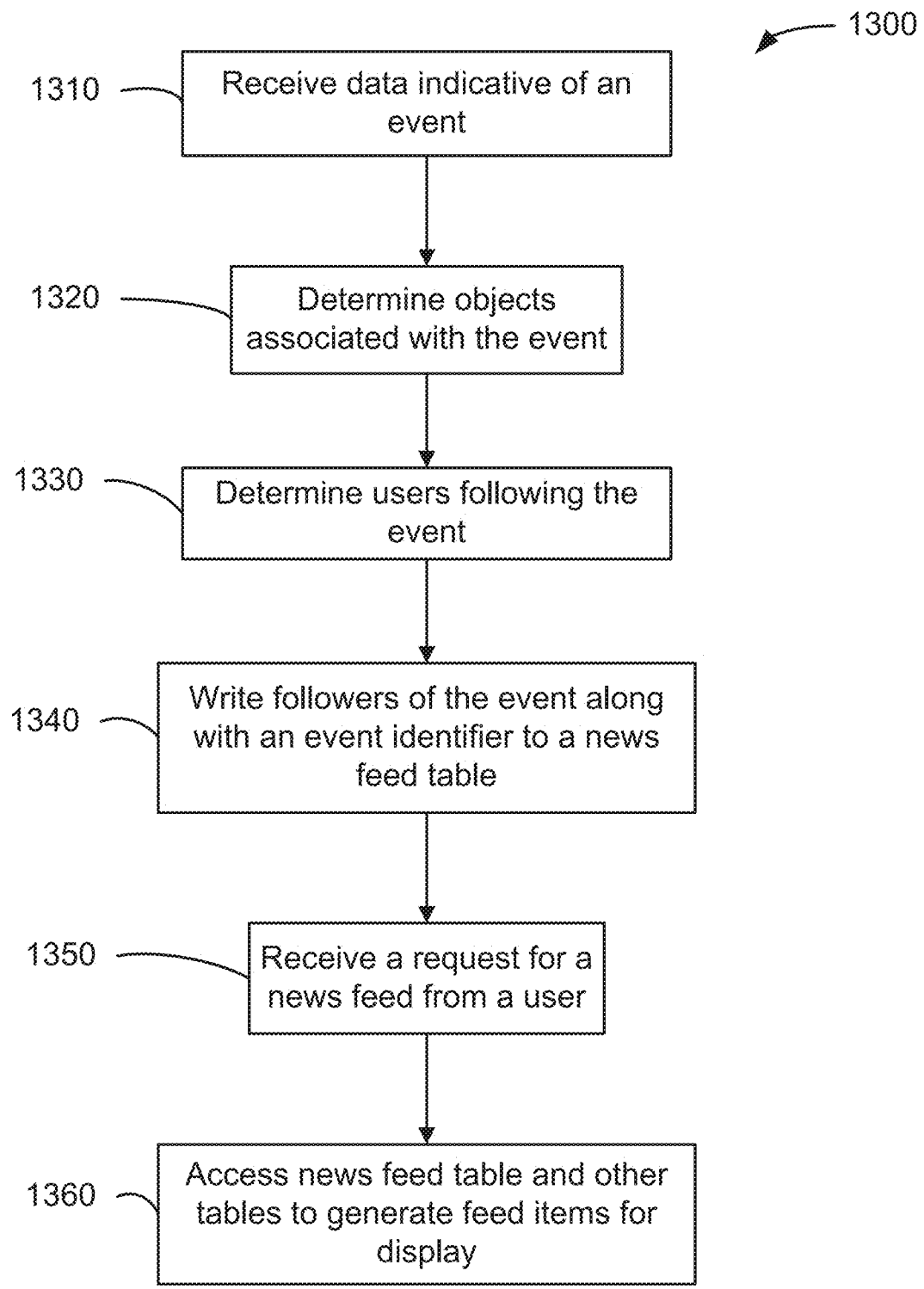
FIG. 13 shows a flowchart of an example of a method 1300 of storing event information for efficient generation of feed items to display in a feed, performed in accordance with some implementations.

FIG. 13 shows a flowchart of an example of a method 1300 of storing event information for efficient generation of feed items to display in a feed, performed in accordance with some implementations. In various implementations, method 1300 can be performed each time an event is written to the event history table, or periodically based on some other criteria (e.g., every minute, after five updates have been made, etc.).

In block 1310, data indicative of an event is received. The data may be the same and identified in the same way as described for block 1010. The event may be written to an event history table (e.g., table 910).

In block 1320, the object(s) associated with the event are identified. In various implementations, the object may be identified by according to various criteria, such as the record being changed, the user changing the record, a user posting a message, and a user whose profile the message is being posted to.

In block 1330, the users following the event are determined. In one implementation, one or more objects that are associated with the event are used to determine the users following the event. In one implementation, a subscription table (e.g., table 940) can be used to find the identified objects. The entries of the identified objects can contain an identifier (e.g., user ID 941) of each the users following the object In block 1340, the event and the source of the event, e.g., a record (for a record update) or a posting user (for a user-generated post) are written to a news feed table along with an event identifier. In one implementation, such information is added as a separate entry into the news feed table along with the event ID. In another implementation, each of the events for a user is added as a new column for the row of the user. In yet another implementation, more columns (e.g., columns from the other tables) can be added.

News feed table 960 shows an example of such a table with user ID 961 and event ID or pointer 962. The table can be organized in any manner. One difference from event history table 910 is that one event can have multiple entries (one for each subscriber) in the news feed table 960. In one implementation, all of the entries for a same user are grouped together, e.g., as shown. The user U819 is shown as following events E37 and E90, and thus any of the individual feed items resulting from those events. In another implementation, any new entries are added at the end of the table. Thus, all of the followers for a new event can be added as a group. In such an implementation, the event IDs would generally be grouped together in the table. Of course, the table can be sorted in any suitable manner.

In an implementation, if the number of users is small, then the feed items in one or more of the tables may be written as part of the same write transaction. In one implementation, the determination of small depends on the number of updates performed for the event (e.g., a maximum number of update operations may be allowed), and if more operations are performed, then the addition of the feed items is performed. In one aspect, the number of operations can be counted by the number of rows to be updated, including the rows of the record (which depends on the update event), and the rows of the feed tracked update tables, which can depend on the number of followers. In another implementation, if the number of users is large, the rest of the feed items can be created by batch. In one implementation, the feed items are written as part of a different transaction, i.e., by batch job.

In one implementation, security checks can be performed before an entry is added to the news feed table 960. In this manner, security checks can be performed during batch jobs and may not have to be performed at the time of requesting a news feed. In one implementation, the event can be analyzed and if access is not allowed to a feed item of the event, then an entry is not added. In one aspect, multiple feed items for a same user may not result from a same event (e.g., by how an event is defined in table 910), and thus there is no concern about a user missing a feed item that he/she should be able to view.

In block 1350, a request for a news feed is received from a user. In one implementation, the request is obtained when a user navigates to the user's home page. In another implementation, the user selects a table, link, or other page item that causes the request to be sent.

In block 1360, the news feed table and other tables are accessed to provide displayable feed items of the news feed. The news feed can then be displayed. In one implementation, the news feed table can then be joined with the event history table to determine the feed items. For example, the news feed table 960 can be searched for entries with a particular user ID. These entries can be used to identify event entries in event history table 910, and the proper information from any child tables can be retrieved. The feed items (e.g., feed tracked updates and messages) can then be generated for display.

In one implementation, the most recent feed items (e.g., 100 most recent) are determined first. The other feed items may then be determined in a batch process. Thus, the feed item that a user is most likely to view can come up first, and the user may not recognize that the other feed items are being done in batch. In one implementation, the most recent feed items can be gauged by the event identifiers. In another implementation, the feed items with a highest importance level can be displayed first. The highest importance being determined by one or more criteria, such as, who posted the feed item, how recently, how related to other feed items, etc.

In one implementation where the user subscription table 940 is used to dynamically create a news feed, the query would search the subscription table, and then use the object IDs to search the event history table (one search for each object the user is following). Thus, the query for the news feed can be proportional to the number of objects that one was subscribing to. The news feed table allows the intermediate block of determining the object IDs to be done at an earlier stage so that the relevant events are already known. Thus, the determination of the feed is no longer proportional to the number of object being followed.

In some implementations, a news feed table can include a pointer (as opposed to an event identifier) to the event history table for each event that is being followed by the user. In this manner, the event entries can immediately be retrieved without having to perform a search on the event history table. Security checks can be made at this time, and the text for the feed tracked updates can be generated.

X. Display of a Feed

Feeds include messages and feed tracked updates and can show up in many places in an application interface with the database system. In one implementation, feeds can be scoped to the context of the page on which they are being displayed. For example, how a feed tracked update is presented can vary depending on which page it is being displayed (e.g., in news feeds, on a detail page of a record, and even based on how the user ended up at a particular page). In another implementation, only a finite number of feed items are displayed (e.g., 50). In one implementation, there can be a limit specifically on the number of feed tracked updates or messages displayed. Alternatively, the limit can be applied to particular types of feed tracked updates or messages. For example, only the most recent changes (e.g., 5 most recent) for a field may be displayed. Also, the number of fields for which changes are displayed can also be limited. Such limits can also be placed on profile feeds and news feeds. In one implementation, feed items may also be subject to certain filtering criteria before being displayed, e.g., as described below.

XI. Filtering and Searching Feeds

It can be possible that a user subscribes to many users and records, which can cause a user's news feed to be very long and include many feed items. In such instances, it can be difficult for the user to read every feed item, and thus some important or interesting feed items may not be read. In some implementations, filters may be used to determine which feed items are added to a feed or displayed in the feed.

Figure 14:
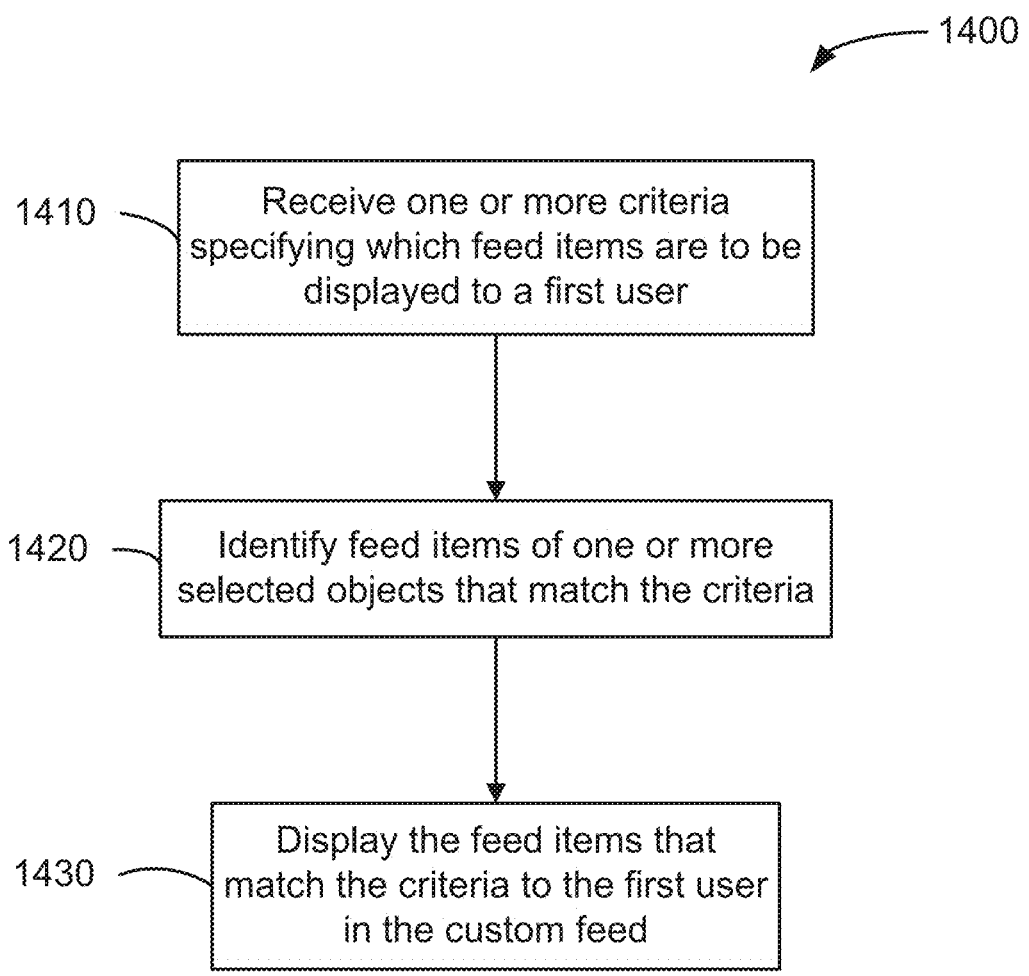
FIG. 14 shows a flowchart of an example of a method 1400 for creating a custom feed for users of a database system using filtering criteria, performed in accordance with some implementations.

FIG. 14 shows a flowchart of an example of a method 1400 for creating a custom feed for users of a database system using filtering criteria, performed in accordance with some implementations. Any of the following blocks can be performed wholly or partially with the database system, and in particular by one or more processor of the database system.

In block 1410, one or more criteria specifying which feed items are to be displayed to a first user are received from a tenant. In one implementation, the criteria specify which items to add to the custom feed. For example, the criteria could specify to only include feed items for certain fields of a record, messages including certain keywords, and other criteria mentioned herein. In another implementation, the criteria specify which items to remove from the custom feed. For example, the criteria could specify not to include feed items about certain fields or including certain keywords.

In block 1420, the database system identifies feed items of one or more selected objects that match the criteria. The feed items can be stored in the database, e.g., in one or more of the tables of FIG. 9A. In one implementation, the one or more selected objects are the objects that the first user is following. In another implementation, the one or more selected objects is a single record whose record feed the first user is requesting.

In block 1430, the feed items that match the criteria are displayed to the first user in the custom feed. The generation of text for a feed tracked update can occur after the identification of the feed items (e.g., data for a field change) and before the display of the final version of the feed item.

In one implementation, the criteria are received before a feed item is created. In another implementation, the criteria are received from the first user. In one aspect, the criteria may only be used for determining feeds to display to the first user. In yet another implementation, the criteria are received from a first tenant and apply to all of the users of the first tenant. Also, in an implementation where a plurality of criteria are specified, the criteria may be satisfied for a feed item if one criterion is satisfied.

Some implementations can provide mechanisms to search for feed items of interest. For example, the feed items can be searched by keyword, e.g., as entered by a user. As another example, a tab (or other selection device) can show feed items about or from a particular user. In one implementation, only messages (or even just comments) from a particular user can be selected. Besides searching for feed items that match criteria, one also could search for a particular feed item.

XII. Interacting with Multiple Records Via a Publisher and an Information Feed

Figure 15:
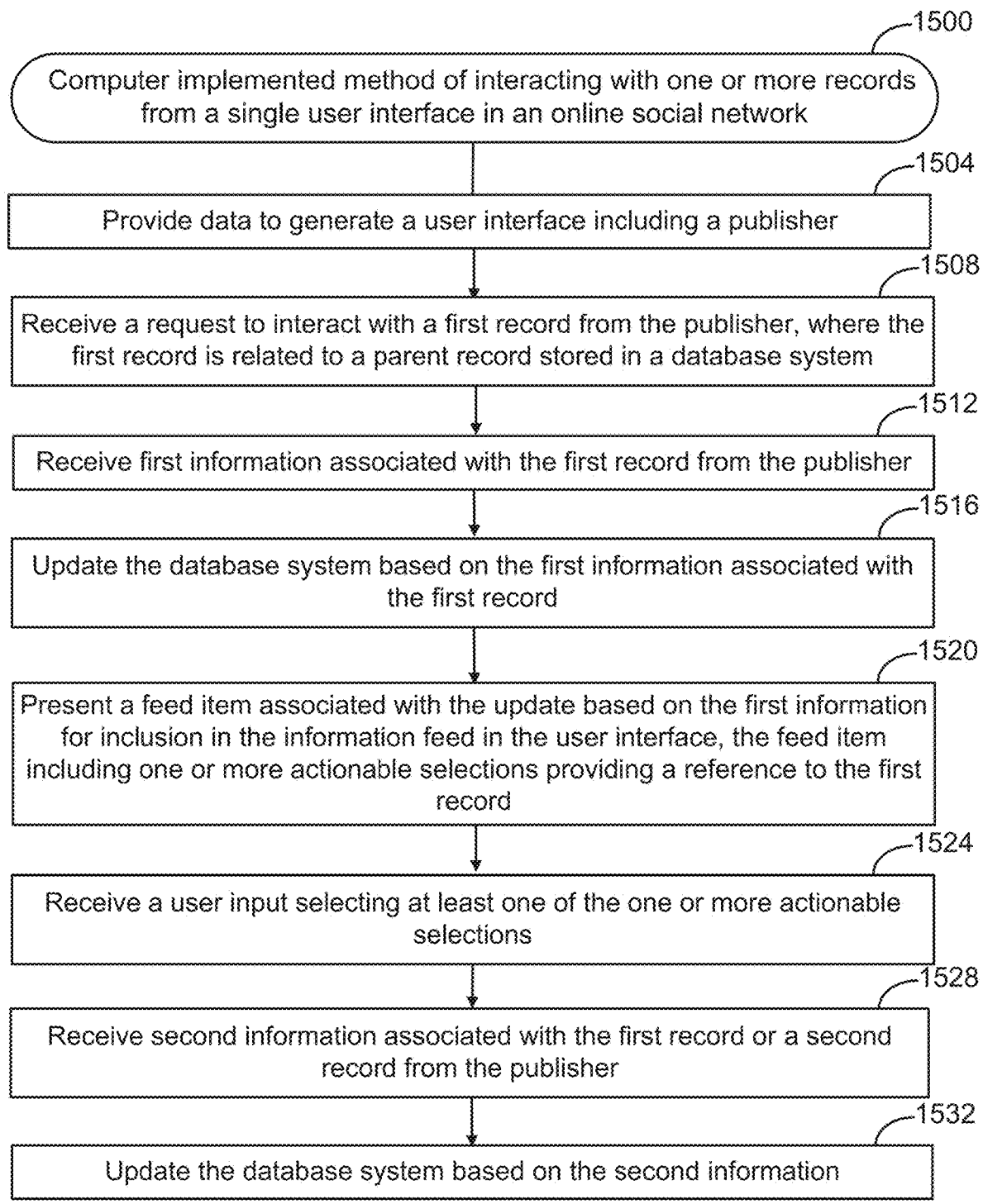
FIG. 15 shows a flowchart of an example of a computer implemented method 1500 for interacting with one or more records from a single user interface in an online social network, performed in accordance with some implementations.

FIG. 15 shows a flowchart of an example of a computer-implemented method 1500 for interacting with one or more records from a single user interface in an online social network, performed in accordance with some implementations. FIG. 15 may be described with reference to FIGS. 19-30. At block 1504, a computing device or any number of computing devices cooperating to perform the method 1500 may provide data to generate a user interface including a publisher. The publisher may be configured to publish information to an information feed. In some implementations, the user interface may simultaneously display the information feed with the publisher. The user interface may be part of a page layout for a user, record, or other entity in the online social network.

Figure 19:
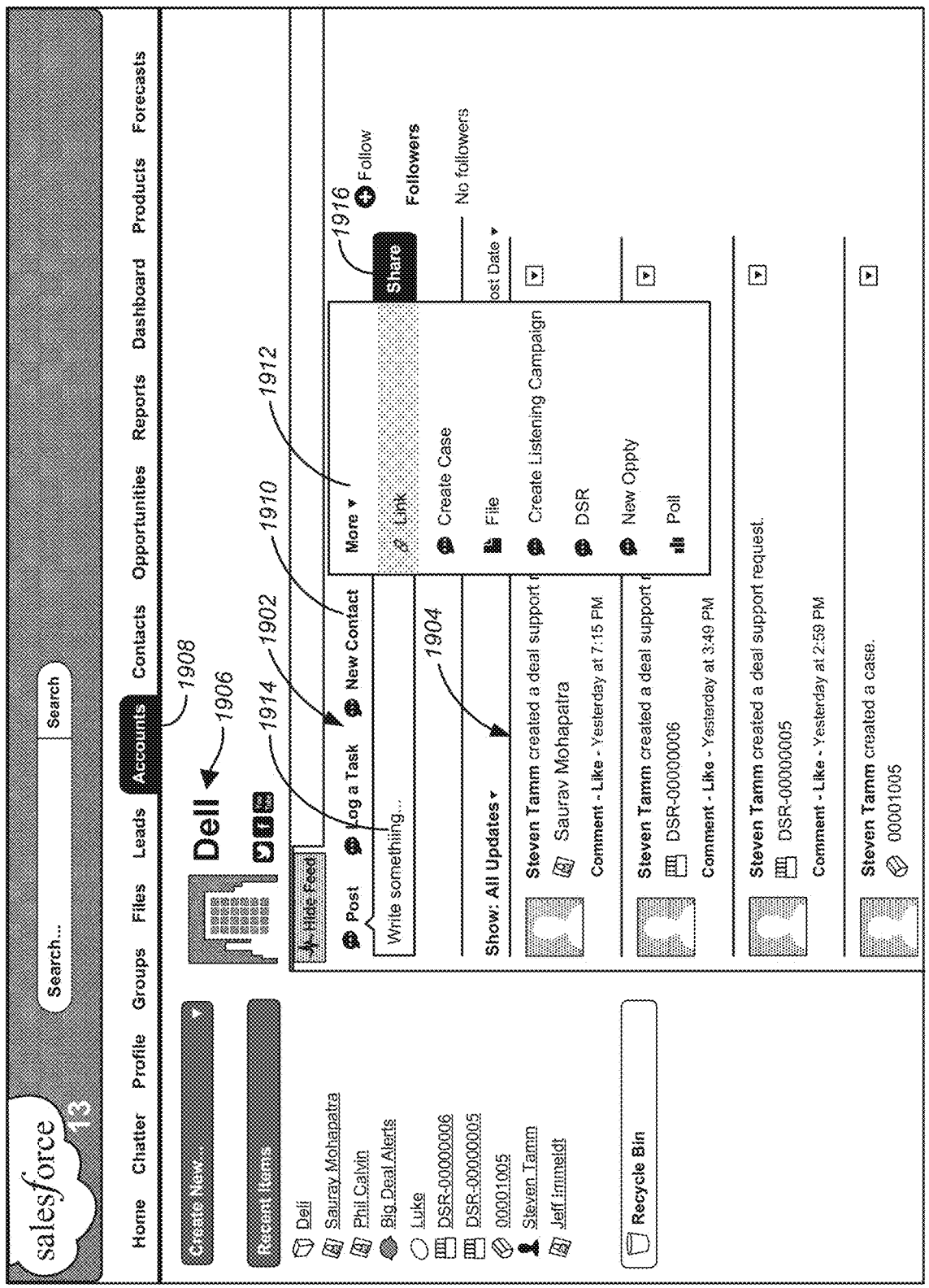
FIG. 19 shows an example of a record with a user interface including a publisher and an information feed, according to some implementations.

FIG. 19 shows an example of a record with a user interface including a publisher 1902 and an information feed 1904, according to some implementations. In FIG. 19, an accounts page 1906 for Dell is in the form of a graphical user interface (GUI) as displayed on a display device. A user may navigate to the accounts page 1906 by selecting a tab 1908 from among a plurality of tabs in the user interface. A request to interact with a record may be generated in response to a user selecting a button, link, tab, or menu selection in the publisher 1902. In some implementations, the record may be related to a parent record that is associated with the accounts page 1906. The publisher may include one or more publisher actions 1910 to allow a user to make a request to interact with the record. Examples of such publisher actions 1910 as displayed in the publisher 1902 include "Post", "Log a Task", and "New Contact". As illustrated in the example in FIG. 19, selecting "More" initiates a drop-down menu 1912 to allow a user to select from more publisher actions 1910 to interact with a record. Such additional publisher actions 1910 include "Link", "Create Case", "File", "Create Listening Campaign", "DSR", "New Oppty", and "Poll". In addition, the publisher 1902 in the accounts page 1906 includes a text box 1914 for entry of a message. The publisher 1902 also includes a share button 1916 to transmit data from the publisher 1902, including the message in the text box 1912, to one or more computing devices and stored in one or more database systems. Some of the data may be presented in a feed item in the information feed 1904 in response to the transmission of data from the publisher 1902.

Figure 20:
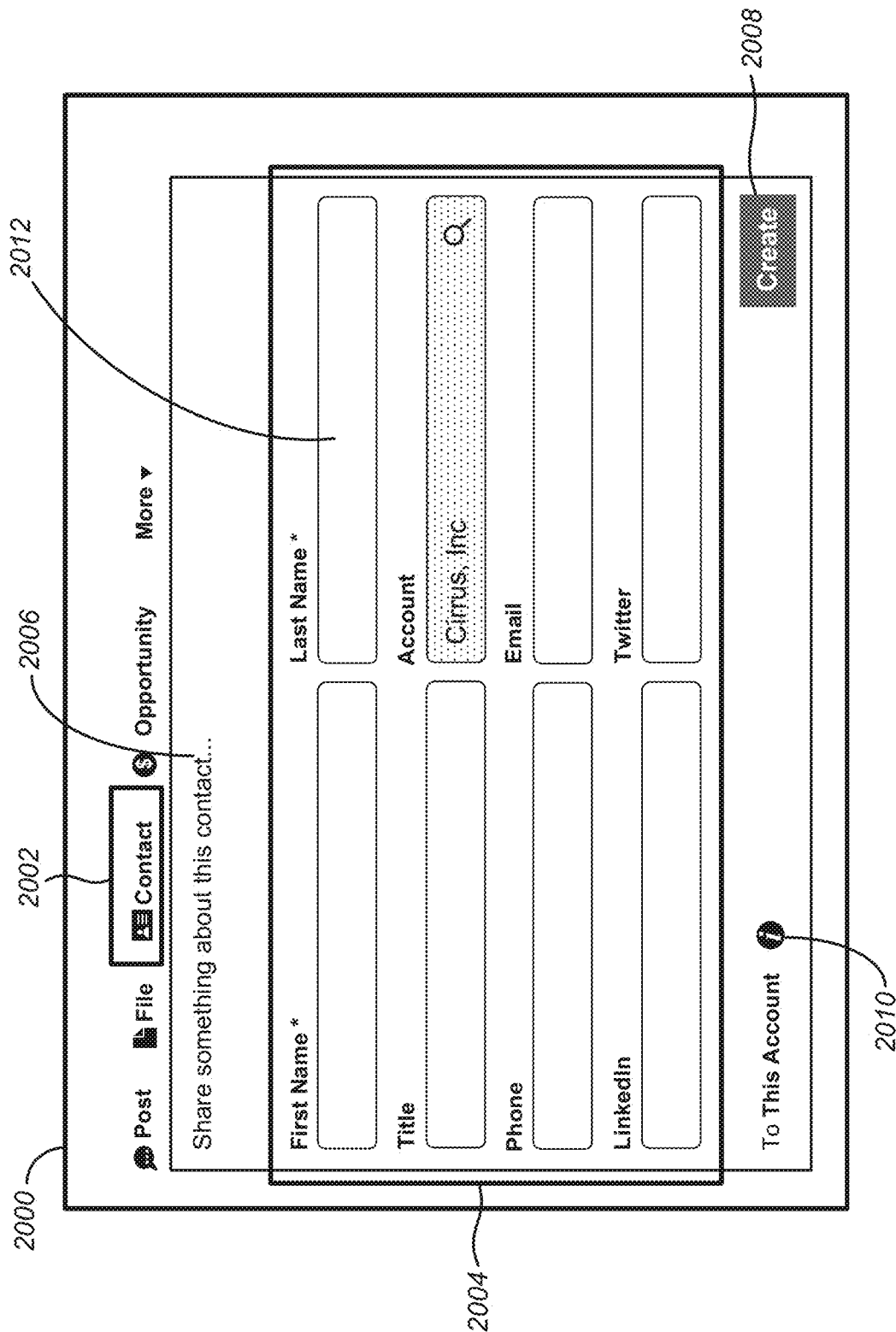
FIG. 20 shows an example of a publisher, according to some implementations.

FIG. 20 shows an example of a publisher 2000, according to some implementations. The publisher 2000 is an interface that allows a user to publish information that will be published into a feed. The publisher 2000 may provide an interface displaying any one of a variety of designs or layouts, which can be programmed according to different preferences or requirements. For example, the interface of the publisher 2000 may vary depending on whether the publisher 2000 is being displayed on a web page, on a mobile device, on an automobile display, etc. Regardless of the design or layout of the interface, the publisher 2000 can communicate with the same application programming interface (API) to perform the basic functionality of the publisher 2000 of publishing information into a feed.

An example of an interface for the publisher 2000 is shown in FIG. 20. The publisher 2000 may include a plurality of publisher actions 2002, a publisher space 2004, a message body 2006, a publishing button 2008, and a share dropdown menu 2010. Each of the publisher actions 2002 may be in the form of GUI buttons, links, tabs, channels, or menu items. Publisher actions 2002 may be enabled by the API for the publisher 2000. Moreover, publisher actions 2002 may be configured to perform a create or update operation for or with reference to a record.

Selection of one of the publisher actions 2002 may cause the publisher space 2004 to display data associated with the publisher action 2002. By way of example, the publisher space 2004 can include a form having a plurality of data fields 2012 for creating a new contact, as illustrated in FIG.

20. In another example, the publisher space 2004 may include content from one or more data sources, such as a web page. In still another example, the publisher space 2004 may expose data from an application hosted on a third-party platform, such as Heroku™.

Data provided in the publisher space 2004 may be published into an information feed. In FIG. 20, the plurality of data fields 2012 allows a user to input information related to the creation of a new contact. Some of the data fields 2012 may be greyed out with default values provided. Some of the data fields 2012 may be starred to indicate that they are required fields. Such information in the data fields 2012 may be published along with a message provided in the message body 2006. The message can include any alpha-numeric or other character-based user inputs such as words, phrases, statements, questions, emotional expressions, and/or symbols. Selection of the publishing button 2008 publishes the information provided in the data fields 2012 and the message body 2006 to appropriate information feeds. What entities the user wishes to share such information with can be provided by selection of entities from the share dropdown menu 2010.

FIGS. 21A-21D show an example of a user interface with a publisher 2108 and an information feed 2104 for mobile device applications, according to some implementations. An API enables the publisher 2108 to interface with a database system for any number of applications, including mobile device applications. In some implementations, an entity may develop the API for the publisher 2108 so that any customer, partner, organization, or other user can write applications that utilize the API.

Figure 21A:
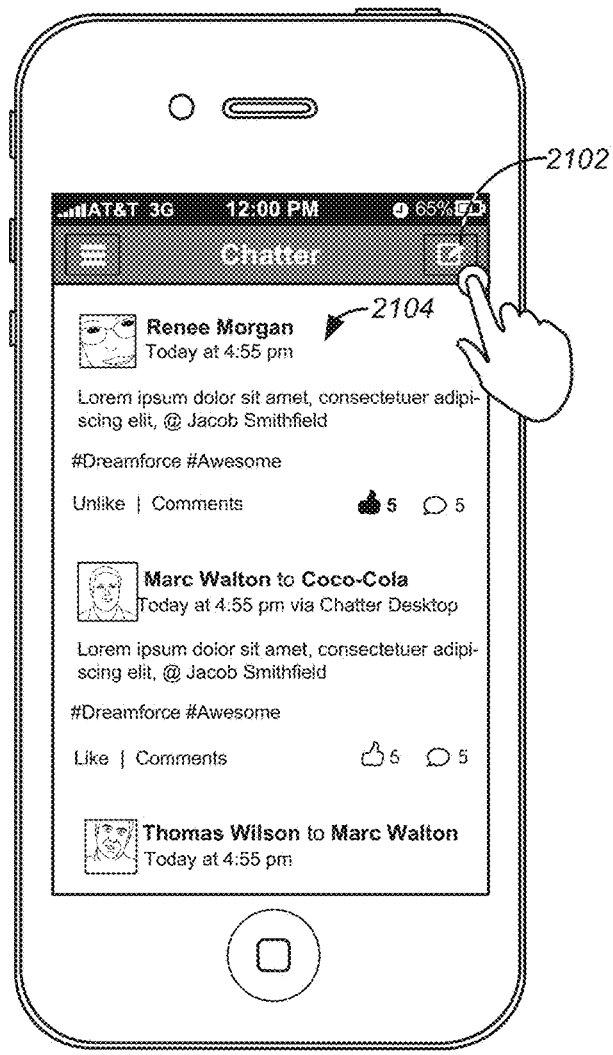
FIGS. 21A-21D show an example of a user interface with a publisher and an information feed for mobile device applications, according to some implementations.
Figure 21B:
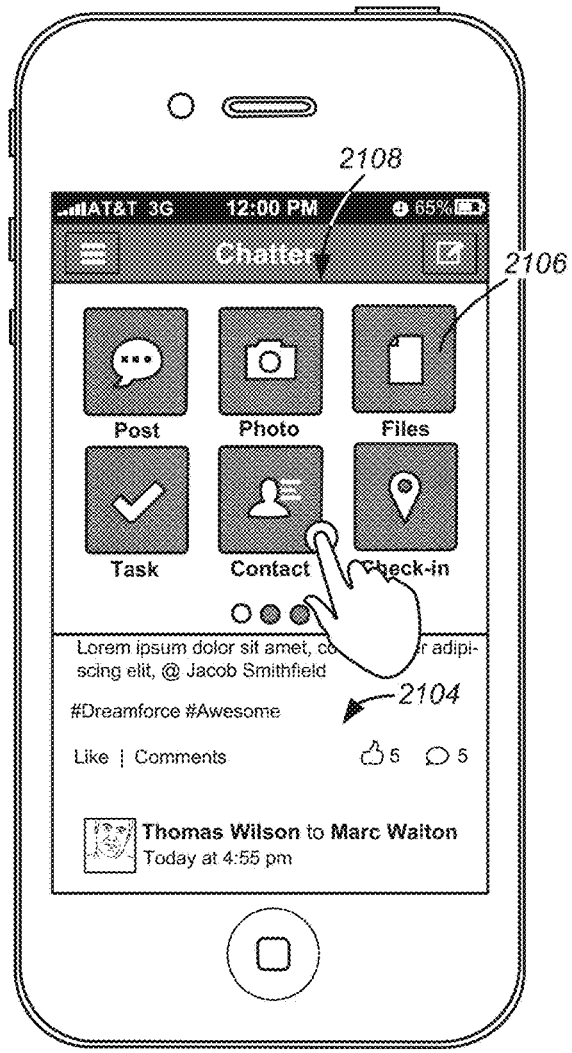
Figure 21C:
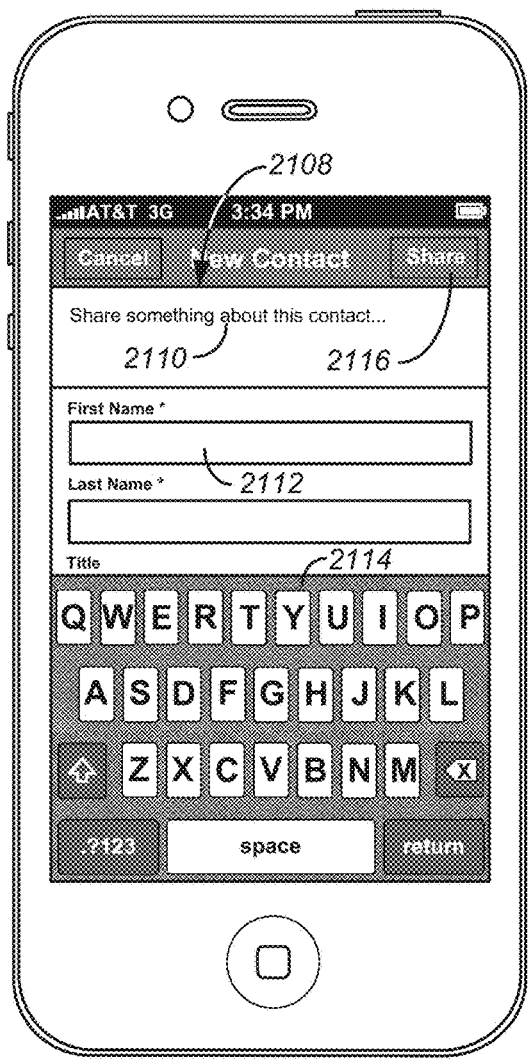
Figure 21D:
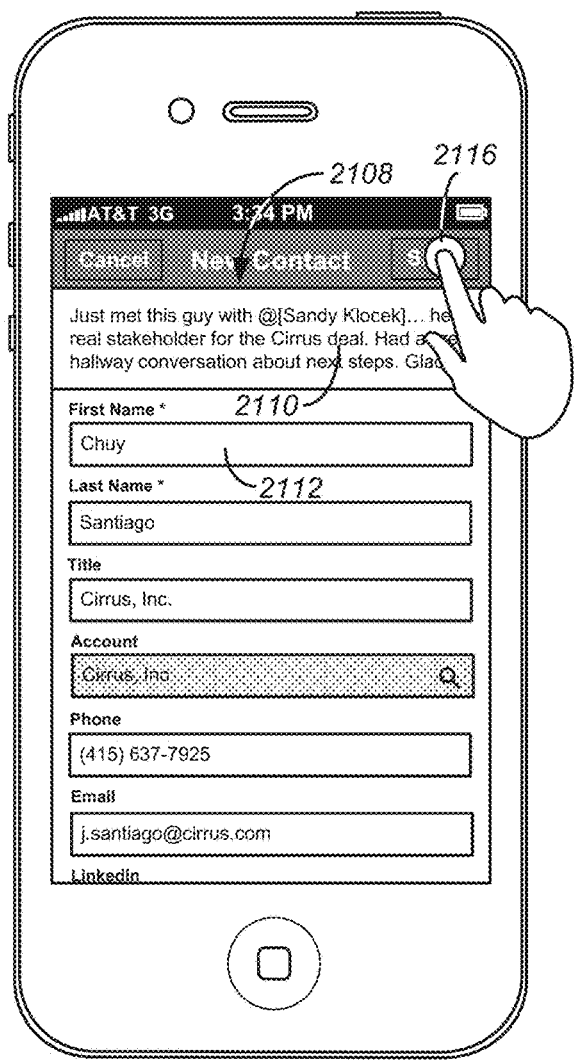

In FIG. 21A, a user interface for a mobile device may include a publisher button 2102 and an information feed 2104. The publisher button 2102 enables a user to access a publisher 2108 shown in FIG. 21B. The publisher 2108 may cover over a portion of the information feed 2104 in the user interface of the mobile device. The user may select from among a plurality of publisher actions 2106 in the publisher 2108. Publisher actions 2106 include "Post", "Photo", "Files", "Task", "Contact", and "Check-In". Selection of a publisher action 2106 may cause the publisher to display content and/or data fields associated with the publisher action 2106. As shown in FIG. 21C, selection of the contact publisher action 2106 causes the publisher 2108 to display a text box 2110 for posting a message and a plurality of data fields 2112 for creating a new contact. In some implementations of mobile device applications, selection of the publisher action 2106 causes the user interface to display a keyboard 2114. After populating the data fields 2112 and text box 2110 with information, a user may select the share button 2116 to publish the information to one or more appropriate feeds.

Figure 22:
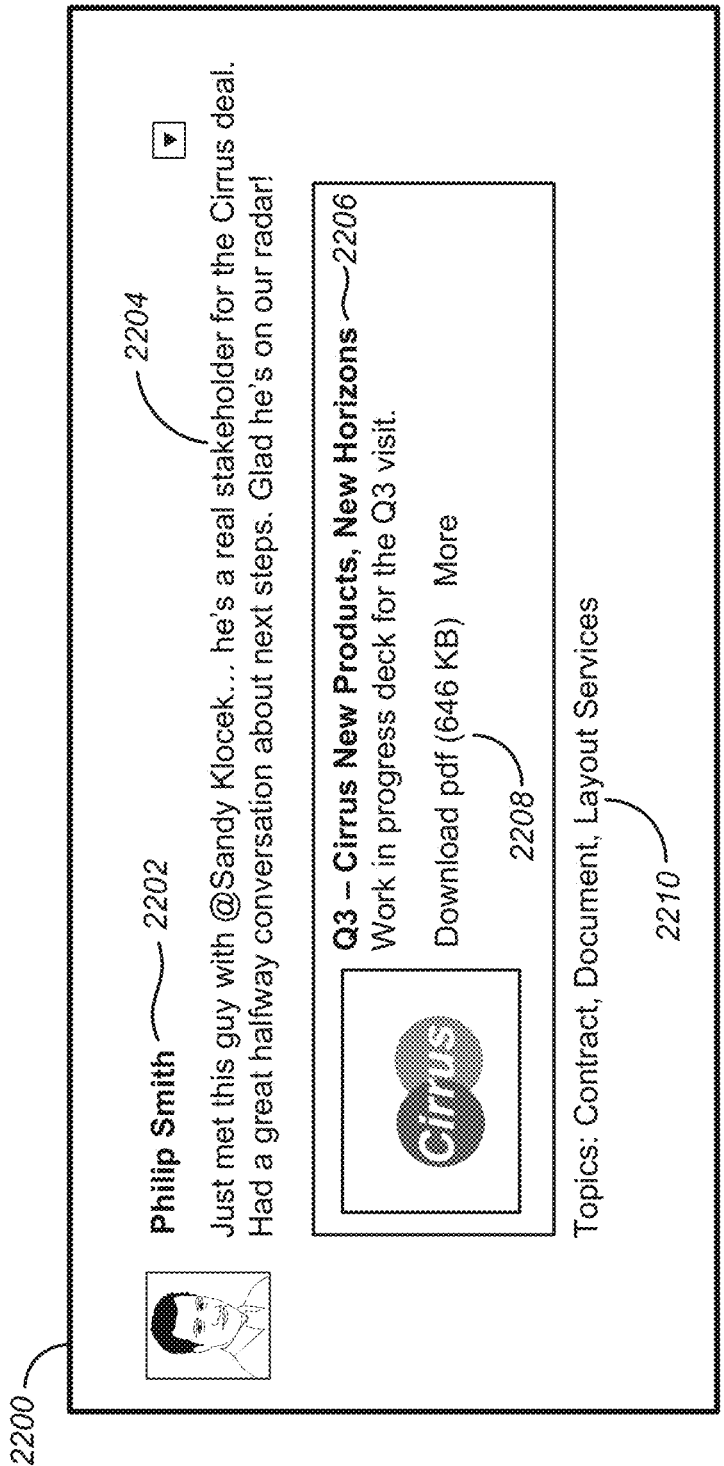
FIG. 22 shows an example of a feed item, according to some implementations.

A publisher may be configured to publish information to one or more information feeds by creating a visual feedback element, such as a feed item. FIG. 22 shows an example of a feed item 2200, according to some implementations. The feed item 2200 may include data submitted from a publisher. The feed item 2200 may appear as part of an information feed in a user interface. Here, the feed item 2200 includes the identity of the entity 2202 updating or creating the record, a message 2204 accompanying data from the publisher, the name of the record 2206 being updated or created, an attachment 2208, and topics 2210. Other data from the publisher may also be presented in the feed item 2200. In some implementations, the name of the record 2206 may be an actionable selection or link that causes the user interface to display a page layout for the record. What information is displayed in the feed item 2200 may depend on contextual factors, such the profile of the entity viewing the feed item 2200 and the page layout on which the feed item 2200 is displayed.

Figure 23A:
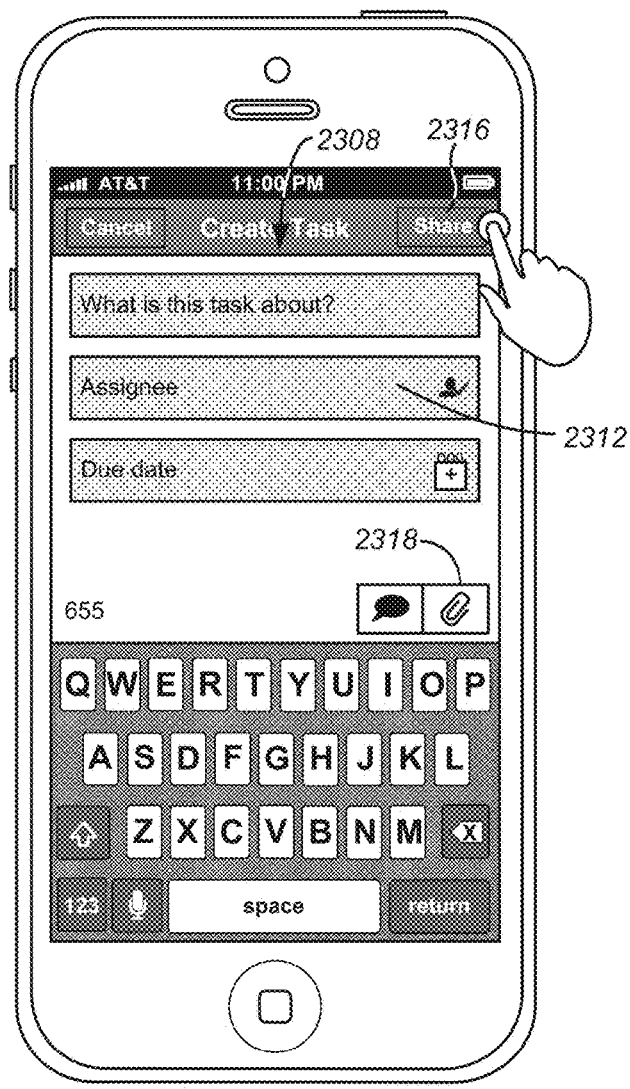
FIGS. 23A-23B show an example of a user interface with a publisher and a feed item in an information feed for mobile device applications, according to some implementations.
Figure 23B:
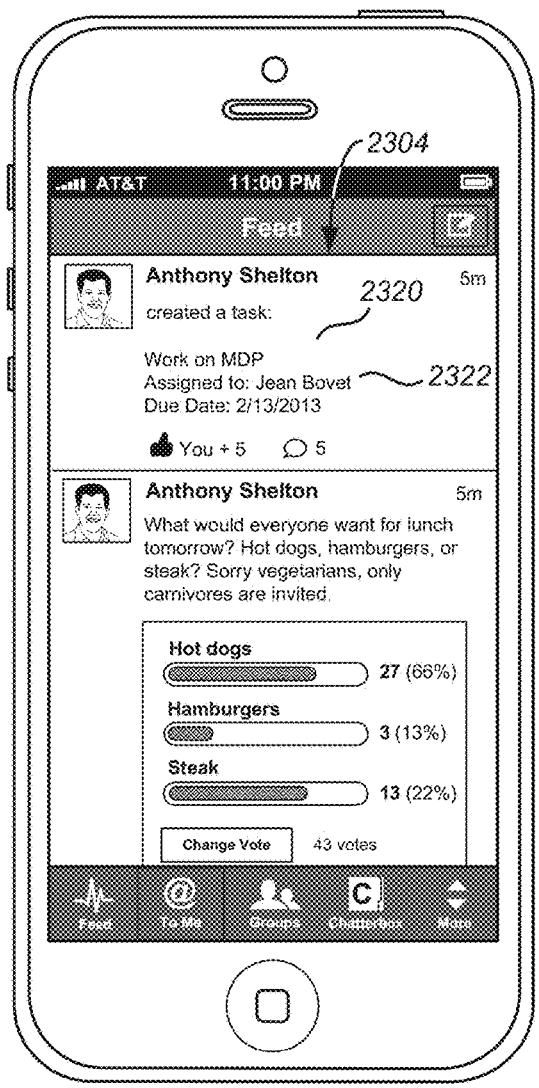

FIGS. 23A-23B show an example of a user interface with a publisher 2308 and a feed item 2320 in an information feed 2304 for mobile device applications, according to some implementations. Similar to the publisher 2108 described in FIGS. 21A-21D, the publisher 2308 allows a user to input information into data fields 2312 and publish such information to an information feed 2304 using the share button 2316. The publisher 2308 may include additional publisher buttons 2318, such as an attachment button and a message post button to accompany the published information. In FIG. 23B, a feed item 2320 containing at least some of the information from the publisher 2308 may be presented in the information feed 2304. Here, field data 2322 is provided in the feed item 2320 for a task provided from the data fields 2312 in the publisher 2308.

Returning to FIG. 15, at block 1508, a request to interact with a first record is received from the publisher at the one or more computing devices cooperating to perform the method 1500. The first record is related to a parent record stored in the database system. The request at block 1508 may be received from an entity via the publisher, such as a user who has a user profile in the online social network, via the user's smartphone, desktop, laptop, tablet, or other mobile computing device. In other instances, the request may be received from a group, an organization, or a record in the online social network.

In some implementations, the method 1500 may further include determining that the entity has permission to interact with the first record. Conventionally, CRM systems limit the interaction with records to system administrators and owners of the records. As such, other users or groups cannot directly interact with a record without the assistance or permission of an owner or system administrator. Depending on the access permissions of an entity, limitations may be imposed on the types of records that the entity can interact with, and the page layouts that the entity is able to view for a specific type of record.

Determining whether an entity has permission to interact with the first record can at least include identifying one or more entity attributes of a profile of the entity. Attributes of the profile of an entity can include, for example, an entity's role or definition, an entity's relationship information, an entity's preferences, an entity's usage patterns, and other metadata associated with an entity's profile. For example, an entity's role can indicate membership to a team that collaborates on a certain account record, and permission to interact with a record can be determined if the entity is a collaborator to that account record. In another example, an entity's role can indicate a job title in an organizational hierarchy. Depending on where the entity stands in the organizational hierarchy, the entity may or may not have permission to interact with a certain record.

Additionally, determining whether an entity has permission to interact with the first record can at least include identifying one or more record attributes of the first record. Attributes of the first record can indicate the type of record, such as whether the record is a lead, a case, an account, an opportunity, a task, an event, a contact, or a custom object. Attributes of the first record can also provide other metadata about the record. For example, a type of record can be a case, and the case can also be a technical issue case (e.g., bug) or an order processing case (e.g., deal) for an account. One entity may be permitted to interact with the technical issue case but not the order processing case, and vice versa.

Moreover, determining whether an entity has permission to interact with the first record can at least include comparing the one or more entity attributes with the one or more record attributes. For example, if an entity is identified as Vice President of Sales, then he can access and interact with all cases for an account. If an entity is identified as a Sales Associate, then he can access and interact with limited types of cases for an account, such as cases involving a particular product, for example.

In some implementations, even if an entity has permission to interact with the first record, the types of interactions can be limited. Such limitations can be established, for example, by a system administrator, an owner of the first record, or an organization's security/permissions policy, among others. In some implementations, an entity may be restricted to perform only certain actions for interacting with the first record. Thus, a publisher in the user interface may disable, hide, or otherwise not display at least some publisher actions from the entity. For example, one entity may be able to view, update, and create opportunities related to an account, and another entity may be able to only view and update opportunities related to the same account. In some implementations, an entity may be restricted to view only certain types of information or options for interacting with a record. For example, one entity may be able to update all the terms for a contract, and a different entity may be able to update only certain terms for the same contract. In another example, one entity may be able to view public and private information related to an account, and a different entity may be able to only view publicly available information related to the same account.

In some implementations, the request to interact with a first record may include a request to create a record, a request to delete a record, a request to update a record, a request to convert a record, a request to attach a file to a record, a request to download data from a record, a request to upload data to a record, a request to view information associated with a record, and a request to otherwise perform an operation having a reference to the record. For example, such operations can include but is not limited to drafting an email, approving or rejecting a workflow approval, writing a note, creating a poll, logging a call, logging a task, logging a bug, creating an event, sending an email, submitting an email for approval, posting to a portal, posting to a social network, adding a link, adding a "Thanks", etc. In some implementations, the first record may be a customer relationship management (CRM) object. A CRM object can include but is not limited to a lead, a case, an account, an opportunity, a task, a contact, a campaign, a contract, an event, a custom object, and a Visualforce page. The request to interact with the first record may be generated in response to a user selecting a publisher or custom action in the user interface.

The request to interact with the first record may be a request to interact with a child record related to a parent record stored in a database system. Here, the parent-child relationship refers to a hierarchical relationship among records in a database system. For example, an opportunity can be a child in relation to an account, while the account is the parent. In another example, a task can be a child in relation to a lead, while the lead is the parent.

Figure 24:
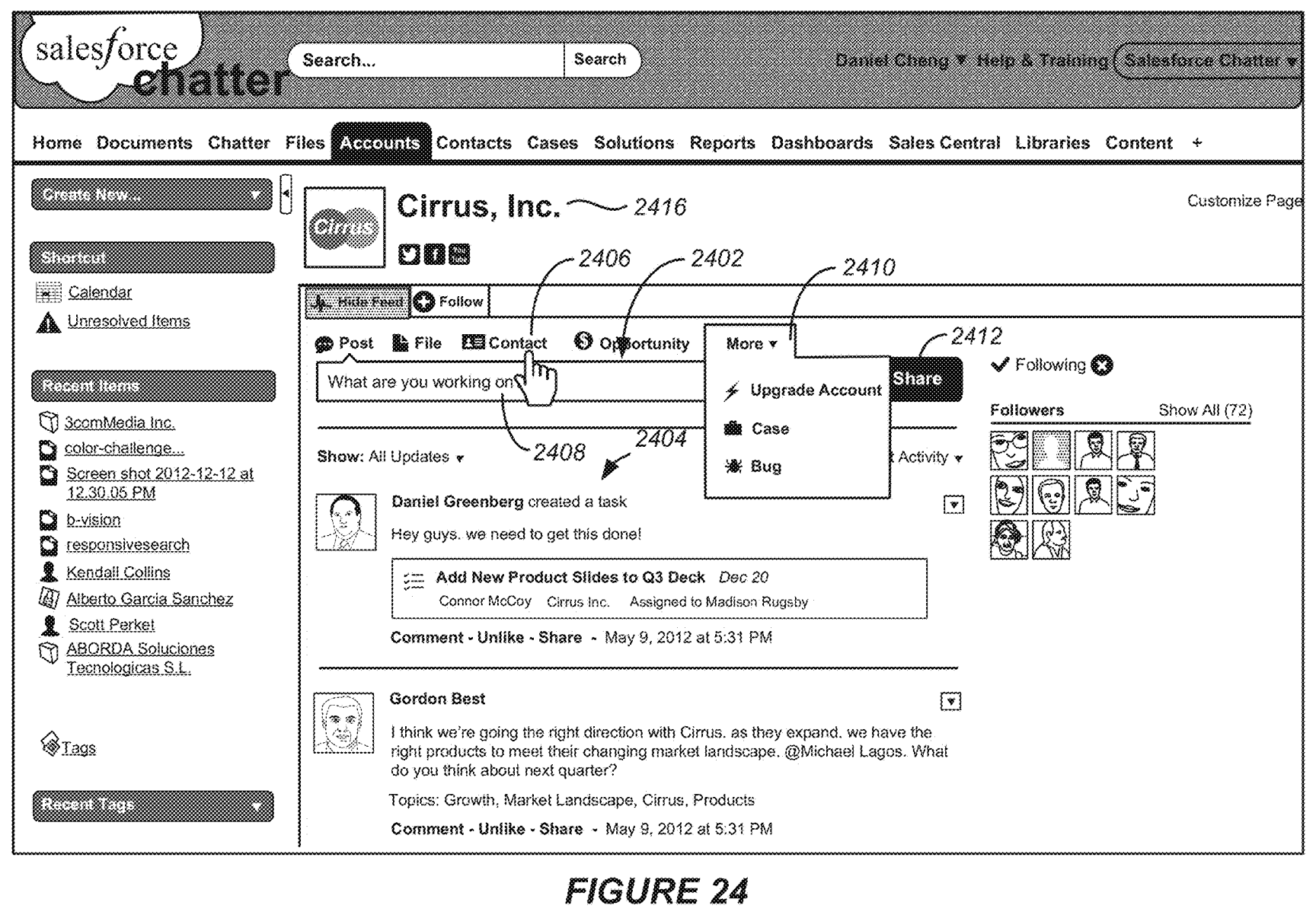

FIG. 24 shows an example of a record with a user interface including a publisher 2402 and an information feed 2404, according to some implementations. The publisher 2402 includes a plurality of publisher actions 2406, a text box 2408 for a message, a dropdown menu 2410 for displaying additional publisher actions 2406, and a share button 2412. The publisher 2402 may include at least one custom action from among the plurality of publisher actions 2406. The custom action may be an action enabled by the API for the publisher 2402. In some implementations, the custom action may be customized by an entity utilizing the API. Additional details regarding the customization of the custom action is provided in Section IX below.

In FIG. 24, an accounts page 2416 for Cirrus, Inc. includes the publisher 2402 with the plurality of publisher actions 2406. In some implementations, the same publisher 2402 may appear in other pages for different records and entities. In some instances, the publisher actions 2406 may even be the same. A user may navigate through multiple pages for different records and entities displaying a single or similar user interface.

Here, a user may initiate a request to interact with a record by selecting the publisher action 2406 "Contact" to initiate creation of a new contact. The new contact is a child record in relation to the account, and the account is the parent record. It is understood that any of the publisher actions 2406 may be selected to communicate with an API and initiate a request to interact with a record.

Returning to FIG. 15, at block 1512, first information associated with the first record is received from the publisher at the one or more computing devices. The first record may be stored or configured to be stored in a database system. The first information may be provided by the entity (e.g., user) requesting to interact with the first record at block 1508. The first information may be communicated to one or more computing devices performing the method 1500, for instance, as a signal network 14 in FIGS. 1A and 1B. In some implementations, the entity may provide field data in one or more data fields associated with a selected publisher action. For example, an event record may include field data such as date and time of the event, the names of invitees, and the venue. In another example, a task may include field data such as the name of the task, name or names of the assignee to the task, and a due date.

Figure 25:
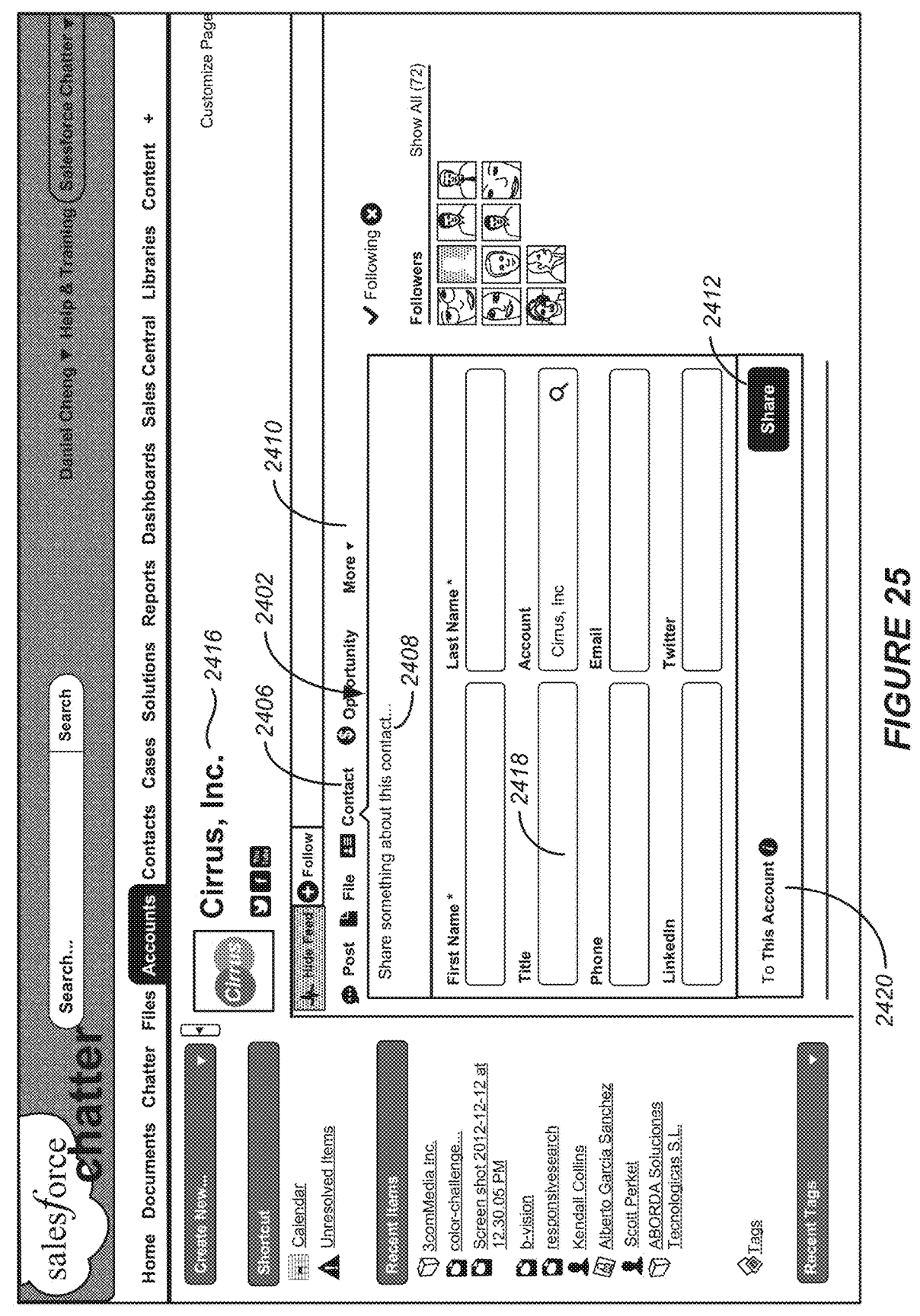

FIG. 25 shows an example of the record in FIG. 24 with a user interface displaying a plurality of empty data fields 2418 upon selection of a publisher action 2406, according to some implementations. As illustrated in FIG. 25, selection of the publisher action 2406 for creating a new contact causes the publisher 2402 to display data fields 2418, including First Name, Last Name, Title, Account, Phone, Email, LinkedIn, and Twitter. Some data fields 2418 for the creation of the new contact may be populated with default values, or even restricted with predefined values designated by a system administrator in accordance with a security clearance/permissions model. For example, the Account data field is restricted to establish a record relationship for the new contact with the parent record, namely the Cirrus, Inc. account. The publisher 2402 further displays a share dropdown menu 2420 for sharing the publisher information with one or more selected entities as well as a share button 2412 to publish the publisher information to one or more information feeds of at least the selected entities.

Figure 26:
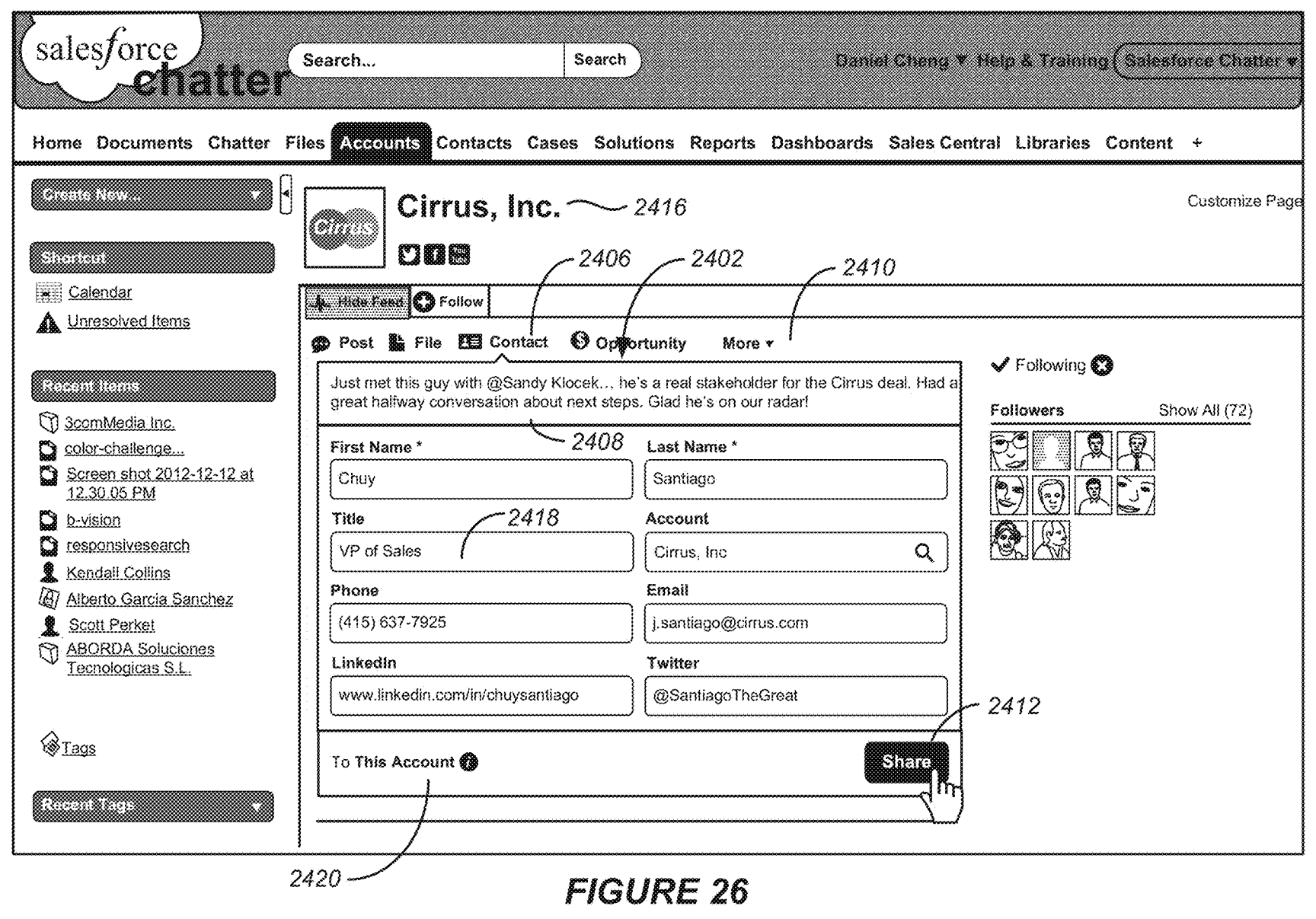

FIG. 26 shows an example of the record in FIG. 25 with a user interface displaying a plurality of filled data fields 2418 upon receiving user input, according to some implementations. A user may input values into each of the data fields 2418. In some implementations, the values in each of the data fields 2418 may be machine- or system-generated. The values in each of the data fields 2418 may be retrieved from database services such as data.com® or database- .com™. The values in each of the data fields 2418 are used to perform the requested interaction with a record, namely to create a child record. Further, the values in each of the data fields 2418 provide information to be stored in a database system. A user may also include a message in the text box 2408, such as a comment, which may describe additional contextual information about the new contact. This can include why the contact is useful or significant. In this way, a user can use a publisher 2402 to simultaneously create a contact record and generate a comment to accompany the creation of the contact record. The message in the text box 2408 and the information in the data fields 2418 may be submitted via the publisher 2402 by selecting the share button 2412.

Returning to FIG. 15, at block 1516, the database system is updated based on the first information associated with the first record. Updates to the first record may include creation of the record, deletion of the record, editing data associated with the record, logging an action to the record, conversion of the record, attachment of a file to the record, downloading data from the record, uploading data to the record, viewing of information associated with the record, and otherwise performing an operation having a reference to the record. In other words, the first information associated with the first record at block 1516 is used to perform the requested interaction at block 1508. Upon receiving the first information, the one or more computing devices can create or update a row representing the first record in the database system. For example, in logging an action to the record, an update may be performed after an email is sent and then logged to the record, or after a post is submitted to an online social network like Twitter® or Facebook® and then logged to the record. In effect, the publisher can perform actions that have behaviors outside of the network domain of the record. Nevertheless, such actions are logged to the record.

At block 1520, a feed item associated with the update is presented for inclusion in an information feed in the user interface. The feed item includes one or more actionable selections providing a reference to the first record. The reference to the actionable selection can be a display component such as a menu, link, or graphical button. In some implementations, the reference to the first record can open a page in the user interface for the first record. In this way, a user can navigate to the first record directly from the feed item. It is not necessary for a user to navigate between records by navigating between different user interfaces.

In some implementations, the reference to the first record can perform further actions with respect to the first record. In addition to opening the first record, such actions may include but is not limited to creating a second record, deleting the first record, updating the first record, converting the first record, attaching a file to the first record, downloading data from the first record, uploading data to the first record, viewing information associated with the first record, and otherwise performing an operation having reference to the first record. More specifically, examples of actions may include creating a task, updating a task, creating an opportunity, updating an opportunity, creating a contact, updating a contact, creating a case, updating a case, creating an account, updating an account, creating an event, updating an event, logging a call, logging a task, logging a bug, approving a workflow approval, rejecting a workflow approval, creating an email, writing a note, creating a poll, closing a case, completing a task, closing a bug, sending an email, submitting an email for approval, posting to a portal, posting to a social network, adding a link, and adding a "Thanks". Thus, actions may be performed directly from the feed item upon the first record without navigating to another page.

The one or more actionable selections may reference the publisher to provide more data fields that enables a user to further interact with the first record. In some implementations, selecting the one or more actionable selections may cause the publisher to be operable to receive second information. The second information may be used to perform one of the operations on the first record. Or, the second information may be used to interact with the second record. The second record may have a parent-child relationship with the first record. In some implementations, the second record is a child of the first record. In this way, providing a reference to perform further actions from the feed item allows a user to perform actions directly within the information feed itself.

Figure 27:
FIG. 27 shows an example of the record in FIG. 26 with a user interface including the information feed with a feed item presenting updated data from a publisher and a link to a child record, according to some implementations.

FIG. 27 shows an example of the record in FIG. 26 with a user interface including the information feed 2404 with a feed item 2422 presenting updated data from the publisher 2402 and a link 2424 to a child record, according to some implementations. The feed item 2422 is presented at the top of the information feed 2404 for the parent record. The feed item 2422 can include information regarding the interaction on the record that was performed. The feed item 2422 in FIG. 27 as displayed in the information feed 2404 of the accounts page 2416 indicates that the user "Daniel Cheng created a contact". In some instances, the feed item 2422 can include additional data provided in data fields 2418 in the publisher 2402. However, not all data provided in the data fields 2418 are necessarily contained in the feed item 2422. How such data is rendered in the feed item 2422 may depend on contextual factors, such as the profile of the user viewing the feed item 2422 and the page layout in which the feed item 2422 is displayed. The feed item 2422 also includes an actionable selection or link 2424 to the created or updated record. In FIG. 27, the newly created contacts record is displayed as a link 2424 "Chuy Santiago". A user may also perform various actions on the feed item 2422, including posting a comment to the feed item 2422, liking or disliking the feed item 2422, or sharing the feed item 2422. Such actions may affect the same feed item 2422 as presented in other related feeds.

A user may select the link 2424 to advance from the account record for Cirrus, Inc. to the contact record for Chuy Santiago. This allows a user to efficiently navigate to another record directly from the information feed 2404.

Returning to FIG. 15, at block 1524, a user input is received selecting the one or more actionable selections. The one or more actionable selections may be a menu, graphical button, or link configured to provide a reference to the first record. The reference to the first record may perform an action with respect to the first record, such as opening the first record in the user interface, creating a second record from the first record, updating the first record, deleting the first record, converting the first record, attaching a file to the first record, downloading data from the first record, uploading data to the first record, viewing information associated with the first record, or otherwise performing an operation having a reference to the first record. For example, the actionable selection can be a reply button to respond to an email. In another example, the actionable selection can be an approve button to respond to a workflow approval request. In some implementations, the reference to the first record may cause the publisher to be operable to receive second information associated with a second record.

At block 1528, second information associated with the first record or a second record is received from the publisher at the one or more computing devices. The second record may be a child record of the first record or of the parent record. The second record may be stored or configured to be stored in the database system. In some implementations, the second record may be a CRM object, such as a lead, a case, an account, an opportunity, a task, a contact, a campaign, a contract, an event, a custom object, and a Visualforce page. In some implementations, the second information may be provided in one or more data fields associated with the first record or the second record. The values in the one or more data fields may be user-defined or system-generated. In some implementations, values may be retrieved from a database service such as data.com® or database.com™.

At block 1532, the database system is updated based on the second information. Updates to the first record or second record may be made via the publisher without leaving the user interface, which can include the publisher and the information feed. Thus, multiple interactions may be performed with one or more records from a single user interface.

In FIG. 15, in one example, an app server 288 in the on-demand service environment 200 of FIGS. 2A and 2B includes one or more processors configured to perform part or all of blocks 1504-1532. In other instances, additional servers cooperate with app server 288 to perform the blocks. When first information, for example, is received at block 1512, such information can be received by a server over a data network from a user operating a user system 12 as shown in FIGS. 1A and 1B. In other instances, such data is received from a proxy server on behalf of a user or other data source. Various implementations of method 1500 are possible, such that any of the servers described above with reference to FIG. 2B or other computing devices disclosed herein can be configured to receive and process user inputs and information updates in accordance with method 1500.

In some implementations, interactions with multiple records through a common user interface can be exemplified in the method 1500 of FIG. 15. Such interactions can advance a CRM or non-CRM lifecycle while operating in the context of a publisher and an information feed. An example of a CRM lifecycle can be shown in FIGS. 24-27, as discussed earlier herein. Another example of a CRM lifecycle can be shown in FIGS. 28-30.

FIGS. 28-30 illustrate an example of stages of advancing a CRM lifecycle from a single user interface, which includes a publisher and information feed. FIG. 28 shows an example of a lead record with a user interface including a publisher 2802 and an information feed 2804, according to some implementations. For example, a service agent who met or knows a Mr. JimBob as a potential customer may access the Mr. JimBob Lead page 2816, as shown in FIG. 28. Determination of the permissions for the service agent to access the Mr. JimBob Lead can be based on the service agent's profile. Appropriate publisher actions and information may be retrieved from a database system and displayed on the Mr. JimBob Lead page 2816 according to the service agent's profile. As discussed earlier herein, some information and/or actions may not be available for certain users. As shown in FIG. 28, a plurality of publisher actions 2806 in the publisher 2802 is displayed on the left side bar as channels to perform an action on the Mr. JimBob Lead. Publisher actions 2806 include "Create a Task", "Crease a Case", "Convert Lead", "Write Lead Note", and "View Lead Details".

The service agent may select any one of the publisher actions 2806 to cause the publisher 2802 to display data fields 2818 associated with the selected publisher action 2806. In some implementations, selection of the publisher action 2806 may cause the publisher 2802 to display an application or content from a data source. In FIG. 28, some of the data fields 2818 are text boxes configured to receive character-based values, one of the data fields 2818 is a checkbox, and some of the data fields 2818 are dropdown menus. The service agent may input values into some of the data fields 2818 in the publisher 2802. In some of the data fields 2818, the service agent may perform a search query and/or utilize an auto-complete function to input values. In some implementations, default values may be provided in some of the data fields 2818.

The service agent may publish information entered into the data fields 2818 by selecting the Convert Lead button 2810. The information from the publisher 2802 may be submitted to a database system. The Mr. JimBob Lead is deleted and a Mr. JimBob Opportunity is created, where the Mr. JimBob Opportunity is stored in the database system. In some implementations, another record may be simultaneously interacted upon with the creation of the Mr. JimBob Opportunity. In this instance, a task is simultaneously created with the conversion of the Mr. JimBob Lead to the Mr. JimBob Opportunity. A feed item (not shown) is created for presentation in the information feed 2804. The feed item may provide functionality in the user interface to navigate to the Mr. JimBob Opportunity page or perform other actions with reference to the Mr. JimBob Opportunity from the information feed 2804. The navigation and/or actions can be performed without leaving the user interface. In other words, the service agent or another entity need not navigate through separate user interfaces to perform actions on one or more records. The feed item may be published in multiple related feeds through cross-referencing, which is discussed in more detail in Section XIII below.

FIG. 29 shows an example of an opportunity record converted from the lead record in FIG. 28, with a user interface including a publisher 2902 an information feed 2904, according to some implementations. The lead record is removed from the database system and replaced with the opportunity record. To navigate to the Mr. JimBob Opportunity page 2916, the service agent may select an actionable selection in a feed item. From there, appropriate publisher actions and information may be retrieved from a database system and displayed in the Mr. JimBob Opportunity page 2916 according to the service agent's profile. As shown in FIG. 29, a plurality of publisher actions 2906 in the publisher 2902 is displayed on the left side bar as channels to perform an action on the Mr. JimBob Opportunity. Publisher actions 2906 include "Create a Task", "Log a Call", "Create a Case", "Create a Service Contract", "Write Opportunity Note", and "View Opportunity Details". The service agent may select any one of the publisher actions 2906 to cause the publisher 2902 to display data fields 2918 associated with the selected publisher action 2906.

In FIG. 29, the service agent has selected the publisher action 2906 for creating a service contract, with data fields 2918 for the contract name, start date, and end date. The service agent may input values into each of the data fields 2918 in the publisher 2902.

The service agent may publish information entered into the data fields 2918 by selecting the Create Contract button 2910. The information from the publisher 2902 may be submitted to a database system. A service contract record is created and stored in the database system. This may be represented by a row in a table in the database system. The service contract record is related to the Mr. JimBob Opportunity as a child record to a parent record. A feed item (not shown) is created for inclusion in the information feed 2904.

The feed item may include functionality in the user interface to navigate to the service contract record or perform other actions with reference the service contract record from the information feed 2904. The navigation or actions can be performed without leaving the user interface.

FIG. 30 shows an example of the service contract record of the parent record in FIG. 29, with a user interface including a publisher 3002 and an information feed 3004, according to some implementations. To navigate to the service contract page 3016, the service agent may select an actionable selection in a feed item. From there, appropriate publisher actions and information may be retrieved from a database system and displayed in the service contract page 3016 according to the service agent's profile. As shown in FIG. 30, a plurality of publisher actions 3006 in the publisher 3002 is displayed on the left side bar as channels to perform an action on the service contract record. Publisher actions 3006 include "Add a Product", "Write Service Contract Note", and "View Service Contract Details". The service agent may select any one of the publisher actions 3006 to cause the publisher 3002 to display data fields 3018 associated with the selected publisher action 3006.

In FIG. 30, the service agent has selected the publisher action 3006 for adding a product, with data fields 3018 for the product, quantity, and sales price. The service agent may input values into each of the data fields 3018 in the publisher 3002.

The service agent may publish information entered into the data fields 3018 by selecting the Add button 3010. The information from the publisher 3002 may be submitted to a database system. A contract line item for a product is created and stored in the database system. This may be represented by a row in a table in the database system. The contract line item for the product is related to the service contract record as a child record to a parent record. A feed item (not shown) is created for presentation in the information feed 3004. The feed item may include functionality in the user interface to navigate to the contract line item or perform other actions with reference the contract line item from the information feed 3004. The navigation or actions can be performed without leaving the user interface.

A user can navigate and advance through a CRM lifecycle in a single and standardized user interface, as illustrated in FIGS. 28-30. Thus, a user does not need to navigate and learn multiple user interfaces to interact with each of the records through the CRM lifecycle. As records are created and/or updated, the user can immediately navigate and perform actions on the newly created or updated records through the information feed and the publisher. In other words, everything can be done through the information feed and the publisher in a CRM lifecycle.

In some implementations, the publisher and the information feed may also be utilized as a common user interface to advance a non-CRM lifecycle. By way of example, a financial services agent may receive a call from a customer regarding an investment. The financial services agent can input the customer information to access the customer's investment record. From the customer's investment record page, a user interface can include a publisher and an information feed. The financial services agent can add, remove, or update an investment in the customer's investment record via the publisher. A feed item is presented in the information feed of the customer's investment record with one or more actionable selections to the investment. The investment can include, for example, an IRA, a Roth IRA, or mortgage, among others. The financial services agent can access the investment through the feed item and continue to advance the non-CRM lifecycle.

In another example, a health insurance agent may receive a call from a customer regarding his or her insurance coverage. The health insurance agent may input the customer information to access the customer's health insurance plan. From the customer's health insurance plan page, a user interface can include a publisher and an information feed. In some implementations, a custom object may be provided with the user interface to represent the health insurance plan, coverage, product, limits, and coverage figures. Depending on the coverage that the customer is interested in, the health insurance agent can add, remove, or update the customer's health insurance plan via the publisher. This can include adding or removing products in the health insurance plan. This can also include updating limits and coverage figures. A feed item is presented in the information feed of the customer's health insurance plan with one or more actionable selections to the product or coverage. The health insurance agent can access the product or coverage through the feed item and continue to advance the non-CRM lifecycle.

In another example, a user may want to file an expense report under an account. The user may access the account record, where the user interface of the account record includes a publisher and an information feed. In some implementations, the publisher may expose a third-party application, such as Concur®, for expense reporting. In some implementations, the publisher may include a custom action, such as "File New Expense Report". The user may file the expense report via the publisher and publish the information into the information feed as a feed item. The feed item may include one or more actionable selections to link to the newly created expense report. The user may access the expense report through the feed item to advance the non-CRM lifecycle.

XIII. Cross-Referencing of Feed Items

Figure 16:
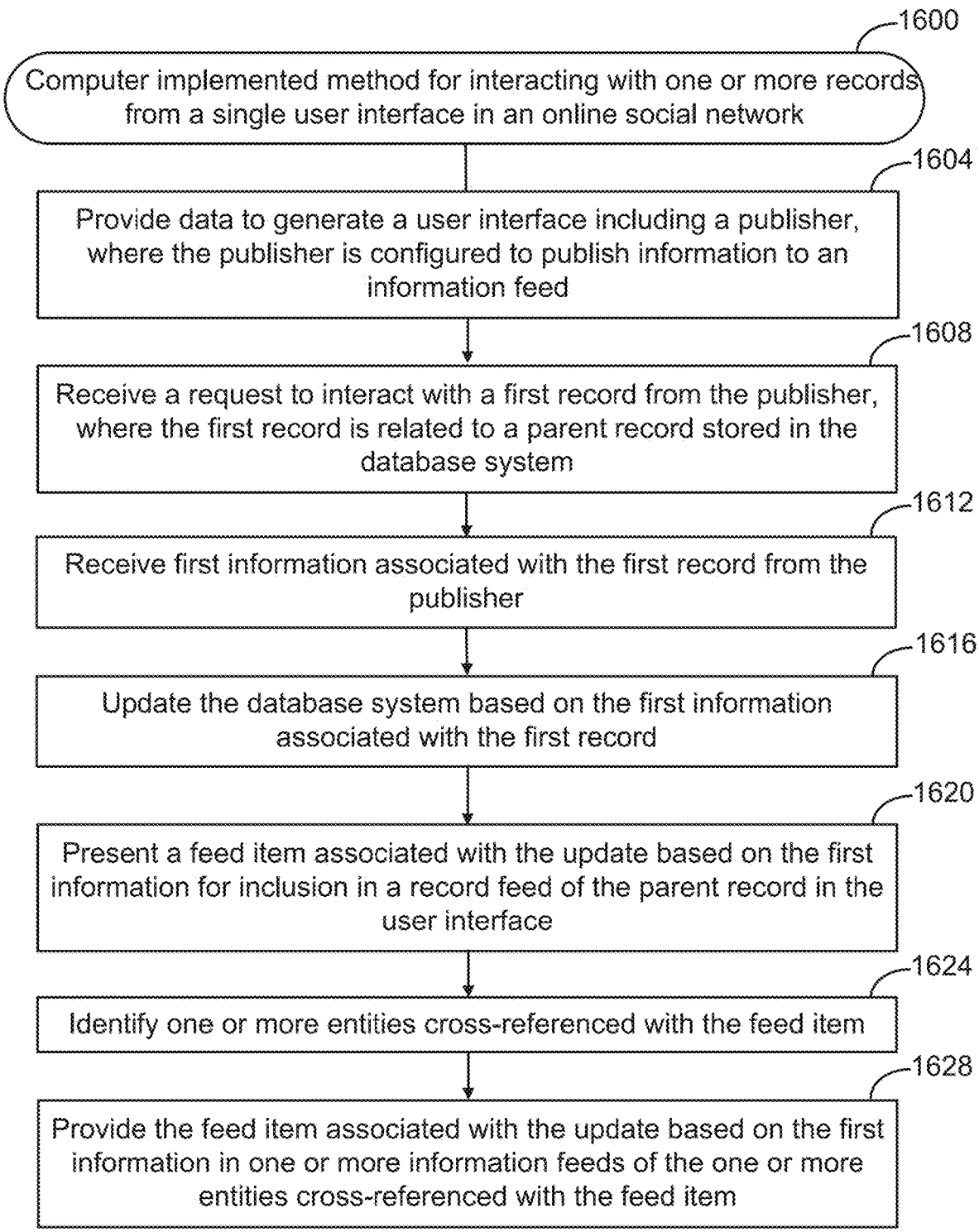
FIG. 16 shows a flowchart of an example of a computer implemented method 1600 for interacting with one or more records from a single user interface in an online social network, performed in accordance with some implementations.

FIG. 16 shows a flowchart of an example of a computer implemented method 1600 for interacting with one or more records from a single user interface in an online social network, performed in accordance with some implementations. FIG. 16 may be described with reference to FIGS. 31, 32A-32C and 33A-33C. At block 1604, data is provided to generate a user interface including a publisher, as generally described above at block 1504 of the method 1500. At block 1608, a request to interact with a first record is received from the publisher, as generally described above at block 1508 of the method 1500. The first record may be related to a parent record stored in a database system. At block 1612, first information associated with the first record is received from the publisher, as generally described above at block 1512 of the method 1500. At block 1616, the database system is updated based on the first information associated with the first record, as generally described above at block 1516 of the method 1500.

At block 1620, a feed item associated with the update based on the first information is presented for inclusion in an information feed of the parent record in the user interface. The feed item may provide a visual feedback element representing the first information from the publisher in the information feed of the parent record. While the feed item may be presented for inclusion in a number of different feeds, as will be discussed in more detail below, the feed item may be at least presented for inclusion in the information feed of the parent record. In some implementations, the feed item may include one or more actionable selections providing a reference to the first record. As a result, a user can navigate to the first record directly from the feed item. In some implementations, the reference to the first record can perform further actions with respect to the first record. Such actions may include creating a second record, deleting the first record, updating the first record, converting the first record, attaching a file to the first record, downloading data from the first record, uploading data to the first record, viewing information associated with the first record, and otherwise performing an operation having reference to the first record (e.g., logging a call, creating an email, approving or rejecting a workflow approval, etc.). In some instances, selecting the one or more actionable selections may cause the publisher to be operable to receive second information.

Figure 31:
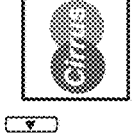
FIG. 31 shows an example of a record with a user interface displaying a feed item in an information feed of a parent record, according to some implementations.

In FIG. 31, a feed item 3122 is presented for inclusion in an information feed 3104 for a parent record as shown in the accounts page 3116. After a user Daniel Cheng creates a new contact (child record), the feed item 3122 is published at the top of the information feed 3104 for the account (parent record). The feed item 3122 includes an actionable selection or link 3124 to the newly created contact "Chuy Santiago". A user may also perform various actions on the feed item 3122, including posting a comment on the feed item 3122, liking or disliking the feed item 3122, or sharing the feed item 3122. Such actions may affect the same feed item 3122 as presented in other related feeds. A user may select the link 3124 to advance from the account record for Cirrus, Inc. to the contact record for Chuy Santiago.

Returning to FIG. 16, at block 1624, one or more entities cross-referenced with the feed item are identified. Cross-referencing of feed items can be achieved in a number of ways. Identification of cross-referenced entities can be obtained from cross-referencing data. In some implementations, such cross-referencing data may be received from an API. The number of cross-referenced entities may be limitless, and each of the cross-referenced entities may be defined by a payload in the API. For example, a user may define the cross-referencing data in the payload of the API. In some implementations, the API is utilized by the publisher to provide the payload and the cross-referencing data.

In some implementations, after receiving the request to interact with the first record, the publisher may be caused to display one or more data fields of the first record, the one or more data fields configured to receive the first information associated with the first record. At least one of the one or more data fields is configured to receive cross-referencing data defining the one or more entities to cross-reference with the feed item. The cross-referenced entities can include users, groups, organizations, and records. In some implementations, the cross-referencing data may be user-defined, such as defined by user input values in a payload.

In some other implementations, the cross-referencing data may be machine- or system-defined. In other words, identification of the cross-referenced entities may be hard-coded. For example, a system administrator or owner of the parent record can establish default values for the cross-referencing data. In some instances, the cross-referenced entities can include the first record and the parent record of the first record. In some instances, the cross-referenced entities can include the first record, the parent record of the first record, a child record of the first record, a user subscribing to the first record, the user interacting with the first record, and a user following the user interacting with the first record. It is understood that any number of combinations of the aforementioned entities may be cross-referenced with the feed item.

Identification of cross-referenced entities can be based at least in part on record relationship information, where the record relationship information can be retrieved from the database system. Record relationship information may indicate that a child record is related to one parent record or to multiple parent records. For example, record relationship information may indicate that a deal record is related to multiple account records in the database system. In some instances, the record relationship information may indicate that the child record is a parent record to further child records.

Record relationship information of the first record can help determine at least one of the one or more entities to be cross-referenced with the feed item. As the feed item is presented for inclusion in the information feed of the parent record of the first record, the feed item can be cross-referenced with other entities related to the parent record or the first record. What entities are related to the parent record and/or the first record can be provided by the record relationship information. For example, feed item can be cross-referenced with multiple parent records of the first record.

At block 1628, the feed item associated with the update is provided in one or more information feeds of the one or more entities cross-referenced with the feed item. Where the feed item is propagated can be based on cross-referencing data or record relationship information. The same feed item as displayed in the information feed of the parent record may be propagated and displayed across multiple users, groups, organizations, and records. As a result, a single conversation thread may be published multiple times in the information feeds of different users, groups, organizations, and records. Cross-referencing of a feed item across multiple users, groups, organizations, and records may be preferred over copying or re-posting the feed item in different places. By copying or re-posting the feed item in different places, actions taken on an original feed item are not typically published in a copy of the original feed item or a re-posting of the original feed item. This can lead to several different conversation threads on the original feed item and copies of the feed original feed item. By propagating the same feed item across multiple entities with cross-referencing, other users can interact with or otherwise perform an action on the feed item without having to navigate across multiple user interfaces. For example, collaborators for a particular record can interact with the feed item from their news feed, the record feed of the parent record, or the record feed of the first record if the feed item is cross-referenced with such entities.

By way of example, a user can create a new task. In creating the new task, the user can associate the task with an opportunity and with a case. In addition, the user can associate the task with 10 contacts. Upon creating the task by a publisher, information regarding the task is published to a feed item. The feed item is cross-referenced with the opportunity, the case, and each of the 10 contacts so that the feed item is propagated in the information feeds of each of those entities.

Typically, a feed item is published within the information feed of the parent record, as discussed earlier herein. However, the feed item may be propagated and published in other information feeds of cross-referenced or related entities. By way of example, if a user is creating a contact (i.e., child record) from an account (i.e., parent record) page, then the feed item can be propagated in at least the accounts record feed. In some implementations, the feed item can also propagated in the record feed of the newly created contact. In some implementations, the feed item can also be propagated in other records feeds of multiple parent records of the newly created contact. In some implementations, the feed item can also be propagated in the news feed of users subscribed to the parent record or the child record.

Figure 32A:
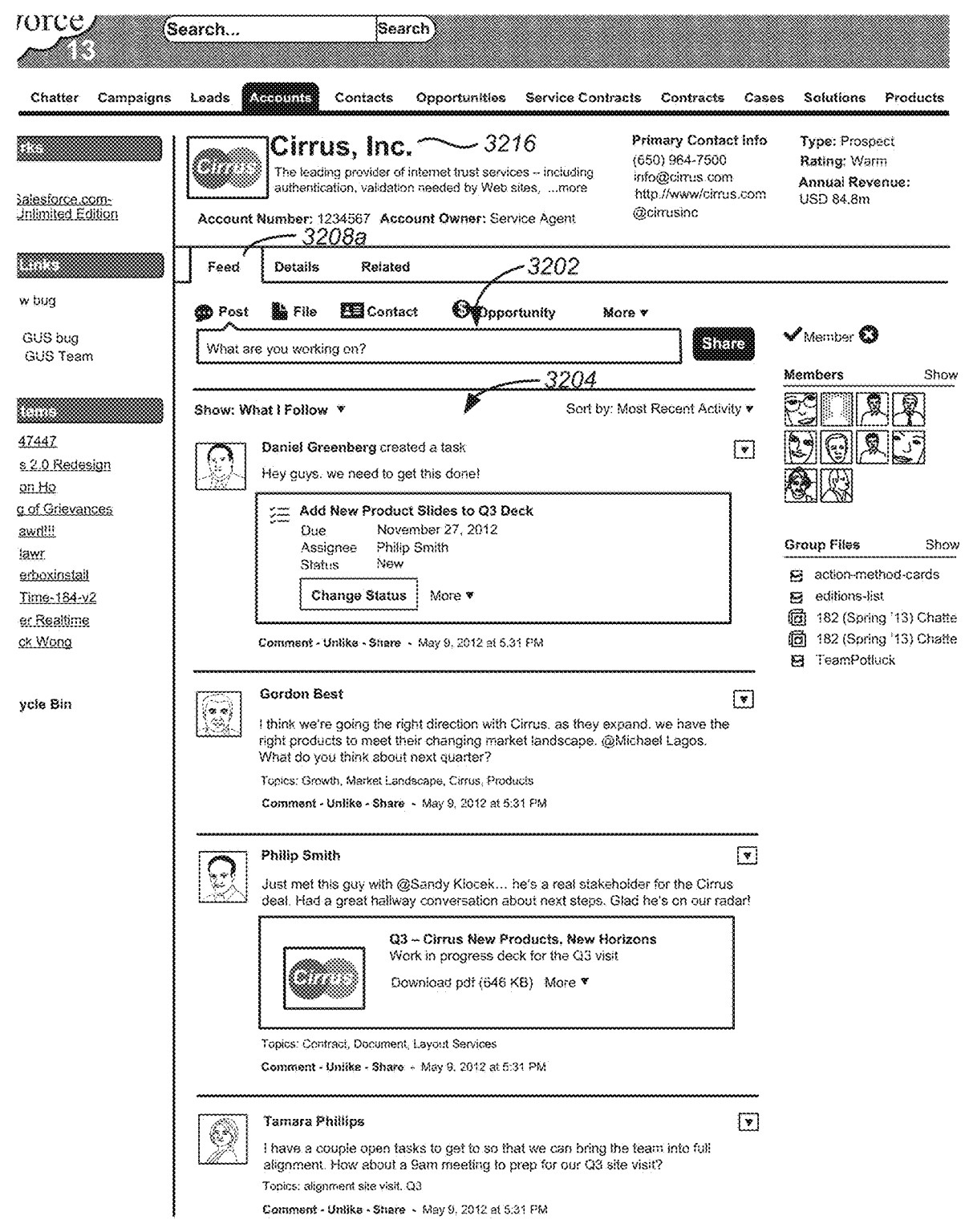
Figure 32B:
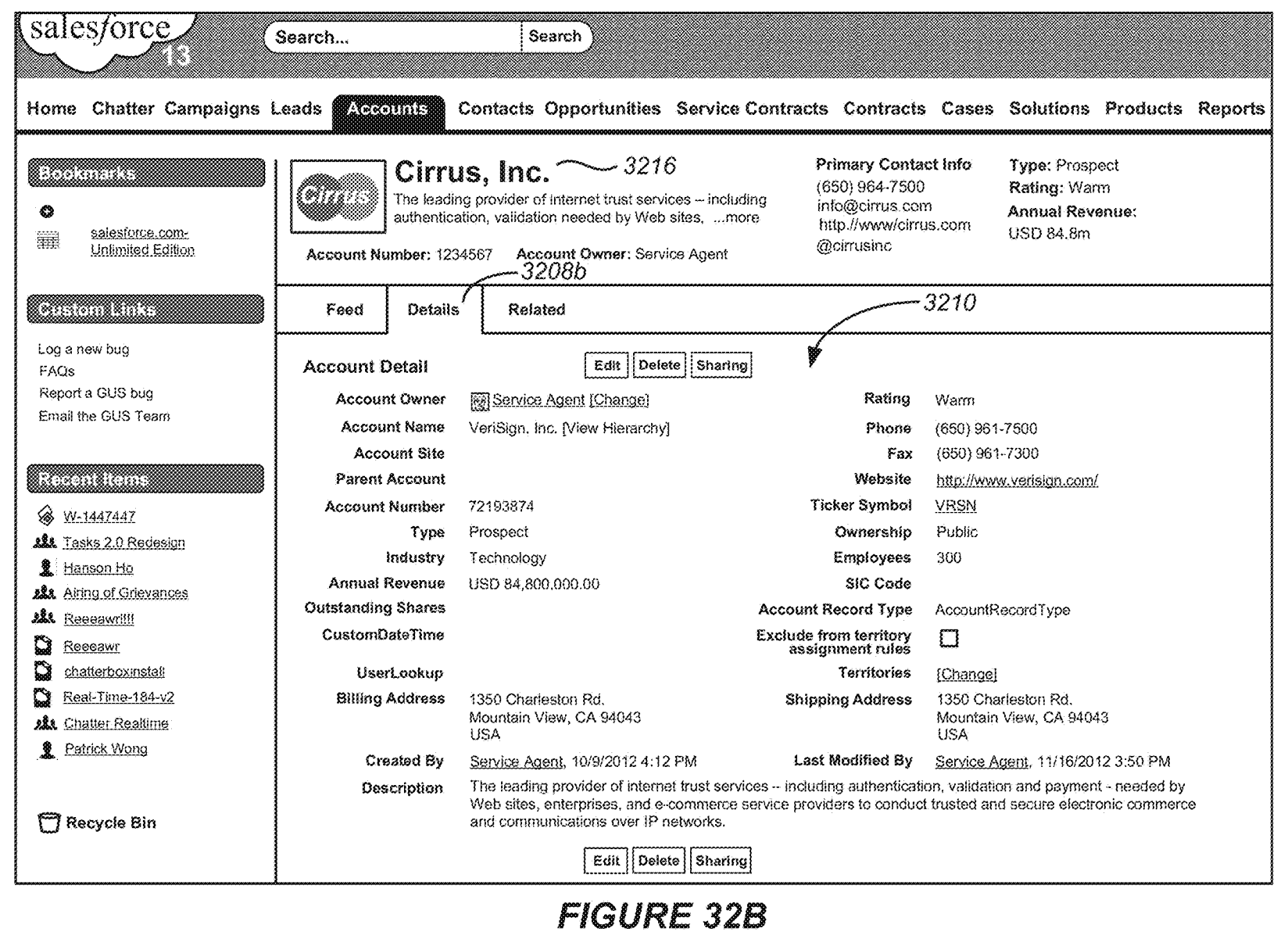
Figure 32C:
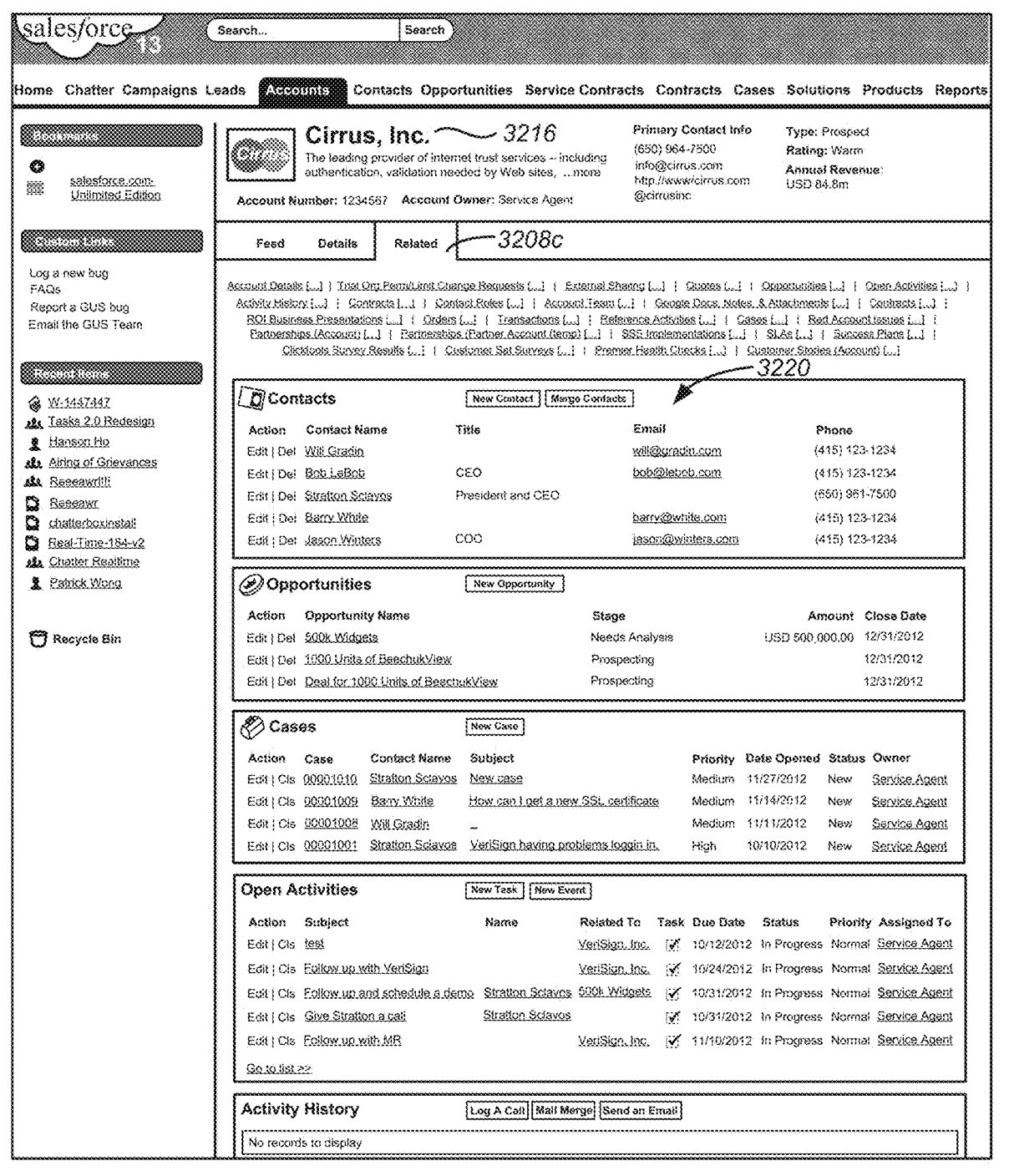

FIGS. 32A-32C show an example of a record with user interfaces displaying different information related to the record. In particular, the user interfaces may display information related to the information feed of the record, the record details, and the record relationship information.

FIG. 32A shows an example of a record with a user interface displaying the information feed 3204 for an account page 3216. The user interface also includes a publisher 3202. The information feed 3204 can be viewed by selection of a feed tab 3208a. The information feed 3204 can display a plurality of feed items showing messages, feed tracked updates, etc.

FIG. 32B shows an example of a record with a user interface displaying the record details 3210 for the account page 3216 in FIG. 32A. The record details 3210 can be viewed by selection of the details tab 3208b. The record details 3210 can provide information about the account itself and its parent record or records. Such information can also include links to related records, files, and websites. Here, the record details 3210 display general information about Cirrus, Inc., such as the account Owner, the Account Name, the Website, the Billing Address, the Shipping Address, etc. Depending on the access permissions of the user, the user may be limited in accessing and/or editing the record details 3210.

FIG. 32C shows an example of a record with a user interface displaying the record relationship information 3220 for the account page 3216 in FIG. 32A. The record relationship information 3220 can be viewed by selection of the related tab 3208c. The record relationship information 3220 can provide information listing the records that are related to the account record for Cirrus, Inc. For example, the record relationship information displays the plurality of child records related to the account record for Cirrus, Inc., including the contacts, opportunities, cases, tasks, and events associated with Cirrus, Inc. In some instances, identification of cross-referenced entities for a feed item can be based at least in part on the record relationship information 3220.

Figure 33A:
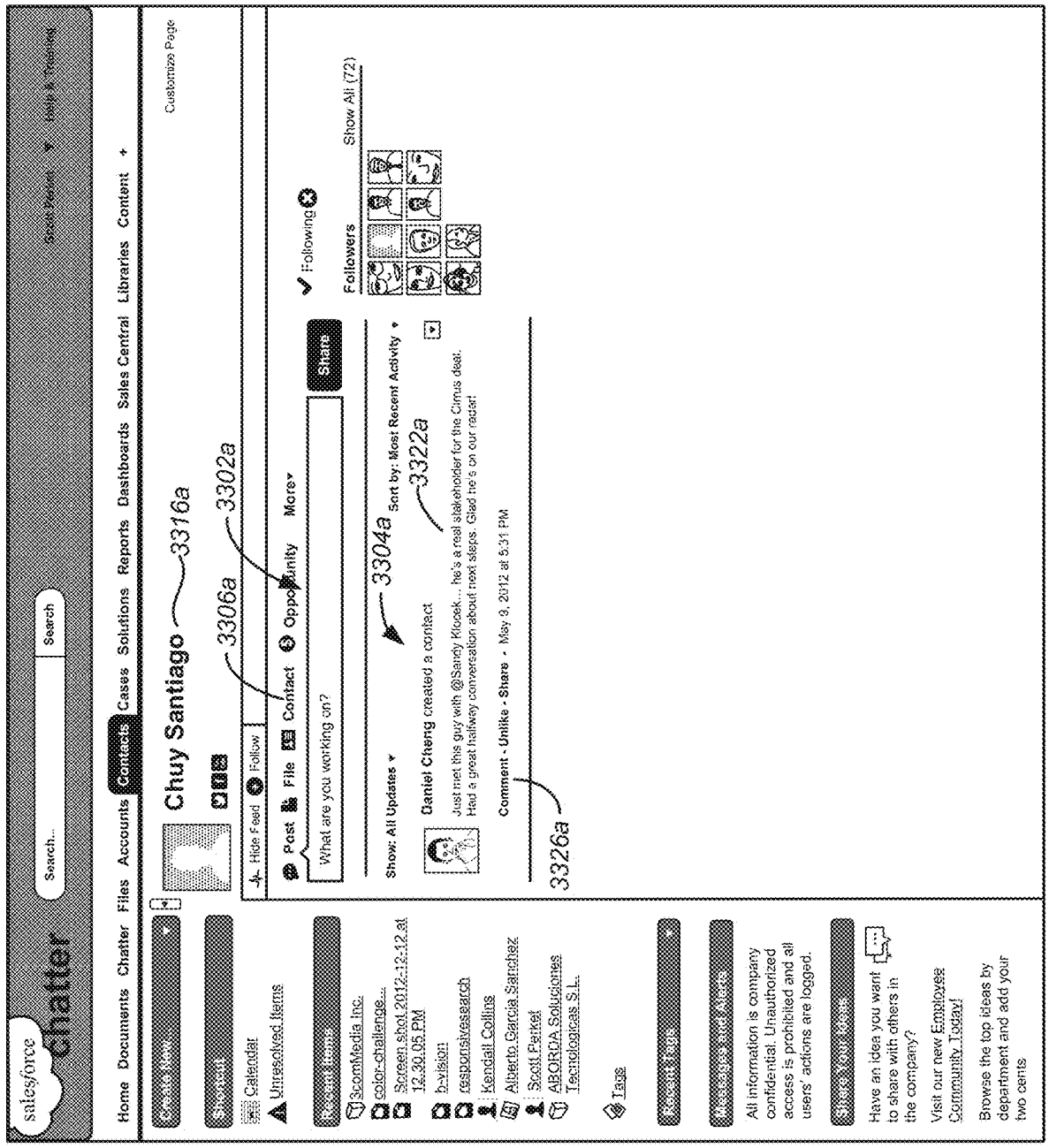
FIG. 33A shows an example of a contacts record with a record feed including a feed item presenting updated data from a publisher, according to some implementations.
Figure 33B:
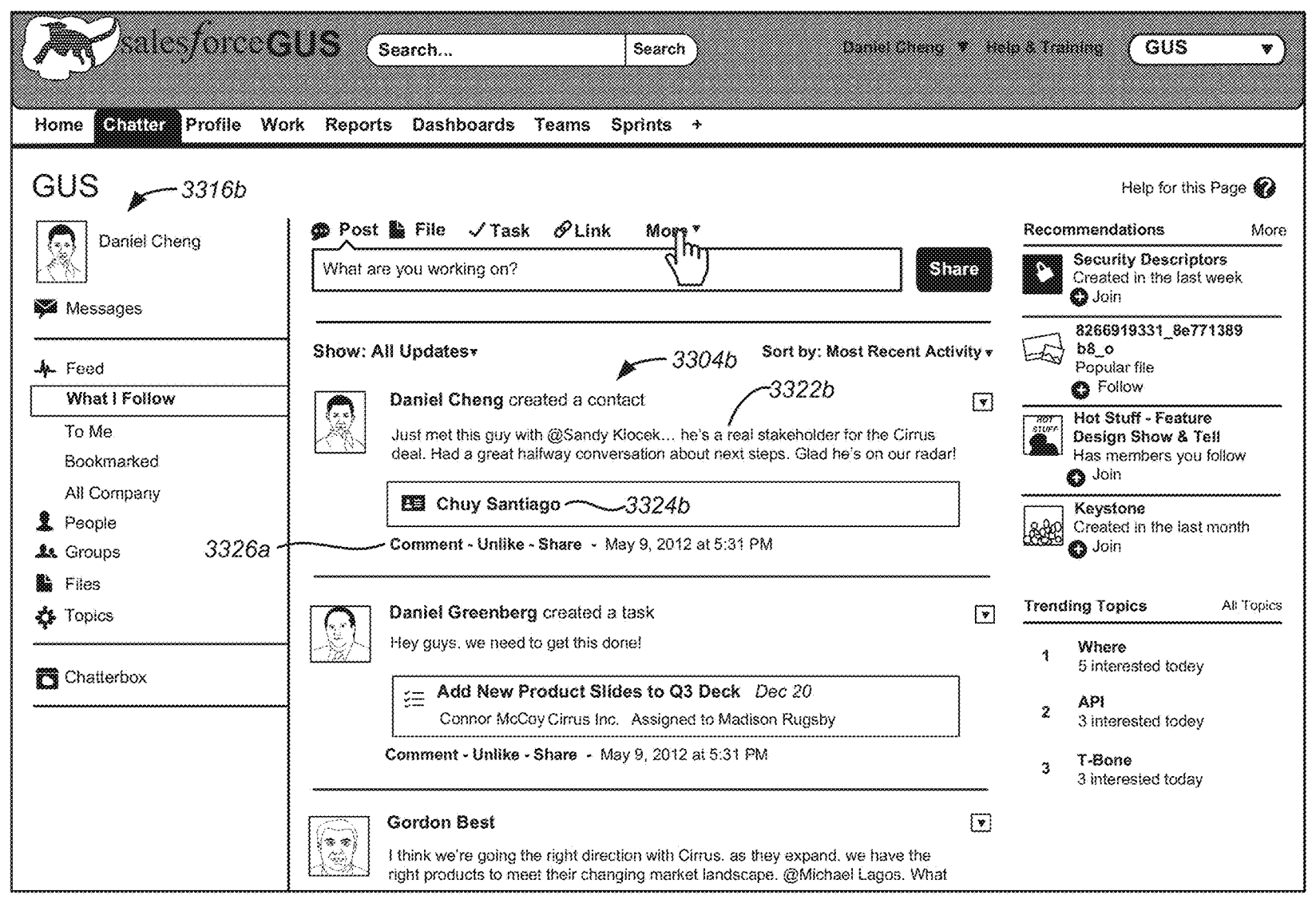
Figure 33C:
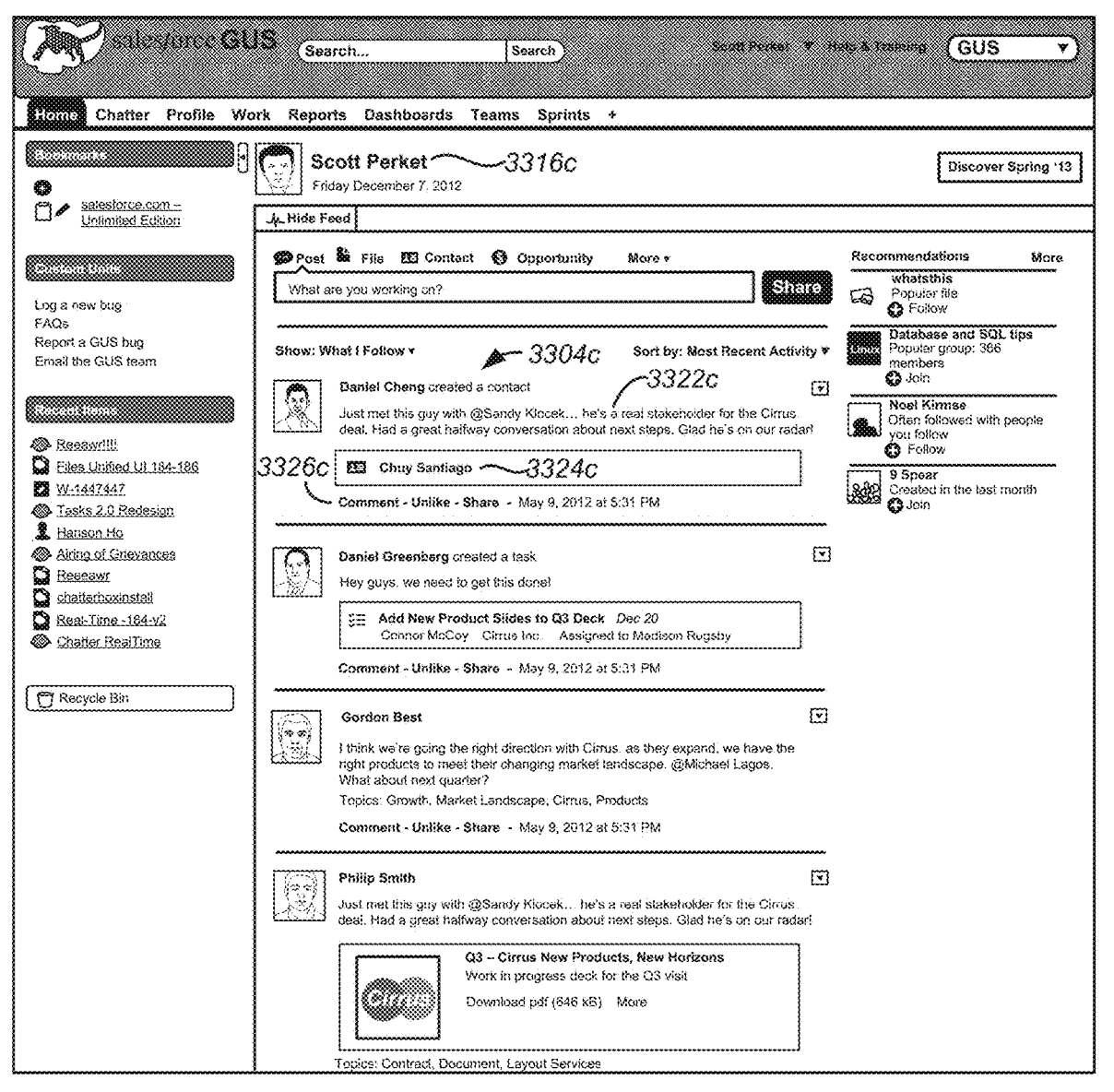

FIGS. 33A-33C show examples of a single feed item cross-referenced across multiple records and user profiles. FIG. 33A shows an example of a contacts record with a record feed 3304a including a feed item 3322a presenting updated data from a publisher 3302a, according to some implementations. An API or a publisher from any user interface may provide the updated data necessary to create the feed item 3322a. In this example, the published feed item 3322a is presented for inclusion in the record feed 3304a in the contact record page 3316a. The feed item 3322a includes information about the action performed on the contact record and the source of the action. The feed item 3322a also includes information from a message post accompanying the creation of the contact. The feed item 3322a further includes actions 3326a that are configured to perform actions on the feed item 3322a, including posting a comment to the feed item 3322a, liking or disliking the feed item 3322a, and sharing the feed item 3322a. Such actions 3326a may be configured to affect the same feed item as propagated in other related feeds to create a single conversation thread.

The creation of the feed item 3322a may be the result of the creation of a new contact from the sequence of actions illustrated in FIGS. 24-27. Whereas FIG. 27 shows the feed item 2422 as displayed in the information feed 2104 for the accounts record, FIG. 32A shows the feed item 3322a as displayed in the information feed 3304a for the contact record. The feed item 2422 in FIG. 27 may be cross-referenced with the child record so as to display the feed item 3322a in FIG. 33A. In some instances, cross-referenced feed items as displayed in different information feeds may render different information. For example, while the feed item 2422 includes a link 2424 to the child record in FIG. 27, the feed item 3322a does not include such a link.

Cross-referenced feed items are the same feed items propagated across different feeds. However, the cross-referenced feed items may be rendered differently depending on contextual factors. One such contextual factor can entail the profile of the user viewing the cross-referenced feed item, such as whether the user has a role or definition capable of approving a workflow or whether, in which case an approval button may appear in the cross-referenced feed item. Another contextual factor can include the page layout on which the cross-referenced feed item is displayed, such as whether the page layout is a home page of the user, the parent record page, the child record page, etc. Another contextual factor can include the type of device on which the cross-referenced feed item is rendered, such as whether the device is a smartphone, a tablet, laptop, or a desktop. Thus, while cross-referenced feed items are the same (e.g., same row of information in a table of a database system), the cross-referenced feed items may render different information depending on context. For example, the preamble of the cross-referenced feed item or the auxiliary body of the cross-referenced feed item may present different information in different feeds.

FIG. 33B shows an example of a user profile with a news feed 3304b including a feed item 3322b cross-referenced from the feed item in FIG. 33A and with a link 3324b to the contact record, according to some implementations. In this example, not only is the published feed item 3322a in FIG. 33A presented for inclusion in the record feed in the contact record page 3316a, but the same feed item is presented as feed item 3322b in FIG. 33B for inclusion in the news feed 3304b of the user profile page 3316b. The user profile page 3316b may correspond to a user who created, updated, or otherwise performed an action on the contact record. Here, the user profile page 3316b corresponds to Daniel Cheng who created to the contact record. Similar to the feed item 3322a in FIG. 33A, the feed item 3322b in the news feed 3304b includes the action performed on the contact record and the source of the action, information from the message post accompanying the creation of the contact, and actions 3326b configured to perform actions on the feed item 3322b. In addition, the feed item 3322b includes a link 3324b that a user may select to efficiently advance from the user profile page 3316b to the contact record page 3316a in FIG. 33A.

FIG. 33C shows an example of another user profile with a news feed 3304c including a feed item 3322c cross-referenced from the feed item in FIG. 33A with a link 3324c to the contacts record, according to some implementations. Like FIG. 33B, the same feed item from FIG. 33A may be published in a news feed 3304c of the user profile page 3316c. The user profile page 3316c may correspond to a user who follows Daniel Cheng, or who subscribes to the parent record or contact record. Here, the user profile page 3316c corresponds to Scott Perket who subscribes to the parent record. Similar to the feed item 3322a in FIG. 33A, the feed item 3322c in the news feed 3304c includes the action performed on the contact record and the source of the action, information from the message post accompanying the creation of the contact, and actions 3326c configured to perform actions on the feed item 3322c. In addition, the feed item 3322c includes a link 3324c that a user may select to efficiently advance from the user profile page 3316c to the contact record page 3316a in FIG. 33A.

IX. Custom Actions for Data Objects

Figure 17:
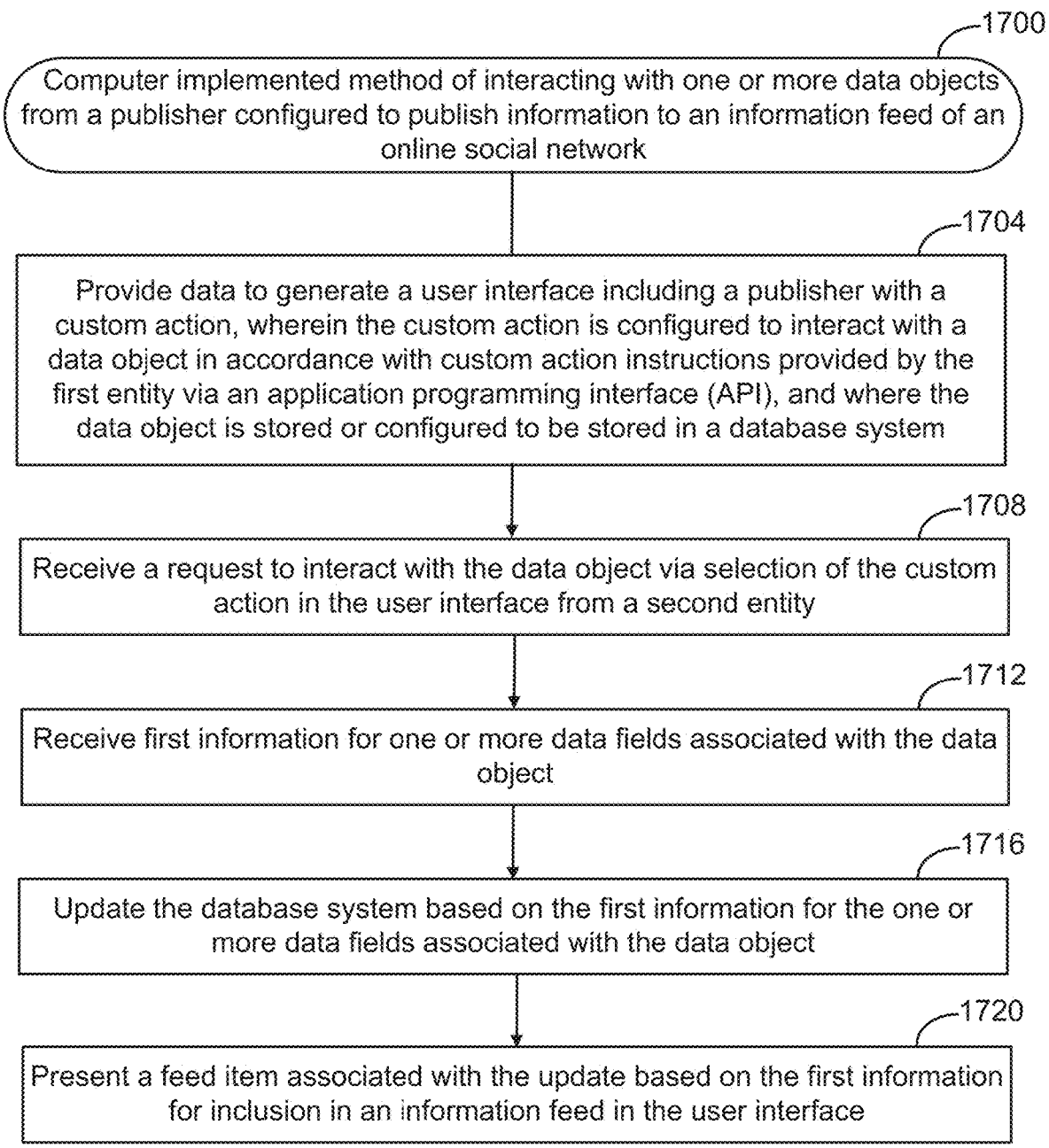
FIG. 17 shows a flowchart of an example of a computer implemented method 1700 for interacting with one or more data objects from a publisher configured to publish information to an information feed of an online social network, performed in accordance with some implementations.

FIG. 17 shows a flowchart of an example of a computer-implemented method 1700 for interacting with one or more data objects from a publisher configured to publish information to an information feed of an online social network, performed in accordance with some implementations. FIG. 17 is described with reference to FIGS. 34-51C.

At block 1704, a computing device or any number of computing devices cooperating to perform the method 1700 may provide data to generate a user interface including a publisher with a custom action. The custom action is configured to interact with a data object in accordance with custom action instructions provided by a first entity via an application programming interface (API). The data object is stored or configured to be stored in a database system. The data object can have a data structure defined by the database service (a standard object) or defined by a user (custom object).

A user or organization, such as a partner or customer, may wish to define a custom action for inclusion in a publisher. The user or organization may utilize an API, which can provide the framework or functionality to enable a user or organization to create their own custom actions. A custom action enables processing of data related to the data object through the publisher. Like publisher actions, the custom action can perform operations such as creating a record, deleting a record, editing data associated with a record, logging an action to a record, converting a record, downloading data from a record, uploading data to a record, attaching a file to a record, and viewing information associated with a record. By way of example, in logging an action to a record, the custom action may be configured to send an email and then log that email to the record, or the custom action may be configured to post to another online social network, such as LinkedIn® and Twitter®, and then log that post to the record. The custom action may perform an action that has a behavior outside the network domain of the record.

In some implementations, a custom action may be made available to a plurality of users within or associated with an organization. Alternatively, or additionally, a custom action created by a first entity, such as an organization, may be provided for use by other organizations and users. A database service provider may provide a marketplace or exchange in which entities that create applications such as a custom action may freely distribute, sell, or exchange applications with other entities.

A user interface of a database service may allow a user to create a custom action. Examples of database services for creating custom actions may include Force.com® and Work.com®, provided by salesforce.com®. A user or organization may also create new custom actions within the online social network, including Chatter®. A user may create new custom actions programmatically or declaratively.

In some implementations, the method 1700 may further include receiving, at the computing device, the custom action instructions from a user, where the custom action instructions are configured to define the data object and configured to define one or more data fields associated with the data object. From a client machine, a user may access the database service and utilize the API to create client-side scripting instructions for the custom object. In some implementations, the API may allow users to have limited access to source code and computing environment to create the publisher with the custom action.

Figure 34:
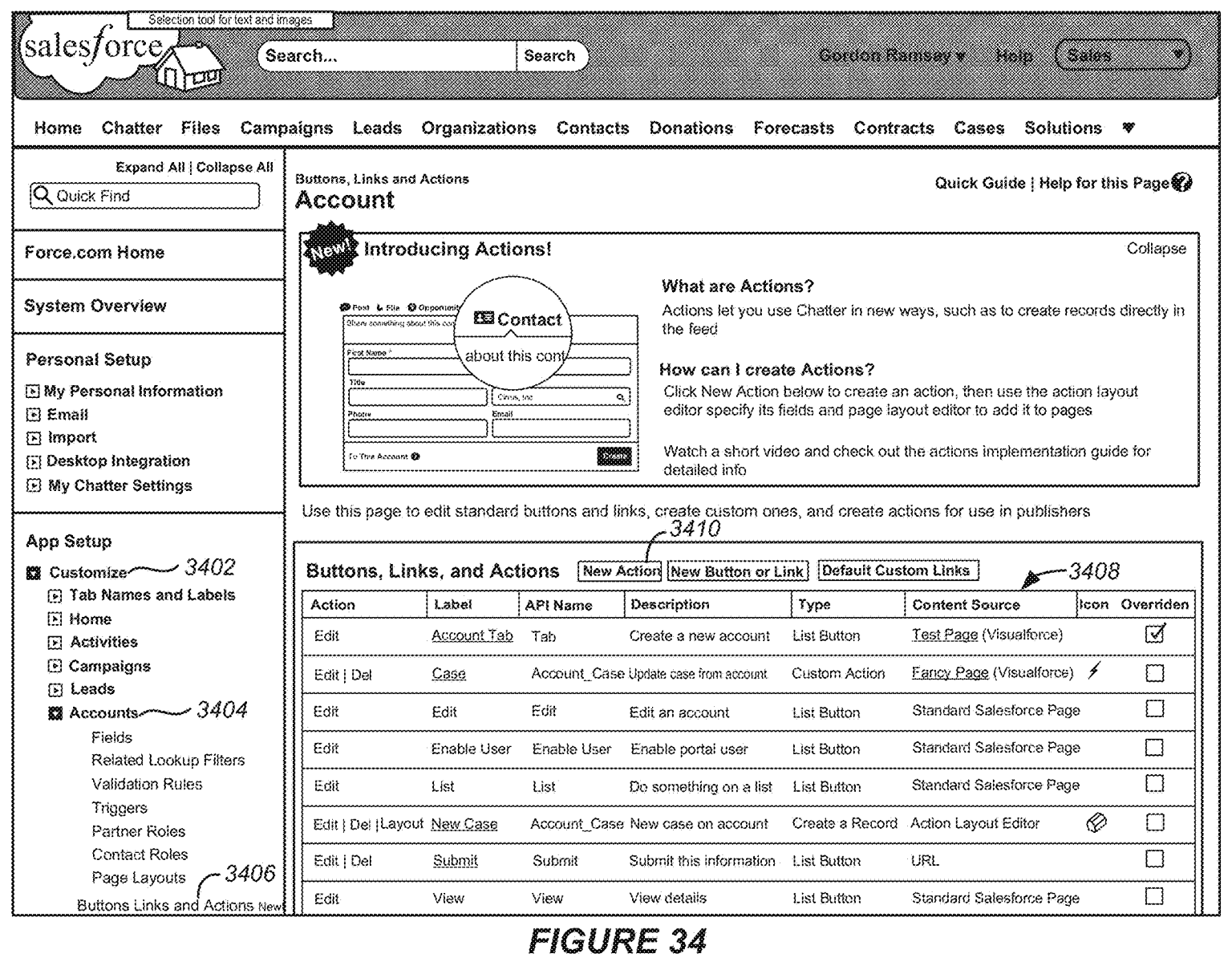

FIG. 34 shows an example of a user interface of a database service configured for users to create a custom action, according to some implementations. A user may initiate creation of a custom action using the API by selecting a dropdown tab "Customize" 3402, then selecting a dropdown tab "Accounts" 3404, and then selecting a dropdown tab "Buttons, Links, and Actions" 3406. Selecting the "Buttons, Links, and Actions" tab 3406 causes the user interface to display information regarding the creation of custom actions as well as a list 3408 of recently created custom actions. The user interface further includes a button 3410 for initiating the creation of a new custom action.

Figure 35:
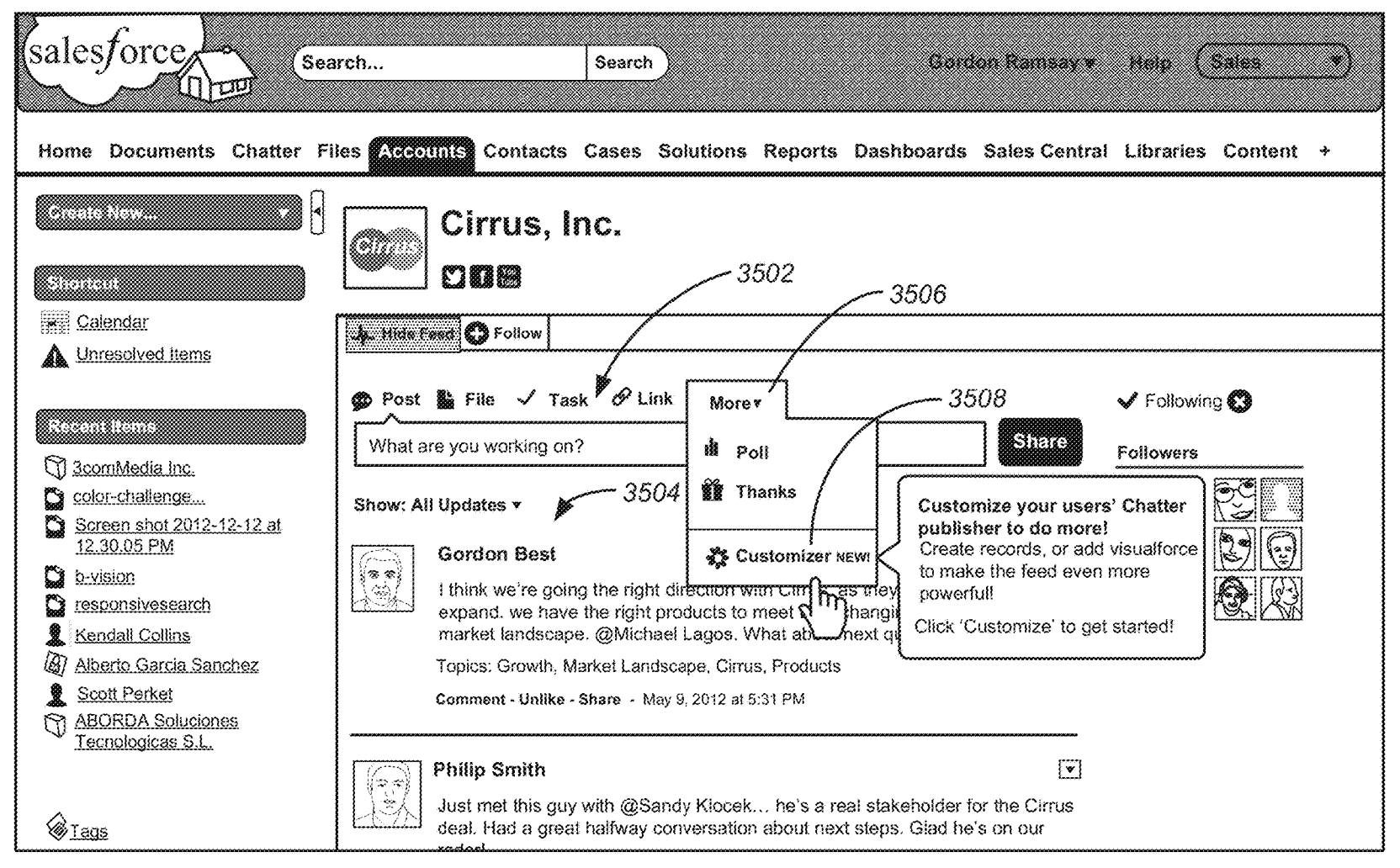

While a user may initiate creation of a custom action using the API from a database service, a user may initiate creation of a custom action using the API within the online social network itself. FIG. 35 shows an example of a user interface including a publisher 3502 configured for users to create a custom action from the publisher, according to some implementations. The user interface in the online social network can display the publisher 3502 and an information feed 3504. A user may initiate creation of the custom action by selecting "More" 3506 from a layout of actions in the publisher 3502 to produce a dropdown menu, and then selecting "Customize" 3508 from the dropdown menu.

It is understood that a user may initiate creation of a custom action using any number of pathways in any number of user interfaces. For example, a control region separate from a publisher in the user interface may enable a user to select a tab, channel, or button to initiate creation of a custom action. A search query tool from the database service or the online social network may also display results allowing a user to select a link to initiate creation of a custom action.

Figure 36:
FIG. 36 shows an example of a user interface including a custom action definition area for creating the custom action, according to some implementations.

After initiating the creation of the custom action, the user may provide custom action instructions associated with the custom action. The custom action instructions may define the data object and one or more data fields associated with the data object. FIG. 36 shows an example of a user interface including a custom action definition area 3602 for creating the custom action, according to some implementations. The user interface includes a custom action definition area 3602, which includes a plurality of custom fields 3604-3620, and a page layout area 3622. A user can define the custom action instructions utilizing the API by providing values in each of the custom fields 3604-3620.

In some implementations, an API may be provided by an entity, such as a database service provider, which includes a set of pre-defined instructions that perform at least some of the operations of the custom action. The pre-defined instructions may be provided in, for example, Javascript®, Java®, Apex™, or any other programming language for implementing at least some of the operations of the custom action. The operations may include operations that are likely to be common to many or all custom actions. For example, the instructions may be responsible for creating an area of the user interface for displaying the custom action, handling receipt of custom action triggering messages from a client machine, transmitting updated custom action messages to the client machine, and other such operations.

Thus, a user can provide definitions in the custom fields 3604-3620 in FIG. 36 to provide custom action instructions that interact with the API. The custom action instructions may integrate directly with the pre-defined instructions provided in the API.

One of the definitions in the custom action instructions can include Object Name 3604. In some implementations, a default value may be provided based on the source of initiating the creation of the custom action. Another definition in the custom action instructions can include Action Type 3606. The Action Type 3606 displays a value indicating the type of action to be performed for interacting with the data object. In some implementations, the Action Type 3606 is not limited to interacting with a data object, but can include other actions, such as exposing third-party applications or content. Such actions are discussed in more detail in Section X. In some implementations, a user may select from a list of possible values in Action Type 3606, such as Create a Record, Create a Custom Page (e.g., Custom Visualforce Page), and Update a Record, among others. Other possible actions can include Log a Call, Send Email, Send SMS, Change Status, Social Post, Canvas, and Aura™.

Additional definitions in the custom action instructions can include Target Object 3608. The Target Object 3608 describes the data object that the custom action is configured to interact with. In some implementations, the value provided in the Target Object 3608 includes a child record of the parent record. The child record and the parent record can be a CRM object, such as a lead, a case, an account, an opportunity, a task, a contact, a campaign, a contract, an event, a custom object, and a Visualforce page. Other definitions in the custom action instructions can include the Record Type 3610, the Relationship Field 3612, the Label 3614, the API Name 3616, the Description 3618, and the Icon 3620. The display of some of the custom fields may depend on the Action Type 3606. In FIG. 36, defining the Action Type 3606 to "Create a Record" causes the user interface to display custom fields 3608-3616.

Furthermore, the user may provide additional custom action instructions by defining in the page layout area 3622 the pages in which the custom action will appear. Thus, a custom action may be accessible on specified pages in the online social network.

Returning to the method 1700 in FIG. 17, the data to generate a user interface including a publisher with a custom action at block 1704 may determine whether the custom action is displayed in the user interface. The data may include custom action instructions as to the pages on which the custom action would be provided, as discussed above. In addition, the data may include custom action instructions as to the entities which have permission to access the custom action. A custom action may be provided to all users in an organization. Alternately, a custom action may be limited to a specific subset of users, such as a group.

Figure 37A:
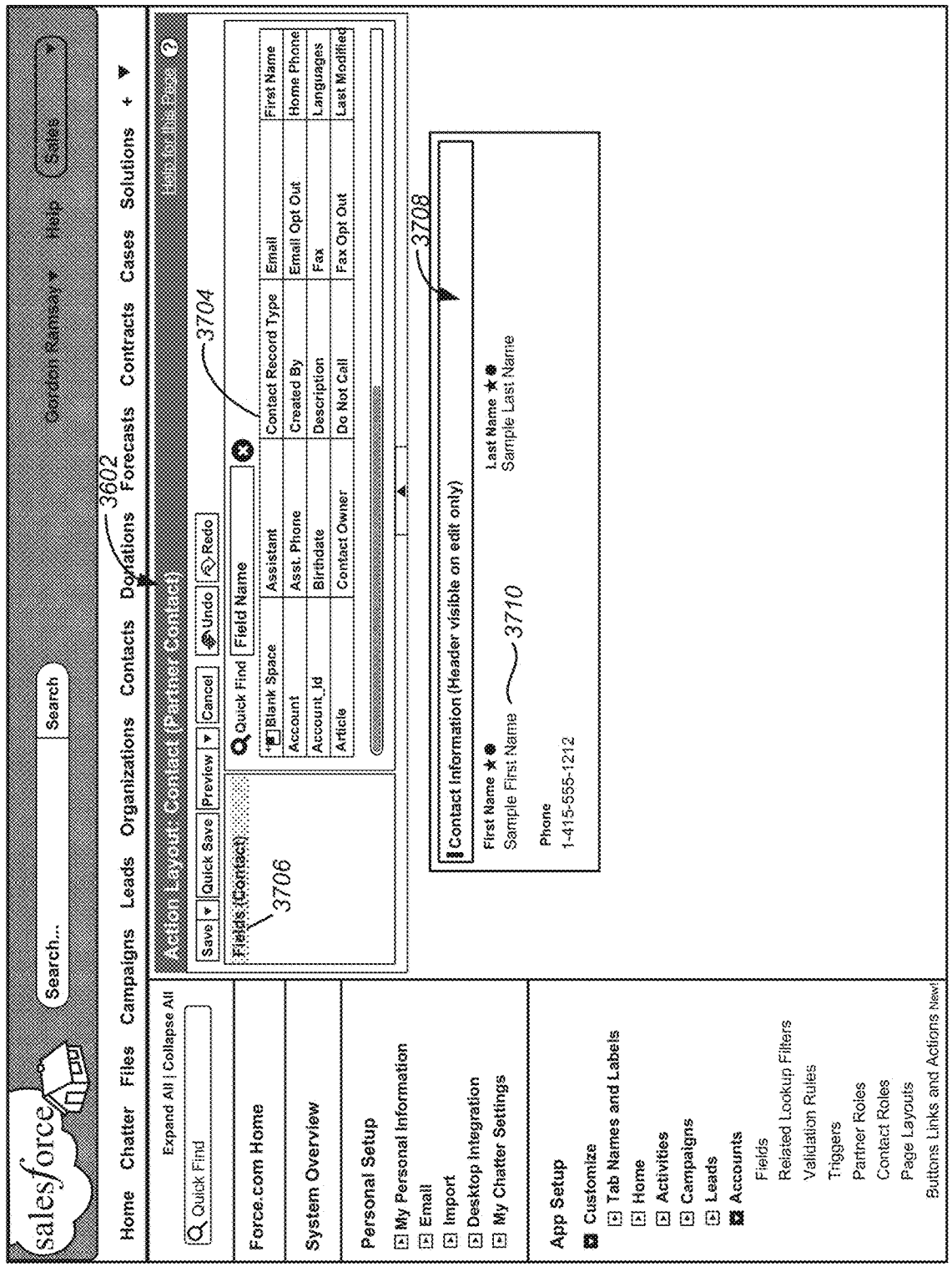
FIG. 37A shows an example of a user interface for an action layout editor displaying data fields associated with a custom action, according to some implementations.

Custom action instructions may also be configured to define the one or more data fields associated with the data object. FIG. 37A shows an example of a user interface for an action layout editor 3702 displaying data fields 3710 associated with a custom action, according to some implementations. Each of the data fields 3710 can represent information to be provided to the data object. In some implementations, the information can be generated from a user. In some implementations, the information can be generated from a machine or system. Some of the data fields 3710 may also be configured to be required fields for input.

By selecting the "Fields" option 3706, a user can configure the data fields 3710 using the action layout editor 3702 to be associated with the custom action. The action layout editor 3702 includes a plurality of available fields 3704 that can be associated with the custom action. Examples of available fields 3704 include First Name, Last Name, Phone, Email, Birthdate, Last Modified, Created By, Opportunity Name, Account Name, Next Step, Amount, Close Date, Stage, and Description, among others.

Figure 37B:
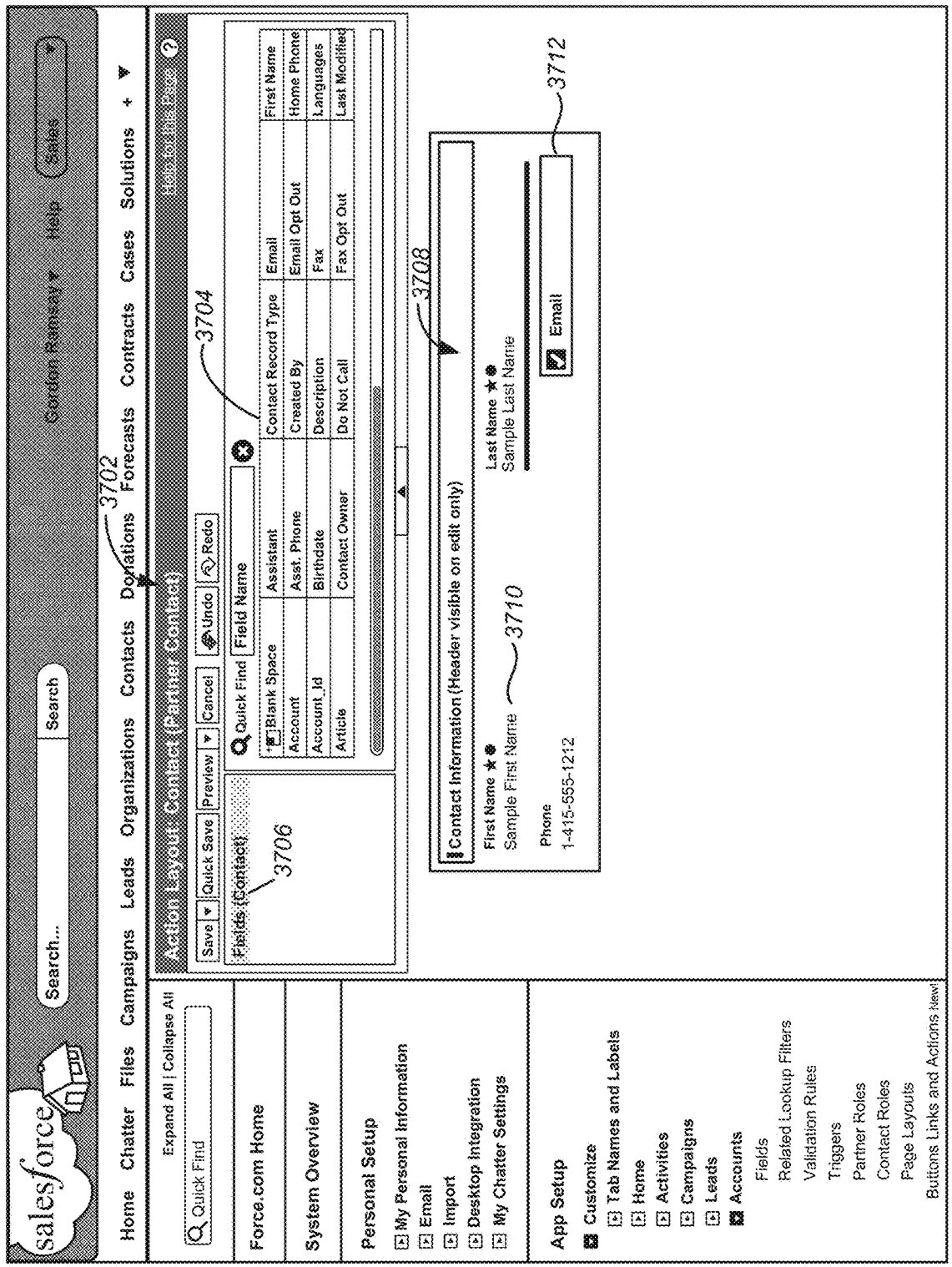
FIG. 37B shows an example of the user interface for the action layout editor in FIG. 37A displaying an addition of a data field associated with the custom action, according to some implementations.

An available field 3704 can become a data field 3710 associated with the custom action by dragging and dropping one of the available fields 3704 into a customizable publisher space 3708. FIG. 37B shows an example of the user interface for the action layout editor 3702 in which an additional data field 3712 is associated with the custom action. A user can place the additional data field 3712 in the customizable publisher space 3708 to determine an action layout of the data fields 3710. In some implementations, handling limits can be imposed to limit the quantity or types of data fields 3710 that can be positioned in the publisher space 3708.

Figure 38A:
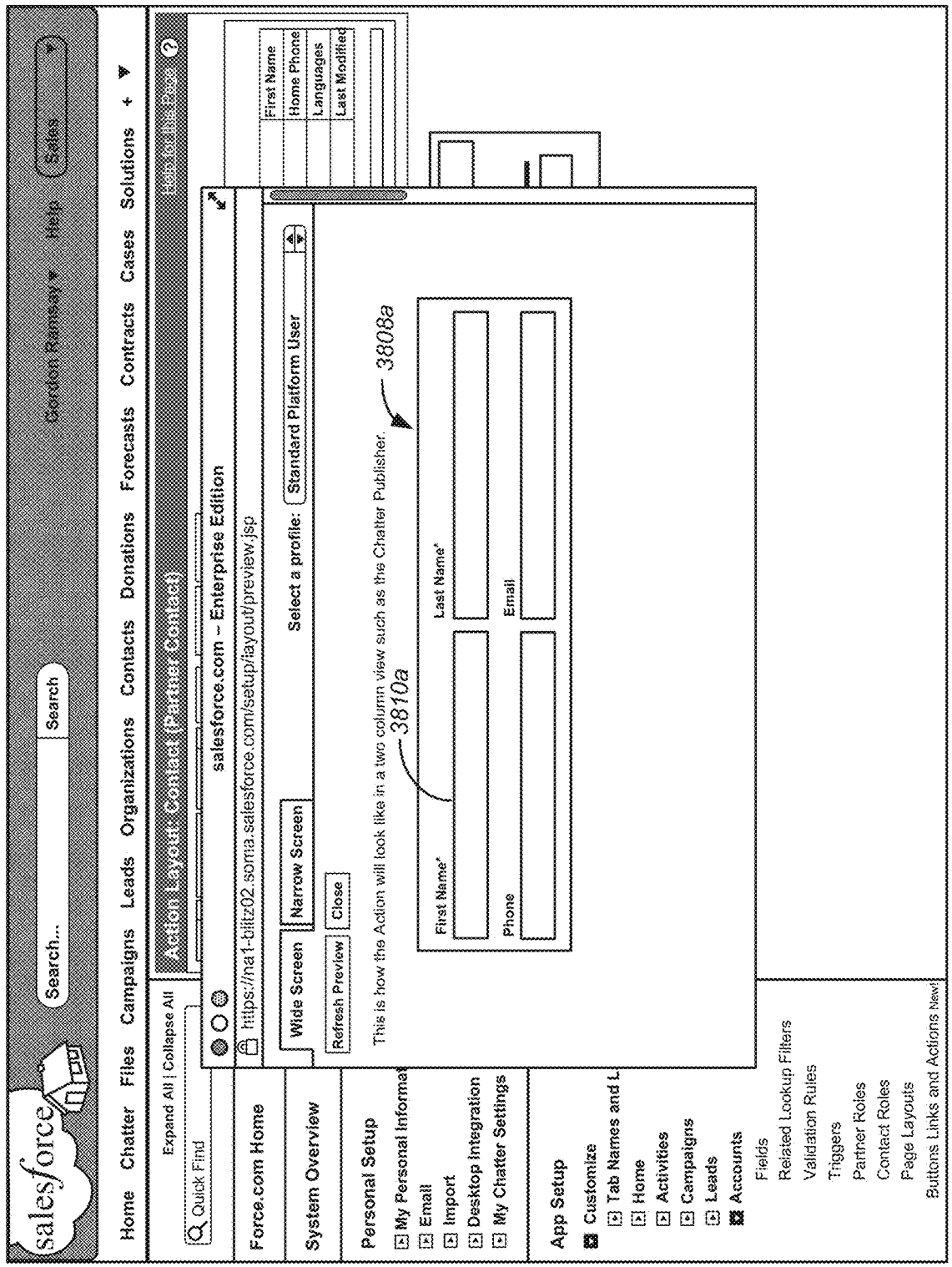
FIG. 38A shows an example of a window previewing the display of data fields associated with a custom action, according to some implementations.

The action layout represents the arrangement of the data fields in the publisher. The action layout for a custom action may differ according to the API. FIG. 38A shows an example of a window previewing the display of data fields 3810a associated with a custom action, according to some implementations. Here, the arrangement of the data fields 3810a in the customizable publisher space 3808a is shown in a two-column arrangement. This arrangement of the data fields 3810a may be useful for display in display devices having a wide screen, such as a desktop, laptop, or tablet display device.

Figure 38B:
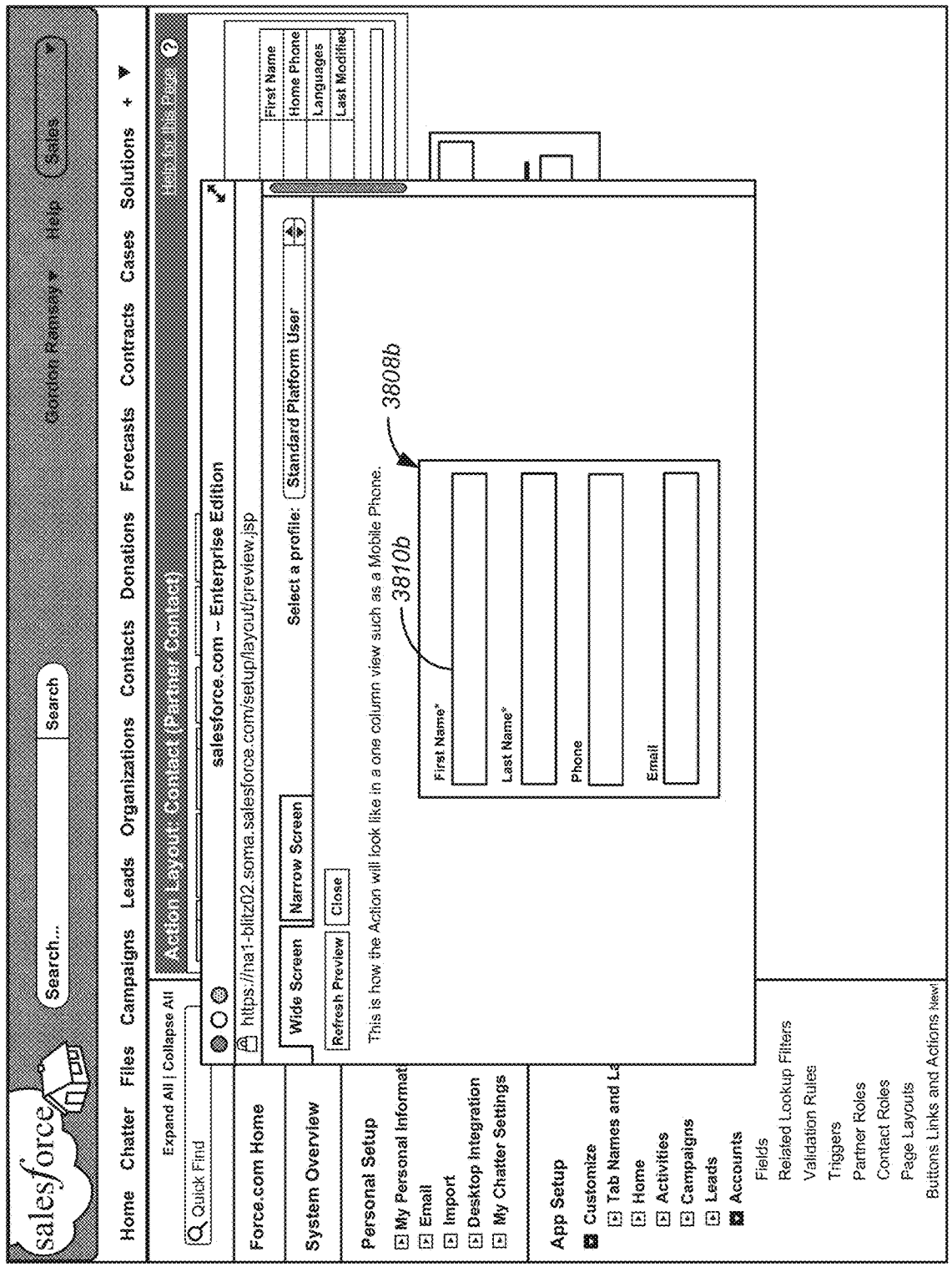
FIG. 38B shows an example of a window previewing the display of data fields associated with a custom action, according to other implementations.

FIG. 38B shows an example of a window previewing the display of data fields 3810b associated with a custom action, according to other implementations. Here, the arrangement of the data fields 3810b in the customizable publisher space 3808b is shown in a single column arrangement. This arrangement of the data fields 3810b may be useful for display in display devices having a narrow screen, such as a smartphone or other mobile display device.

Figure 39:
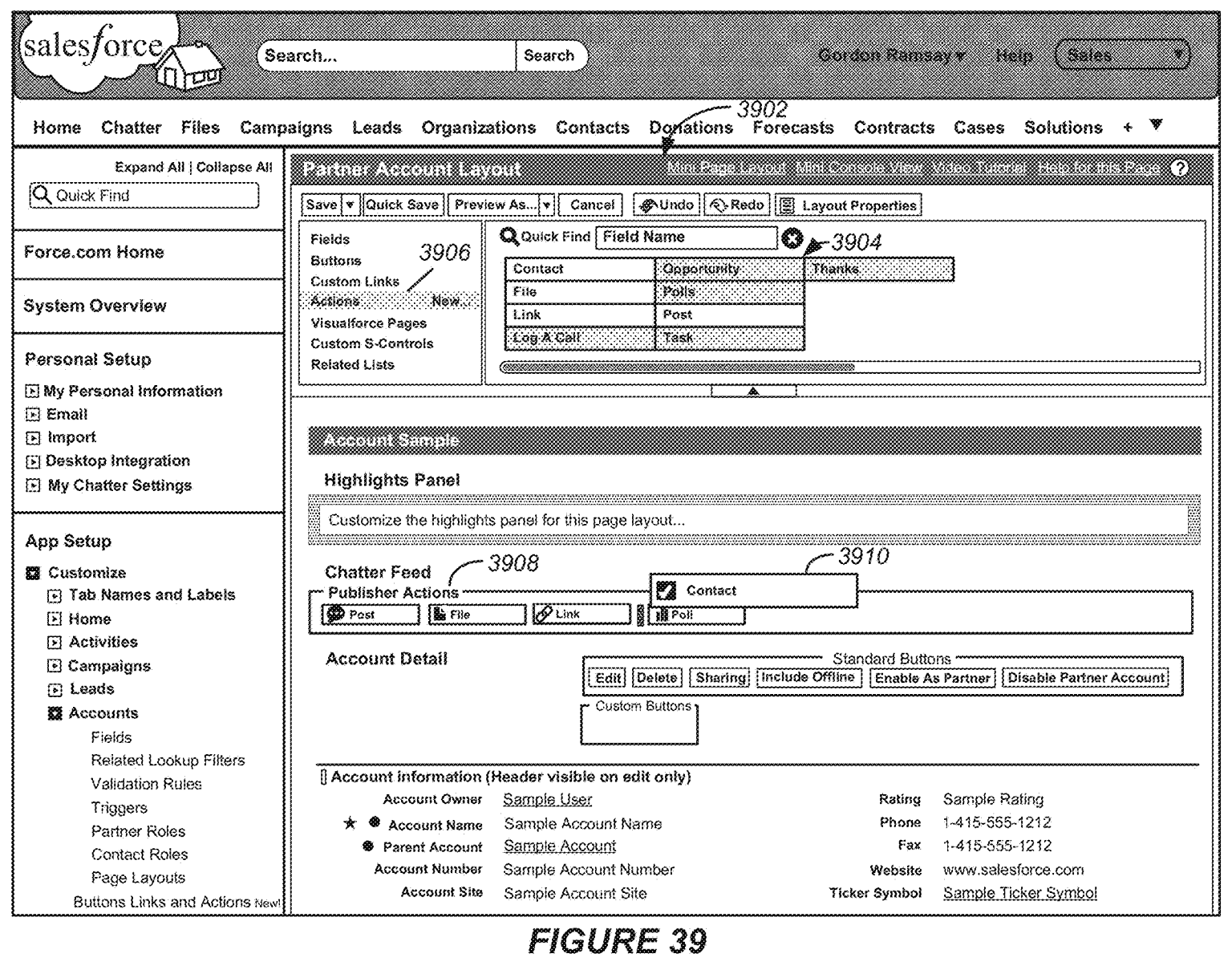

Custom action instructions may also be configured to define a page layout of the custom action in the publisher. FIG. 39 shows an example of a user interface for a page layout editor 3902 displaying publisher actions 3908 associated with a record, according to some implementations. Each of the publisher actions 3908 represents an action that can be performed on a data object or with reference to a data object.

By selecting the "Actions" option 3906, a user can configure the publisher actions 3908 using the page layout editor 3902 for a particular page layout. Page layouts can differ across pages for different records, groups, users, and organizations. For example, a publisher action 3908 for creating a contact may be displayed on a partner account page but not displayed on a customer deal page. The page layout editor 3902 includes a plurality of available actions 3904 that can be included in the page layout. Examples of available actions 3904 include Contact, File, Link, Log a Call, Opportunity, Polls, Post, Task, and Thanks, among others.

An available action 3904 can become a publisher action 3908 by dragging and dropping one of the available actions 3904 in the page layout for the publisher. One of the available actions 3904 can be a custom action 3910. A user can position the custom action 3910 among one or more publisher actions 3908 to determine a page layout of the custom action 3910 in the publisher. The page layout can represent the arrangement of the custom action 3910 relative to the publisher actions 3908 in the publisher. The area for the publisher actions 3908 can be restricted to a particular area of the publisher. By cabining the publisher actions 3908 to a limited area, the publisher actions 3908 may be prevented from altering how the rest of the publisher is displayed.

Figure 40:
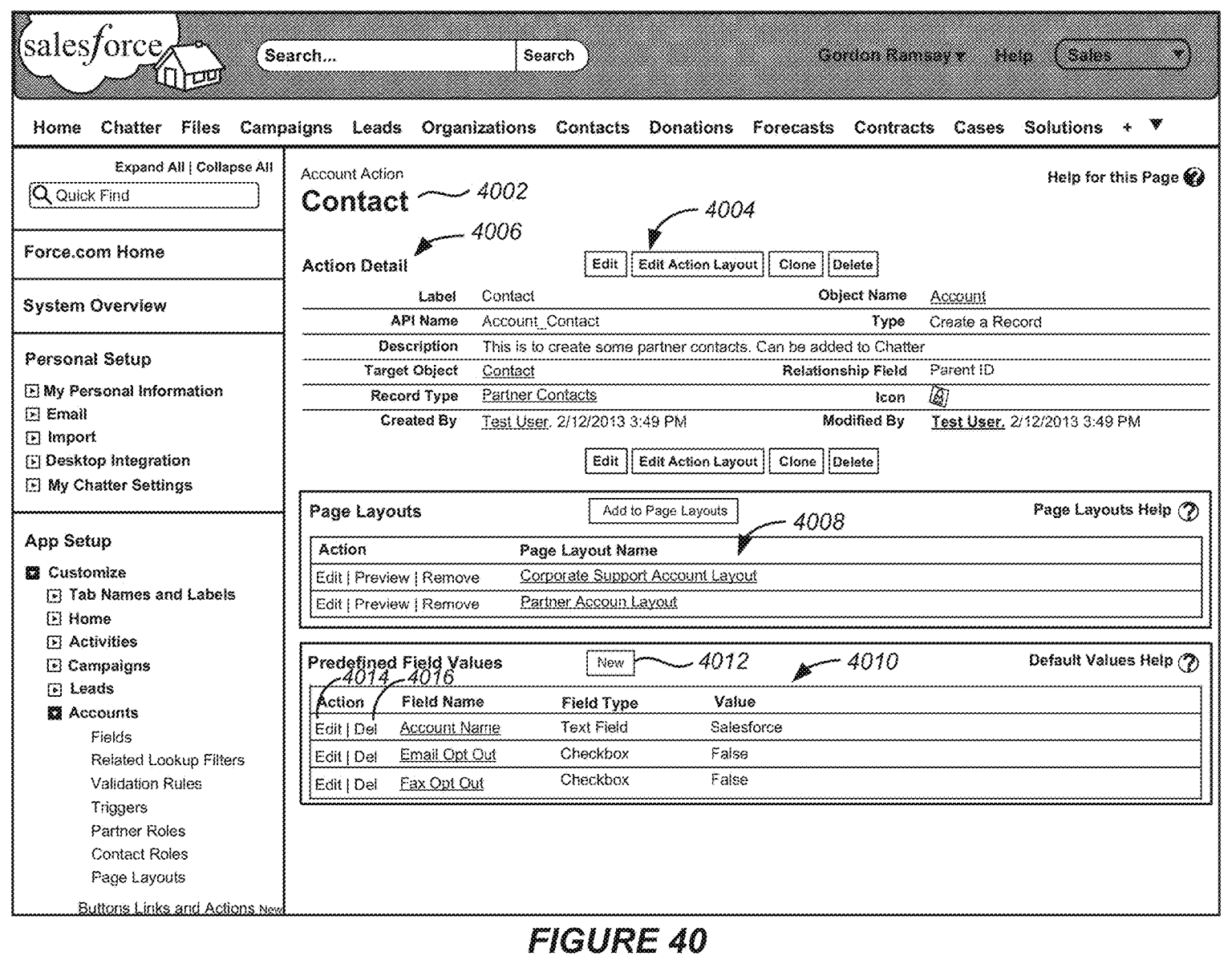

FIG. 40 shows an example of a user interface displaying details 4006, page layouts 4008, and predefined field values 4010 associated with a custom action, according to some implementations. After creation of a custom action, a user may access a page 4002 to view information regarding the custom action. The user may select one of a plurality of buttons 4004 to edit the action layout of the custom action or edit, duplicate, or delete the custom action. The details 4006 display definitions provided for custom fields for the custom action. The page layouts 4008 display the specific pages in which the custom action will appear. The pre-defined field values 4010 display the data fields having predefined or default values. A user can add a new pre-defined or default value by selecting the New button 4012, edit predefined or default values in specified data fields by selecting the Edit link 4014, or delete a previous predefined or default value in specified data fields by selecting the Del link 4016.

Figure 41:
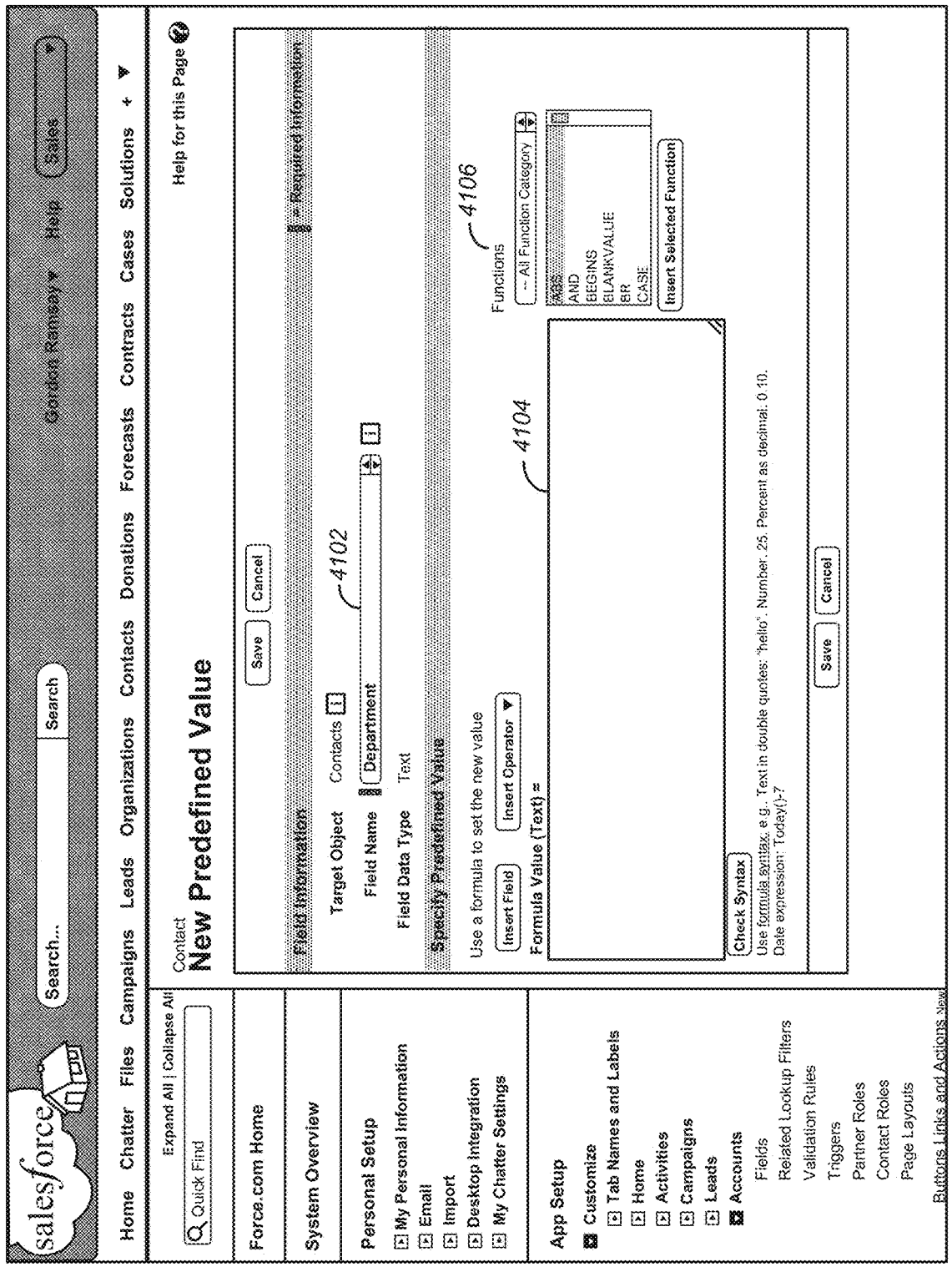
FIG. 41 shows an example of a user interface for editing or adding the predefined field values associated with a custom action, according to some implementations.

FIG. 41 shows an example of a user interface for editing or adding the predefined field values associated with a custom action, according to some implementations. A user can select a data field 4102 from a plurality of data fields to specify a predefined or default value. The user can define a value in a field space 4104, where the value can be an alpha-numeric input or other character-based input including words, phrases, statements, questions, emotional expressions, and/or symbols. However, the value defined in the field space 4104 may be variable. The user can add functions 4106 to the field space 4104 to perform a function on a value or variable.

By establishing a predefined or default value for a data field, any user who initiates the custom action from a publisher will already be provided with predefined or default values in the data field. In some implementations, the predefined or default values in the data field may not be changed.

Figure 43:
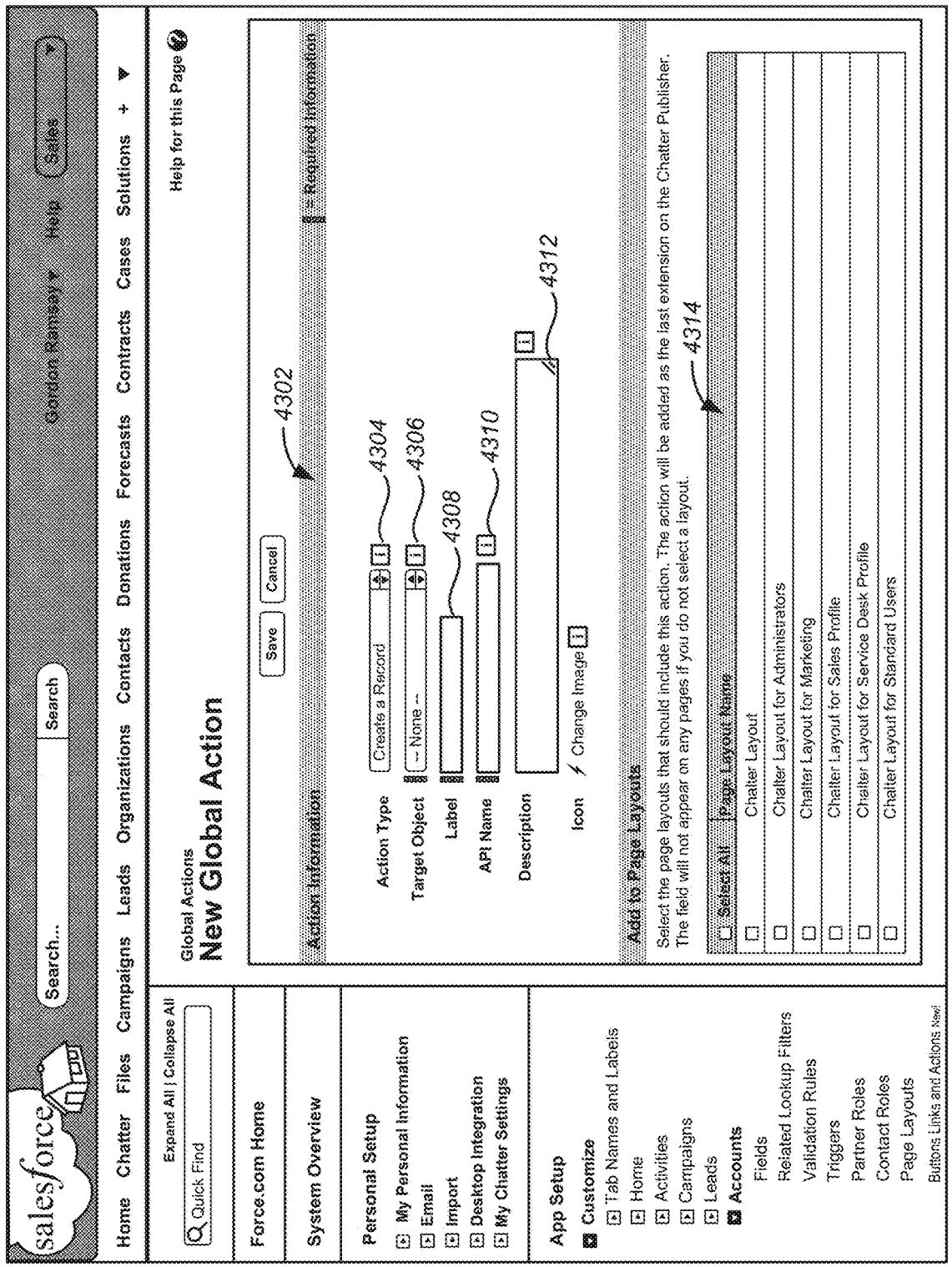
FIG. 43 shows an example of a user interface including a plurality of parameters for creating the global action, according to some implementations.
Figure 44:
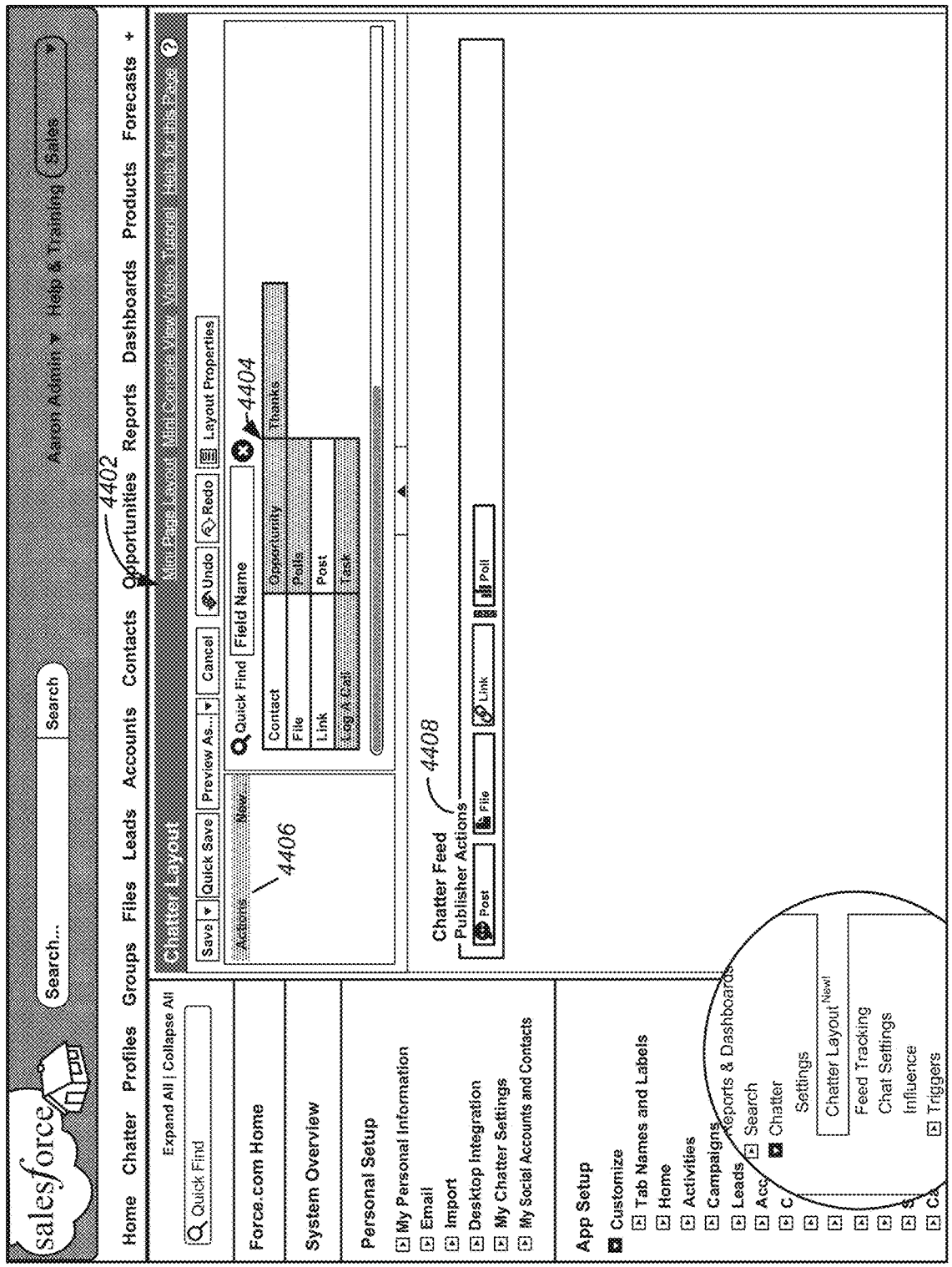
FIG. 44 shows an example of a user interface for a page layout editor displaying publisher actions associated with an on-demand database service environment, according to some implementations.

While some custom actions may be limited to display in user interfaces depending on the page being accessed or the user access permissions, some custom actions may not be so limited. Such actions may be referred to as global actions. FIGS. 42-44 show user interfaces of different aspects of creating a global action.

FIG. 42 shows an example of a user interface of a database service configured for users to create a global action, according to some implementations. A user may initiate creation of a global action using the API by selecting a dropdown tab "Create" 4202, and then selecting a dropdown tab "Global Actions" 4204. Selecting the "Global Actions" tab 4204 causes the user interface to display information regarding the creation of global actions as well as a list 4208 of recently created global actions. The user interface further includes a button 4210 for initiating the creation of a new global action. It is understood that a user may initiate creation of a global action using any number of pathways in any number of user interfaces.

After initiating the creation of the global action, the user may provide global action instructions associated with the global action. FIG. 43 shows an example of a user interface including a global action definition area 4302 for creating the global action, according to some implementations. Providing global action instructions can occur in an identical or similar manner as providing custom action instructions, which is described earlier herein. However, global actions are not necessarily limited to certain pages in the online social network, but can be displayed across a wider range of pages, including a details page, a home page, and a Chatter® page.

The user interface includes a global action definition area 4302, which includes a plurality of global fields 4304-4312.

The number of global fields 4304-4312 in the global action definition area 4302 may be less than the number of custom fields for creating a custom action because the user need not specify relationships and other information.

The user may also provide additional global action instructions by defining the page layout area 4314 the pages in which the global action will appear. Here, the pages that can be selected are not limited to pages having a parent-child relationship with the data object being acted upon, but the pages that can be selected include pages across the online social network.

Global action instructions may be configured to define a page layout of the global action in the publisher. FIG. 44 shows an example of a user interface for a page layout editor 4402 displaying publisher actions 4408 associated with an on-demand database service environment, according to some implementations. Each of the publisher actions 4408 represents an action that can be performed on a data object or with reference to a data object from any of a plurality of pages across the online social network.

By selecting the "Actions" option 4406, a user can configure the publisher actions 4408 using the page layout editor 4402. The page layout editor 4402 includes a plurality of available actions 4404 that can be included in the publisher. An available action 4404 can become a publisher action 4408 by dragging and dropping one of the available actions 4404 into the page layout of the publisher. A user can position an available action 4404 among one or more publisher actions 4408 to determine a page layout of the publisher.

Figure 45:
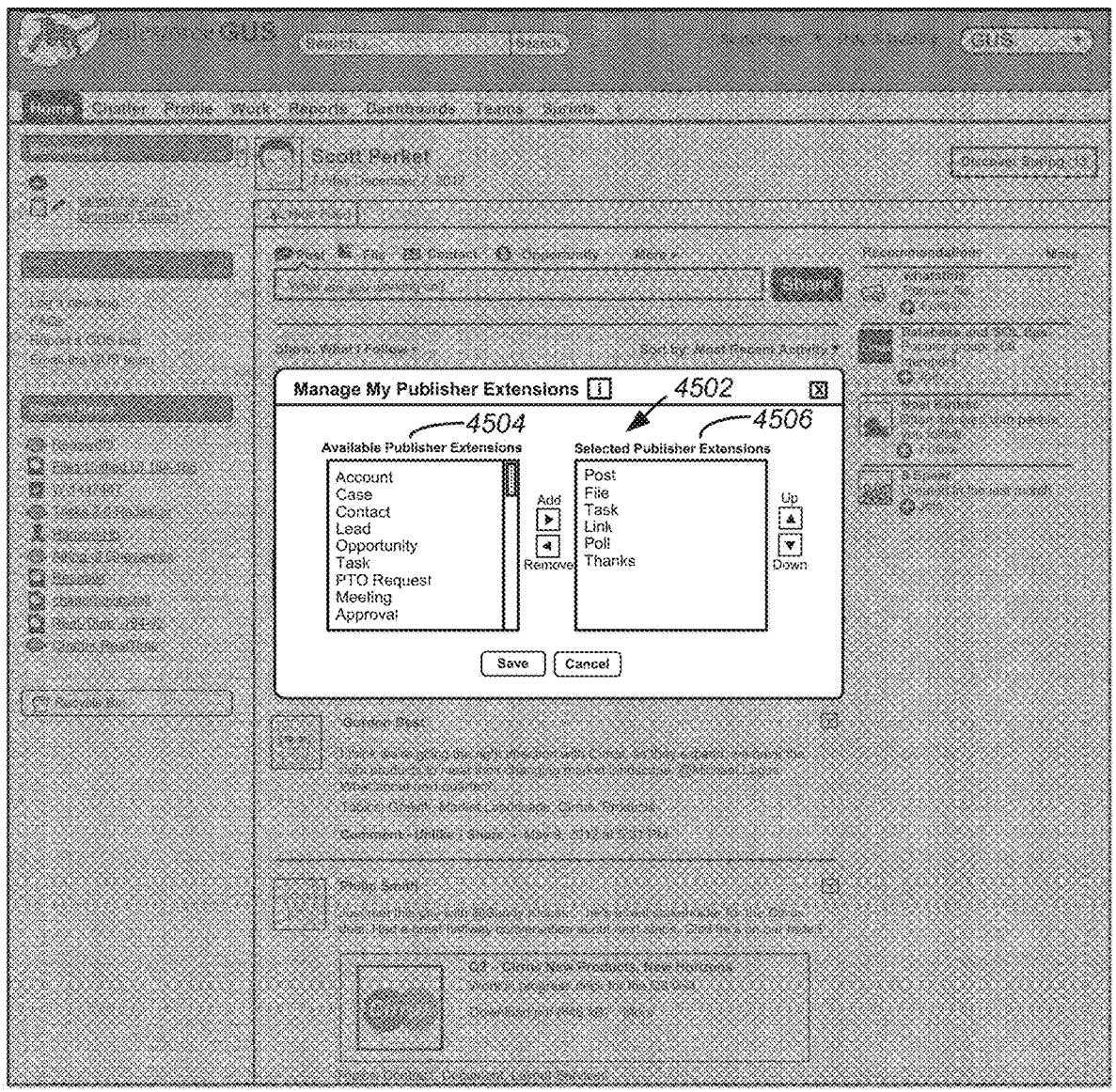
FIG. 45 shows an example of a window for selecting publisher actions for display in a publisher, according to some implementations.

FIG. 45 shows an example of a window 4502 for selecting publisher actions for display in a publisher, according to some implementations. A user may customize the publisher actions for display in a publisher by opening the window 4502 from a home page or page in which the user has permission to customize the display of publisher actions. The user can add publisher actions from a pool of available actions 4504 into a pool of selected actions 4506. Likewise, the user can remove publisher actions from selected actions 4506 to the area of available actions 4504.

Figure 46A:
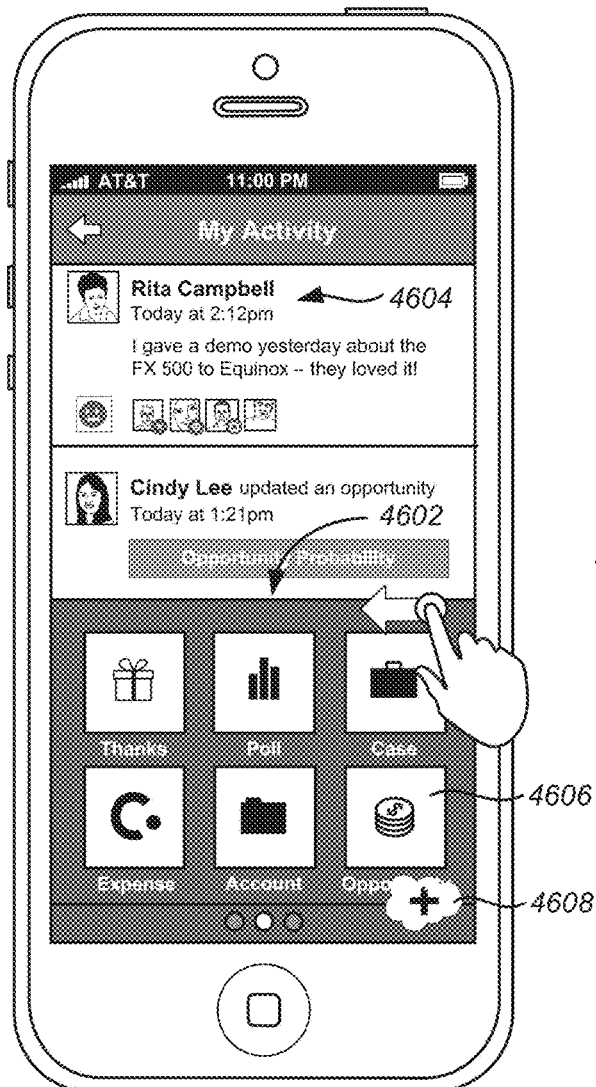
FIGS. 46A-46B show an example of a user interface with a publisher with custom actions and an information feed for mobile device applications, according to some implementations.
Figure 46B:
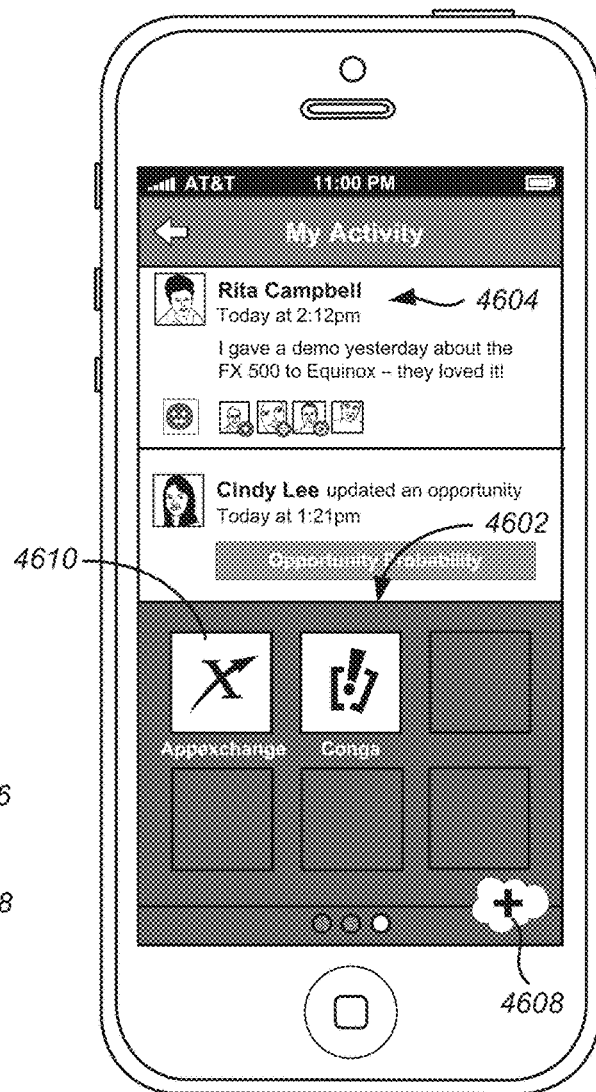

FIGS. 46A-46B show an example of a user interface including a publisher 4602 with custom actions 4606 and an information feed 4604 for mobile device applications, according to some implementations. The custom actions 4606 in the publisher 4602 may interface with an API and publish information into the information feed 4604. Mobile applications and various other applications may communicate with the same API to perform the same basic functionality of the publisher.

The publisher 4602 includes a plurality of publisher actions 4606. In some implementations, at least one of the publisher actions 4606 may be a custom action. In some implementations, additional publisher actions 4606 may be accessed by hovering over the publisher 4602 and sliding the publisher 4602 in a lateral direction. A button 4608 in the user interface may enable a user to display or hide the publisher actions 4606. In fact, the button 4608 may be configured to show more publisher actions, including actions from a pre-defined list of admin-installed/configured actions.

In some implementations, a custom action may be made available to a plurality of users within or associated with an organization, and/or for use by other organizations and users. The AppExchange custom action 4610 may allow users that create applications such as custom actions to freely distribute, sell, or exchange applications with other entities.

Returning to FIG. 17, at block 1708, a request to interact with the data object is received via selection of the custom action in the user interface from a second entity. In some implementations, the second entity is a user or organization different from the first entity. In some implementations, the second entity is a user or organization that is identical with the first entity.

The method 1700 may further include determining that the second entity has permission to interact with the data object. Depending on the access permissions of the second entity, limitations may be imposed on the data objects that the second entity can interact with. Such limitations can be established by, for example, a system administrator, an owner of the data object, or an organization's security/permissions policy, among other means.

In some implementations, the request to interact with the data object may include a request to create the data object, a request to delete the data object, a request to update the data object, a request to convert the data object, a request to download data from the data object, a request to upload data to the data object, a request to attach a file to the data object, a request to view information associated with the data object, and a request to otherwise perform an operation having a reference to the data object.

The request to interact with the data object may be generated in response to a user selecting a custom action in the user interface. In some implementations, the selection of the custom action may be generated from a user input from a user interface component displayed within the publisher. Examples of selecting such a user interface components displayed within the publisher include publisher or custom actions displayed in FIGS. 21B, 24, and 28-30. Moreover, the user interface component may be part of a customized graphical user interface created from a customization tool. A partner or customer may customize the visual representation of the publisher and user interface components according to their preferences using a customization tool, such as Visualforce. Such a customization tool may provide the framework that allows users to build custom user interfaces that can be hosted natively by the on-demand service environment. Users utilizing a customization tool like Visualforce may add customized user interface components to the publisher. Therefore, the publisher may serve as an interface for all user interactions with a record, eliminating the need for different applications, devices, or windows for different actions.

In some implementations, the selection of the custom action may be generated from a user input from a user interface component displayed outside of the publisher. Examples of selecting such a user interface component displayed outside of the publisher include actionable selections in FIGS. 47A-47B and 48A-48B.

Figure 47A:
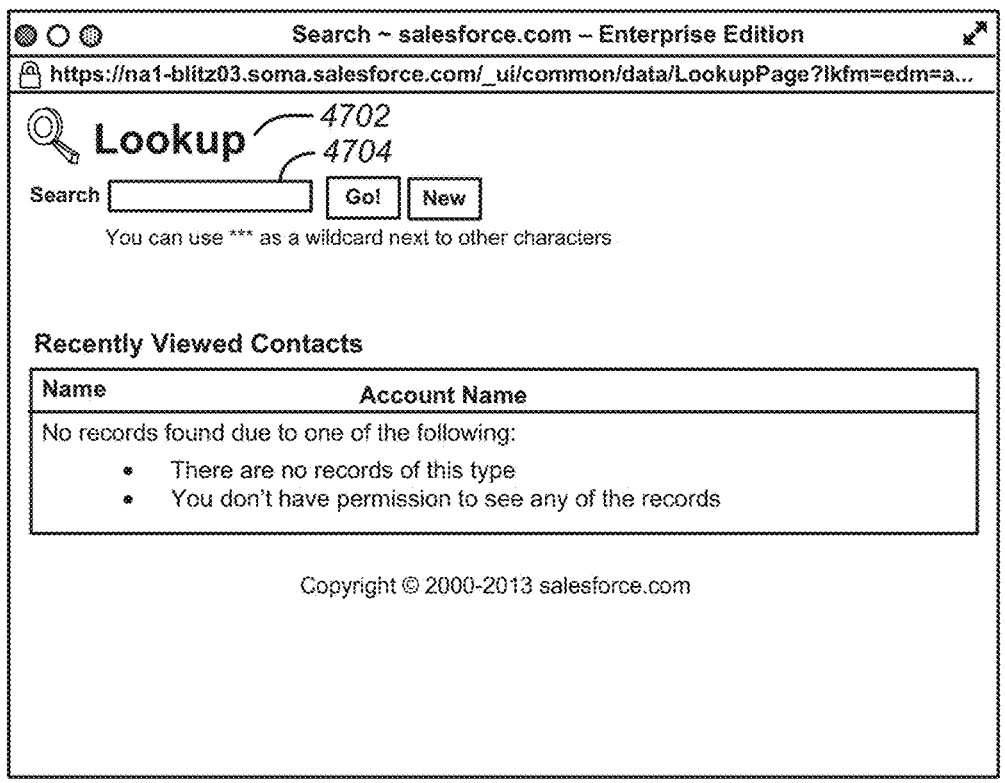
FIGS. 47A-47B show an example of a lookup tool for searching through a database system for an on-demand database service environment, according to some implementations.
Figure 47B:
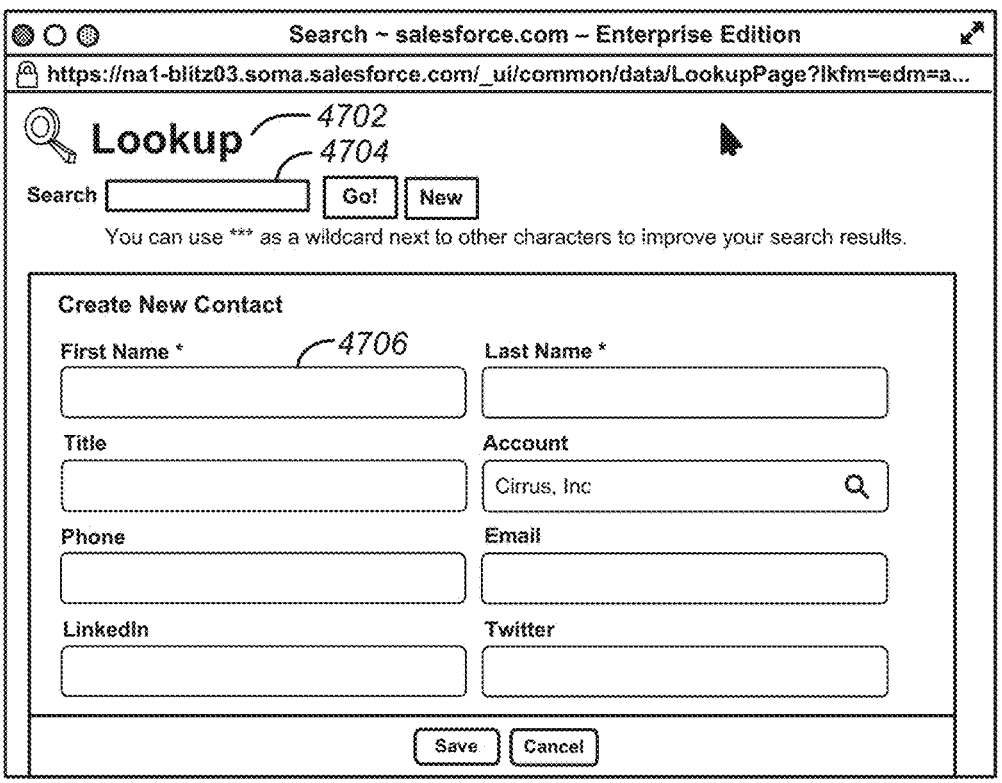

FIGS. 47A-47B show an example of a lookup tool 4702 for searching through a database system for an on-demand database service environment, according to some implementations. A user may provide an alpha-numeric or other character-based input into the box 4704 to perform a lookup query. In some implementations, a list of results may be displayed after submitting the lookup query. For example, the lookup query may return a list of users, organizations, groups, or records. The user may select a user interface component (not shown) to perform an action on or with reference to one of the users, organizations, groups, and records. In some implementations, the lookup query may return no results, and the user may select a user interface component (not shown) to create a new entity, such as a record. For example, in FIG. 47B, as a result of the lookup query returning no results, the user may choose to create a new contact and cause a publisher to display in the user interface with a plurality of data fields 4706.

Figure 48A:
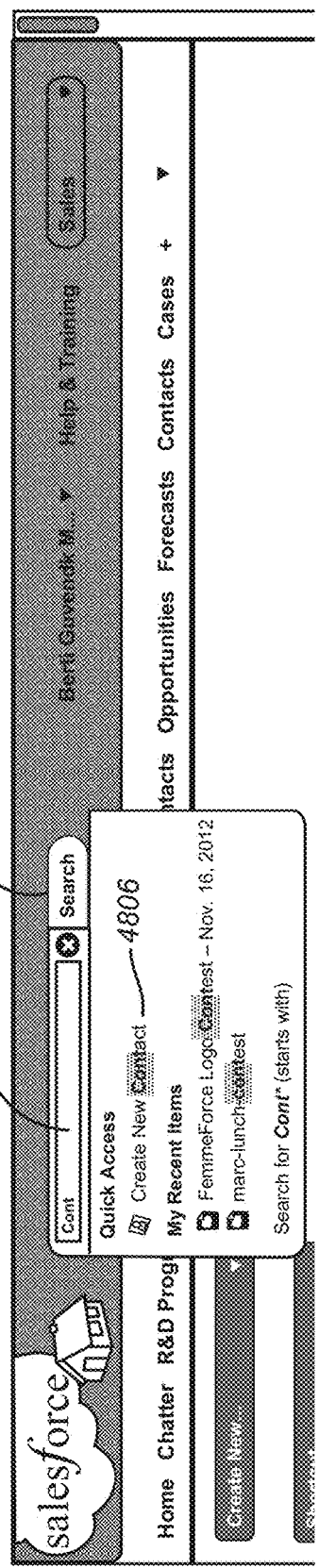
FIGS. 48A-48B show an example of a search query tool for searching through a database system for an on-demand database service environment, according to some implementations.
Figure 48B:
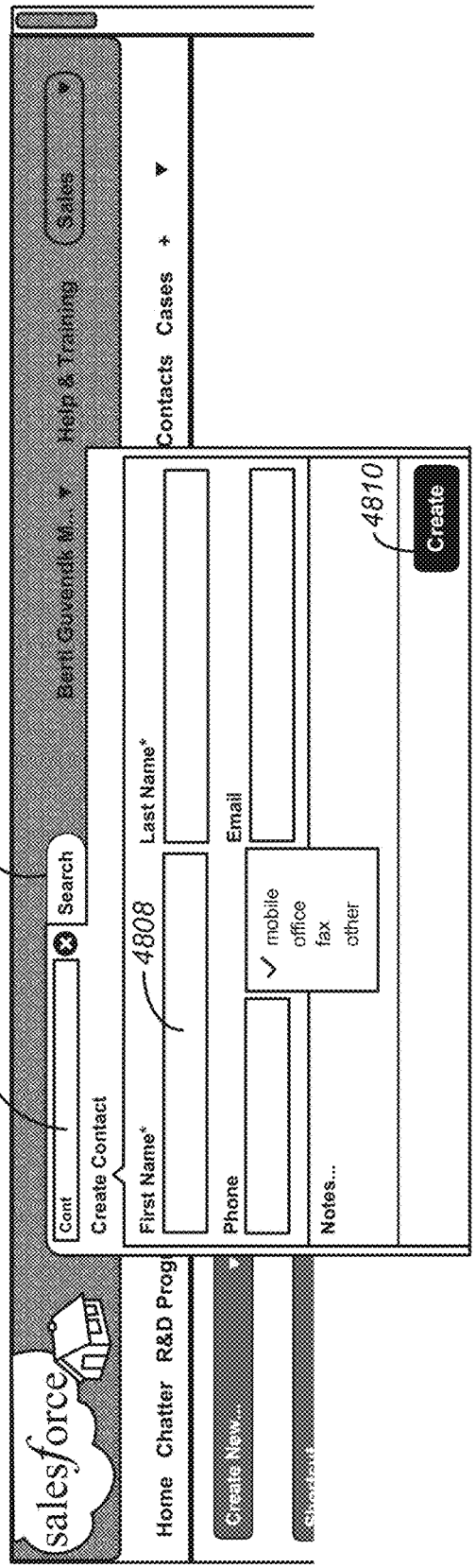

FIGS. 48A-48B show an example of a search query tool 4802 for searching through a database system in an on-demand database service environment, according to some implementations. From a user interface, a user may provide an alpha-numeric or other character-based input into the box 4804. In some implementations, as the user is providing the input for the search query, results may be simultaneously displayed according to an auto-complete operation. Alternatively, or in addition, results may be displayed after submitting the search query. In some implementations, the search query may return a list of actions 4806. The user may select one of the actions 4806 to cause a publisher to display in the user interface with a plurality of data fields 4808.

Returning to FIG. 17, at block 1712, first information for one or more data fields associated with the data object is received from the publisher at the one or more computing devices. The data object may be stored or configured to be stored in a database system. The first information may be provided by the user requesting to interact with the data object at block 1708. The first information may be communicated to one or more computing devices performing the method 1700, for instance, as a signal network 14 in FIGS. 1A and 1B.

Figure 49:
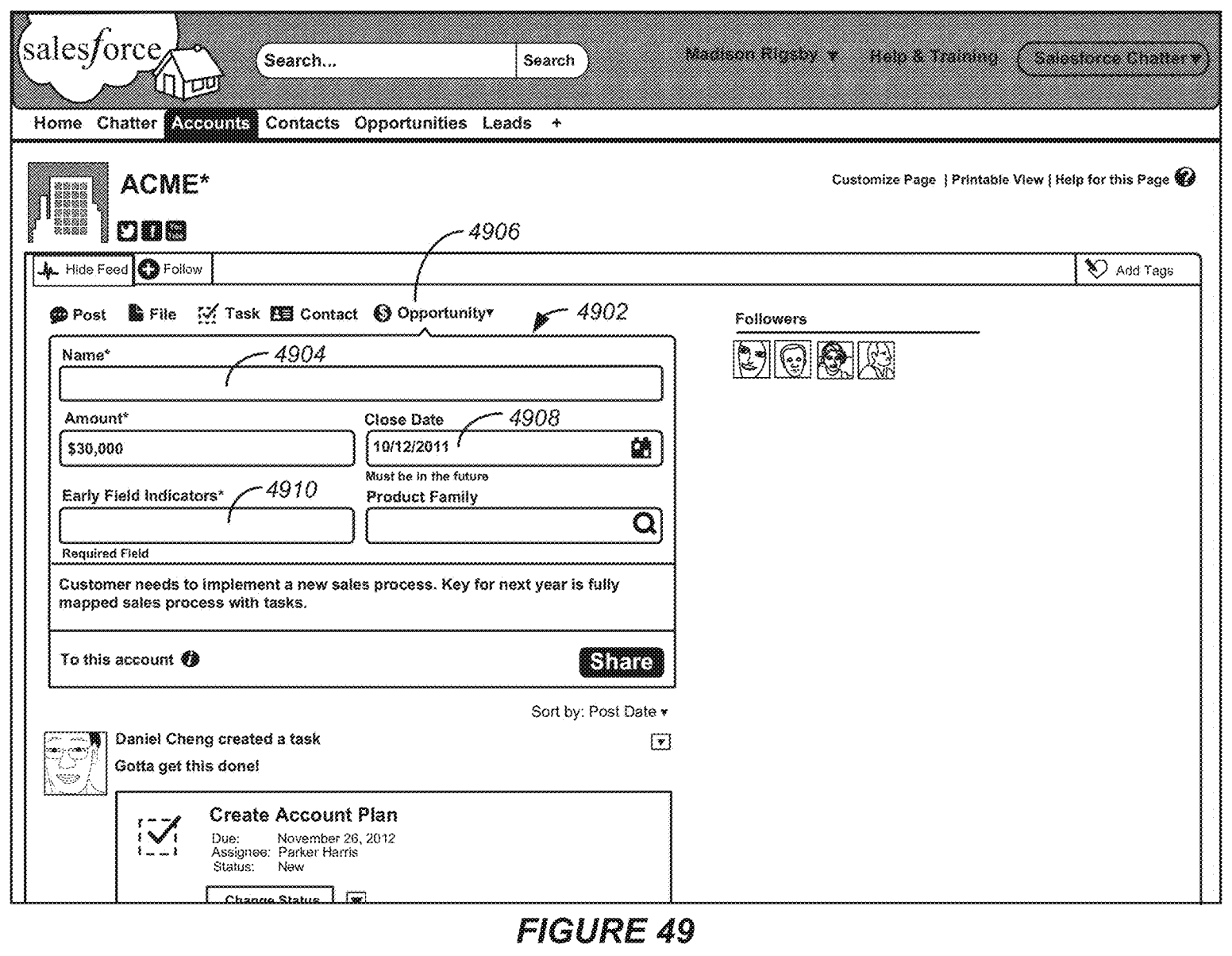

In some instances, validation rules may be implemented with the one or more data fields to validate certain inputs. FIG. 49 shows an example of a user interface including a publisher 4902 displaying a plurality of data fields 4904 for a publisher action 4906, and validation rules associated with one or more data fields, according to some implementations. The one or more computing devices may perform a validation check of the values provided in each of the data fields 4904 against threshold values. The threshold values may be provided by an entity in the custom action instructions that define the one or more data fields. A value provided in one of the data fields 4904 may be compared to a set of threshold values, and if it is determined that the value satisfies the set of threshold values, then the value is validated. For example, in FIG. 49, a Close Date 4908 can establish a validation rule for a calendar date in which the calendar date must be in the future. Furthermore, an Early Field Indicator 4910 can establish a validation rule that some value be entered.

Returning to FIG. 17, at block 1716, the database system is updated based on the first information for the one or more data fields associated with the data object. Updates to the data object may include creation of the data object, deletion of the data object, editing data associated with the data object, logging an action associated with the data object, conversion of the data object, downloading data from the data object, uploading data to the data object, attachment of a file to the data object, viewing of information associated with the data object, and otherwise performing an operation having a reference to the data object. In other words, the first information associated with the data object at block 1716 is used to perform the requested interaction at block 1708. For example, upon receiving the first information, the one or more computing devices can create or update a row in a table representing the data object in the database system.

At block 1720, a feed item associated with the update is presented for inclusion in an information feed in the user interface. The feed item provides a visual feedback element for presenting at least some of the updated data in the information feed. The data presented in the feed item can depend on one or several contextual factors. In some instances, the feed item can include an actionable selection providing a reference to the data object. As discussed earlier herein, the same feed item may be propagated in other related feeds by cross-referencing.

Figure 50A:
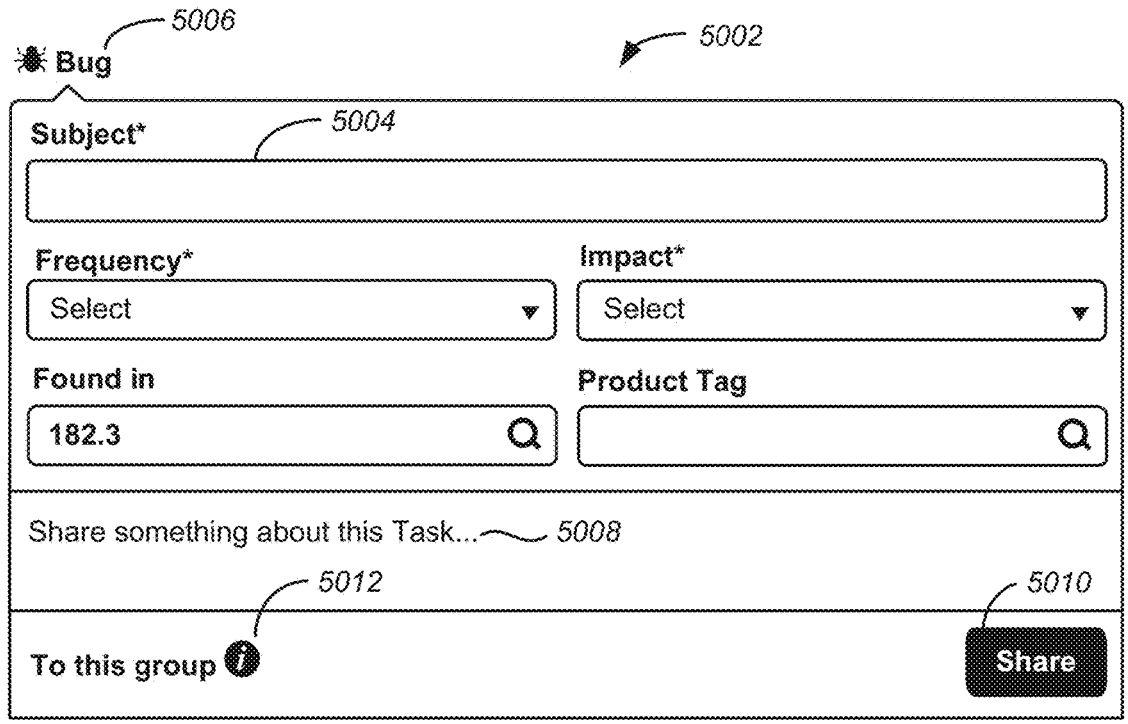
FIG. 50A shows an example of a publisher for logging a bug, according to some implementations.
Figure 50B:
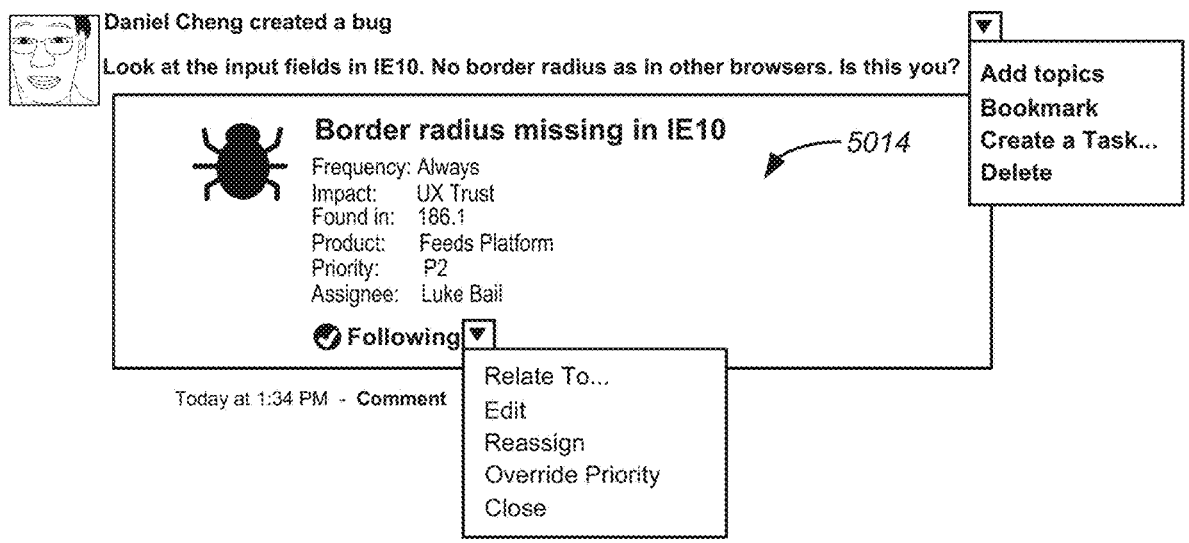
FIG. 50B shows an example of a corresponding feed item created from publisher data provided in FIG. 50A, according to some implementations.

A custom action may be provided by a third party and configured to execute some of the sequence of steps described above. One example of a custom action that may be provided by a third party is a Bug custom action. FIG. 50A shows an example of a publisher 5002 for logging a bug, according to some implementations. FIG. 50B shows an example of a corresponding feed item 5014 created from publisher data 5004 provided in FIG. 50A, according to some implementations. Using a Bug 5006 custom action, a user may create a record from the publisher 5002 and publish information as a feed item 5014 in an information feed. Such information may include publisher data 5004 such as Subject, Frequency, Impact, Found in, and Product Tag. The publisher 5002 may also include a text box 5008 for posting a message to accompany the feed item 5014, a dropdown menu 5012 to select specific entities to publish the publisher data 5004 to their respective feeds, and a Share button 5010 to publish the publisher data 5004.

Another example of a custom action that may be provided by a third party is an Expense Report custom action. FIG. 51A shows an example of a publisher 5102 for filing an expense report, according to some implementations. FIG. 51B shows a corresponding feed item 5114 from the publisher data 5104 provided in FIG. 51A, according to some implementations. FIG. 51C shows another corresponding feed item 5116 from the publisher data 5104 provided in FIG. 51A, according to some implementations. Using the Expense Report 5106 custom action, a user may submit an expense report for approval from the publisher 5102. Publisher data 5104 may include Name, Policy, Purpose, Amount, Item, and Receipt. In some instances, the publisher may communicate with an application such as Concur® to obtain values for the publisher data 5104. A receipt may be attached and transmitted with the publisher data 5104. The publisher may also include a text box 5108 for posting a message to accompany feed items 5114 and 5116, a dropdown menu 5112 to select specific entities to publish the publisher data 5104 to their respective feeds, and a Share button 5110 to publish the publisher data 5104.

X. Interacting with Applications in a Publisher Via an Application Programming Interface FIG. 18 shows a flowchart of an example of a computer-implemented method 1800 for interacting with an application using a publisher in an online social network, performed in accordance with some implementations. FIG. 18 may be described with reference to FIGS. 52-56C. At block 1804, data to generate a user interface including a publisher and an information feed is provided, where the publisher is configured to publish information to the information feed. In some implementations, the user interface may also include a custom action, which may be configured to interact with a data object or application in accordance with custom action instructions. The custom action instructions may be provided by a first entity via an API. In some implementations, the first entity may be a database service provider providing database services to a plurality of recipients. In some implementations, the first entity may be a user or organization.

Figure 52:
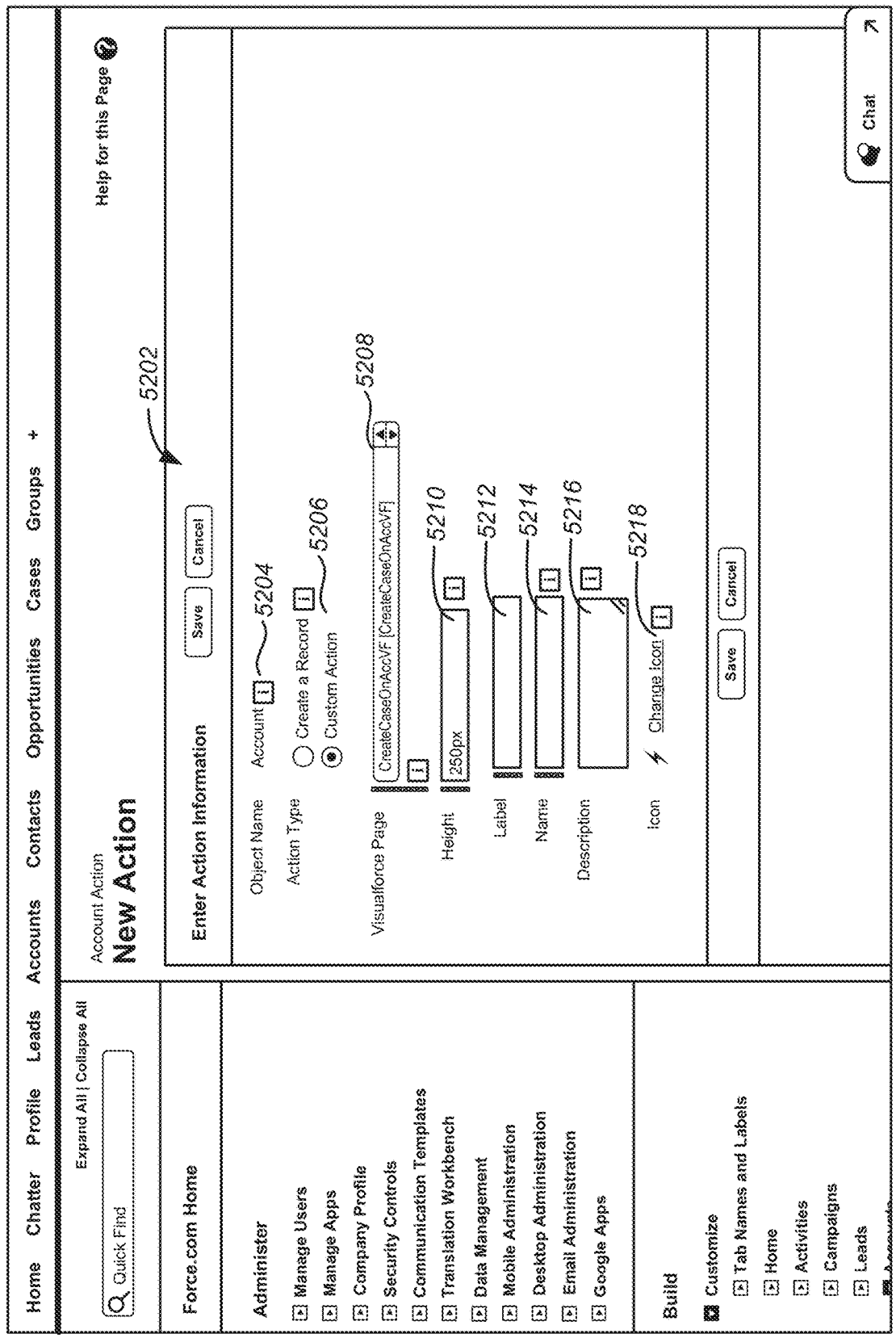
FIG. 52 shows an example of a user interface including a custom action definition area for creating the custom action with a Visualforce page.

FIG. 52 shows an example of a user interface including a custom action definition area 5202 for creating the custom action with a Visualforce page. A customization tool, such as Visualforce, allows users to build custom user interfaces that can be hosted natively in an on-demand service environment. Rather than declaratively define the user interface, a customization tool allows users to programmatically customize the user interface. For example, a user may customize the user interface components that should be included on a page and how they should appear. The user can edit Visualforce tags, HTML, Javascript, or other Web-enabled code. Furthermore, a user may customize the custom action instructions that are initiated upon selection of the custom action in the user interface. Examples of custom actions that a user may add to the user interface may include, by way of example only, instant messenger, knowledge articles, live chat, twitter, virtual bulletin boards, email, log a call, portal answer, or the like.

In FIG. 52, the user interface includes a custom action definition area 5202, which includes a plurality of custom fields 5204-5218. A user can define the custom action instructions by providing values in each of the custom fields 5204-5218. By selecting Custom Action 5206, a user may identify a Visualforce page 5208 to associate with the Custom Action 5206. The Visualforce page 5208 may be defined previously by an entity to create a case on an Account 5204. The user may further define the Visualforce page 5208 by providing values to its Height 5210, Label 5212, Name 5214, Description 5216, and Icon 5218.

Selection of the Visualforce page 5208 refers to a set of programmed instructions for generating a customized user interface. The instructions may be provided in, for example, Javascript®, Java®, Apex™, or any other programming language. Using a customization tool such as Visualforce can allow users to provide instructions that can determine the overall layout and appearance of the user interface, including the publisher, custom action, and the information feed, as well as determine the operations performed by various user interface components.

Figure 53A:
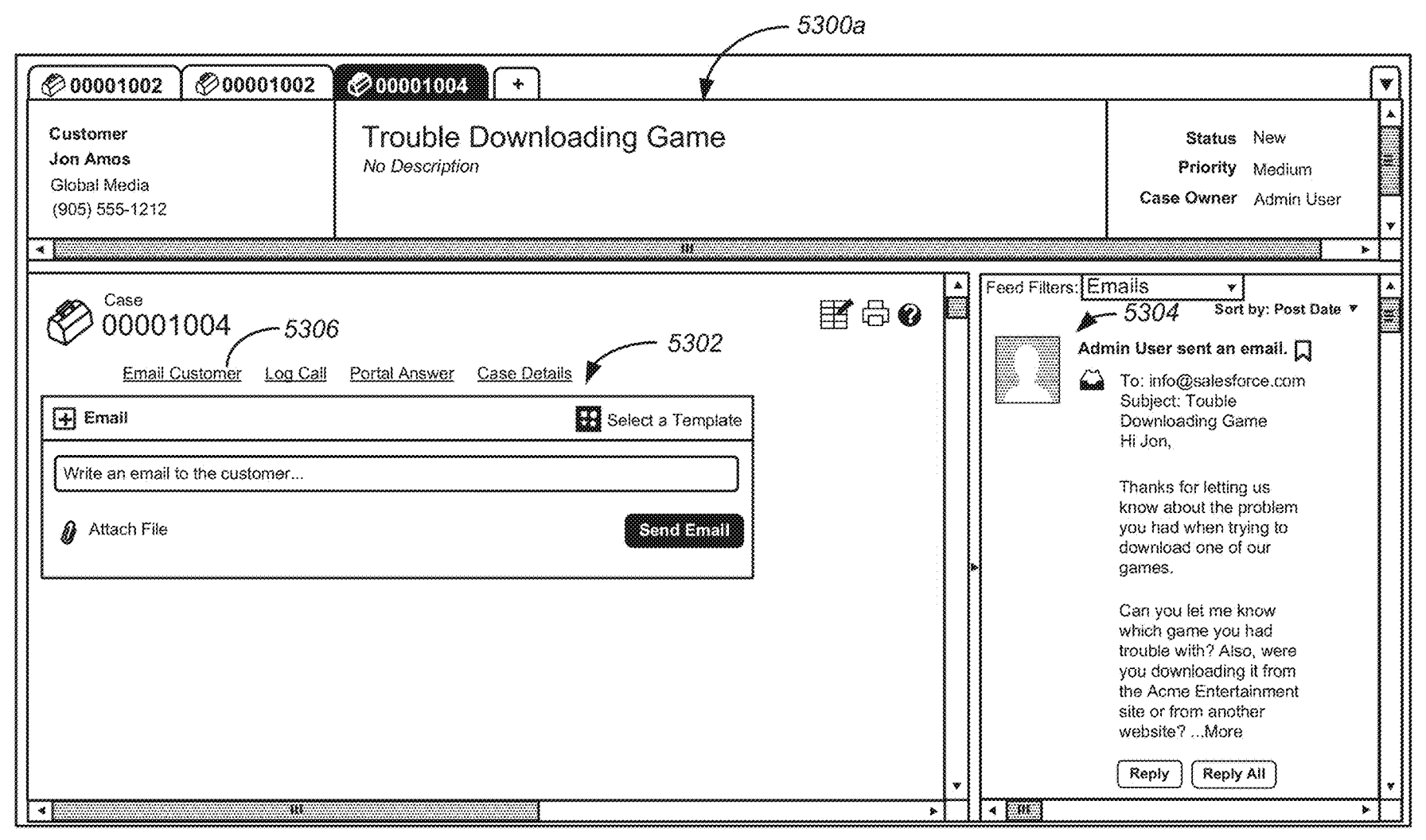

FIG. 53A shows an example of a record with a customized Visualforce page layout 5300a. Visualforce consists of markup language where different tags can represent different user interface components. An example of instructions for creating such a Visualforce page layout 5300a is shown below:

```
<apex:page standardController="Case">
    <!-- Repositions publisher tabs to a horizontal arrangement on top of
    the page -->
    <ul class="demoNav" style="list-style: none; overflow: hidden">
        <li style="float:left"><a id="custom_email_tab"
class="selected"
href="javascript:void(0);"
onclick="getDemoSidebarMenu( ).
selectMenuItem('custom_email_tab');"><span
class="menuItem">Email Customer</span></a></li>
        <li style="float:left"><a id="custom_log_call_tab"
href="javascript:void(0);"
onclick="getDemoSidebarMenu( ).
selectMenuItem('custom_log_call_tab');"><span
class="menuItem">Log Call</span></a></li>
        <li style="float:left"><a id="custom_portal_tab"
href="javascript:void(0);"
onclick="getDemoSidebarMenu( ).
selectMenuItem('custom_portal_tab');"><span
class="menuItem">Portal Answer</span></a></li>
        <li style="float:left"><a id="custom_detail_tab"
href="javascript:void(0);"
onclick="getDemoSidebarMenu( ).
selectMenuItem('custom_detail_tab');"><span
class="menuItem">Case Details</span></a></li>
    </ul>
    <!-- Email publisher -->
    <div id="custom_email_pub_vf">
        <apex:emailPublisher entityId="{!case.id}"
            width="80%"
            emailBodyHeight="10em"
            showAdditionalFields="false"
```

```
        enableQuickText="true"
        toAddresses="{!case.contact.email}"
        toVisibility="readOnly"
        fromAddresses="support@cirrus.com"
        onSubmitSuccess="refreshFeed( );" />
</div>
<!-- Log call publisher -->
<div id="custom_log_call_vf" style="display:none">
    <apex:logCallPublisher entityId="{!case.id}"
        width="80%"
        logCallBodyHeight="10em"
        reRender="demoFeed"
        onSubmitSuccess="refreshFeed( );" />
</div>
<!-- Portal publisher -->
<div id="custom_portal_vf" style="display:none">
    <support:portalPublisher entityId="{!case.id}"
        width="80%"
        answerBodyHeight="10em"
        reRender="demoFeed"
        answerBody="Dear {!Case.Contact.FirstName},\n\nHere is
        the solution to your case.\n\nBest regards,\n\nSupport"
        onSubmitSuccess="refreshFeed( );" />
</div>
<!-- Case detail page -->
<div id="custom_detail_vf" style="display:none">
    <apex:detail inlineEdit="true" relatedList="true"
rerender="demoFeed" />
</div>
<!-- Include library for using service desk console API -->
<apex:includeScript value="/support/console/25.0/integration.js"/>
<!-- Javascript for switching publishers -->
<script type="text/javascript">
    function DemoSidebarMenu( ) {
        var menus = {"custom_email_tab" : "custom_email_pub_vf",
            "custom_log_call_tab" : "custom_log_call_vf",
            "custom_portal_tab" : "custom_portal_vf",
            "custom_detail_tab" : "custom_detail_vf"};
        this.selectMenuItem = function(tabId) {
            for (var index in menus) {
                var tabEl = document.getElementById(index);
                var vfEl = document.getElementById(menus[index]);
                if (index == tabId) {
                    tabEl.className = "selected";
                    vfEl.style.display = "block";
                } else {
                    tabEl.className = "";
                    vfEl.style.display = "none";
                }
            }
        };
    }
    var demoSidebarMenu;
    var getDemoSidebarMenu = function( ) {
        if (!demoSidebarMenu) {
            demoSidebarMenu = new DemoSidebarMenu( );
        }
        return demoSidebarMenu;
    };
</script>
<!-- Javascript for firing event to refresh feed in the sidebar -->
<script type="text/javascript">
    function refreshFeed( ) {
sforce.console.fireEvent('Cirrus.samplePublisherVFPage.
RefreshFeedEvent', null, null);
    }
</script>
</apex:page>
```

As shown in the example in FIG. 53A, the user interface for the Visualforce page layout 5300a can include a publisher 5302 and an information feed 5304. The user can customize the publisher 5302 to be able to be an email publisher, a call log publisher, and a portal answer publisher. In other words, the publisher 5302 may include custom actions 5306 configured to email a customer, to log a call, and to answer inquiries through a web portal. The layout and dimensions of the publisher 5302 and other frames in the page layout 5300a hosting components such as the information feed 5304 may be defined in the custom action instructions according to the first entity's preferences.

Figure 53B:
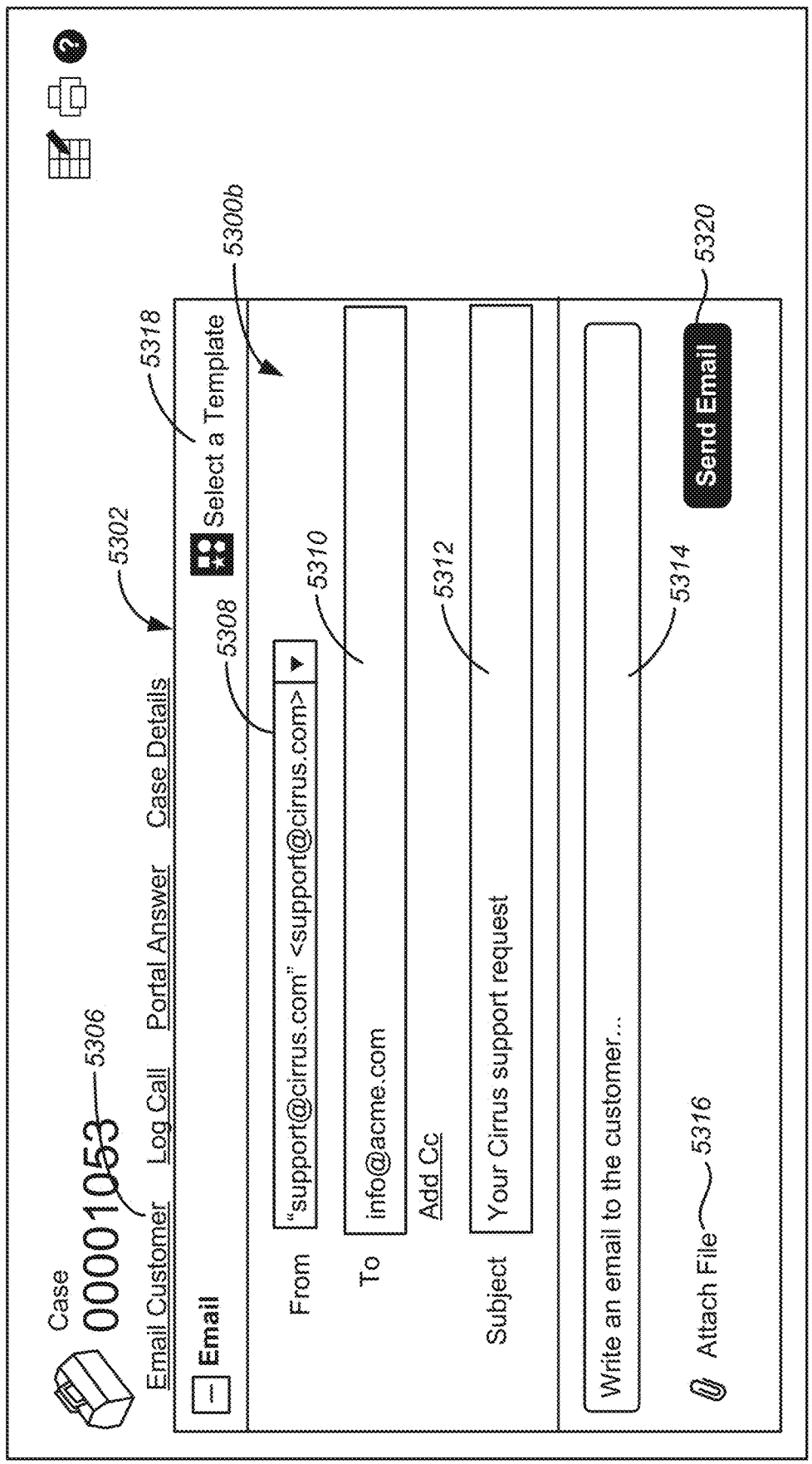
FIG. 53B shows an example of a publisher with a customized Visualforce action layout.

FIG. 53B shows an example of a publisher 5302 with a customized Visualforce action layout 5300b. A user can define the publisher 5302 as an email publisher configured to send email to specified recipients and publish the email messages to an information feed. The user can programmatically define the data fields in the publisher 5302. When a user selects a publisher action 5306 for Email Customer, the publisher 5302 is caused to display data fields including the sender field 5308, the recipient field 5310, the subject field 5312, and the message field 5314. Visibility and default values in each of the data fields may be established programmatically. Thus, a user or organization may customize the publisher 5302 to increase standardization of data submitted via the publisher 5302. The publisher 5302 may also include the ability to attach files via an attachment button 5316, to select a template via a template button 5318, and to send the email via the send button 5320.

In some implementations, the user interface that is displayed may depend on contextual factors, including the access permissions of the entity, the type of record, the type of page, the type of display device, etc. For example, what data fields are displayed, what publisher actions are available, and the layout of the user interface components can depend on the type of entity that is navigating the user interface.

The user interface may be defined by custom action instructions either declaratively utilizing an API, such as one provided by salesforce.com, or programmatically utilizing a customization tool such as Visualforce, which may be provided with its own API and set of pre-defined instructions. Users with less technical skills may develop user interfaces declaratively, while users or organizations with more complex data management needs may prefer a customization tool in customizing user interfaces.

Returning to FIG. 18, at block 1808, a request to expose an application is received using the publisher. The request to expose the application may be received in response to a user selecting a button, link, tab, or menu selection in the publisher via the user's smartphone, desktop, laptop, tablet, or other mobile computing device. The application can be exposed within a publisher space, and interactions can be performed on the application through the publisher space via the API. The application can be integrated with the API provided by a database service provider, such as salesforce.com.

In some implementations, the application is hosted natively in the on-demand service environment. In some implementations, the application is hosted on a third-party platform. The third-party platform may include one or more database systems outside of the on-demand service environment. The application can be hosted on a platform service, including but not limited to site.com™, Heroku™, force.com®, and AppExchange®.

While the actual code for running the application may be hosted on the third-party platform, the application is configured to communicate with the API provided in the on-demand service environment. This API may enable integration of an application, such as a third-party application, into the on-demand service environment. For example, the API may consist of a set of tools and Javascript APIs that enables integration with the third-party application into the on-demand service environment. The Javascript APIs provide a communication bridge so that the third-party application can communicate with a browser page.

At block 1812, content from the application is exposed in the publisher via the API. The content from the application may be exposed in a standard user interface or customized user interface, such as a Visualforce page. In some implementations, exposing the content in the publisher includes retrieving the content from a database system, and presenting the content for display in a publisher space in the publisher. In some instances, the database system can be stored outside of the on-demand service environment.

Content as exposed in the publisher space can originate from any number of data sources. In some implementations, such data sources can include analytics, external data sources, feeds, and direct events, among other data sources. For example, the exposed content can be a video stream provided from a videoconferencing service. In another example, the exposed content can be a map provided from a web mapping service application. The publisher space provides a frame or window by which the content can be viewed in the user interface, and the content from the data source can interface with the API to communicate with the browser page.

Figure 54:
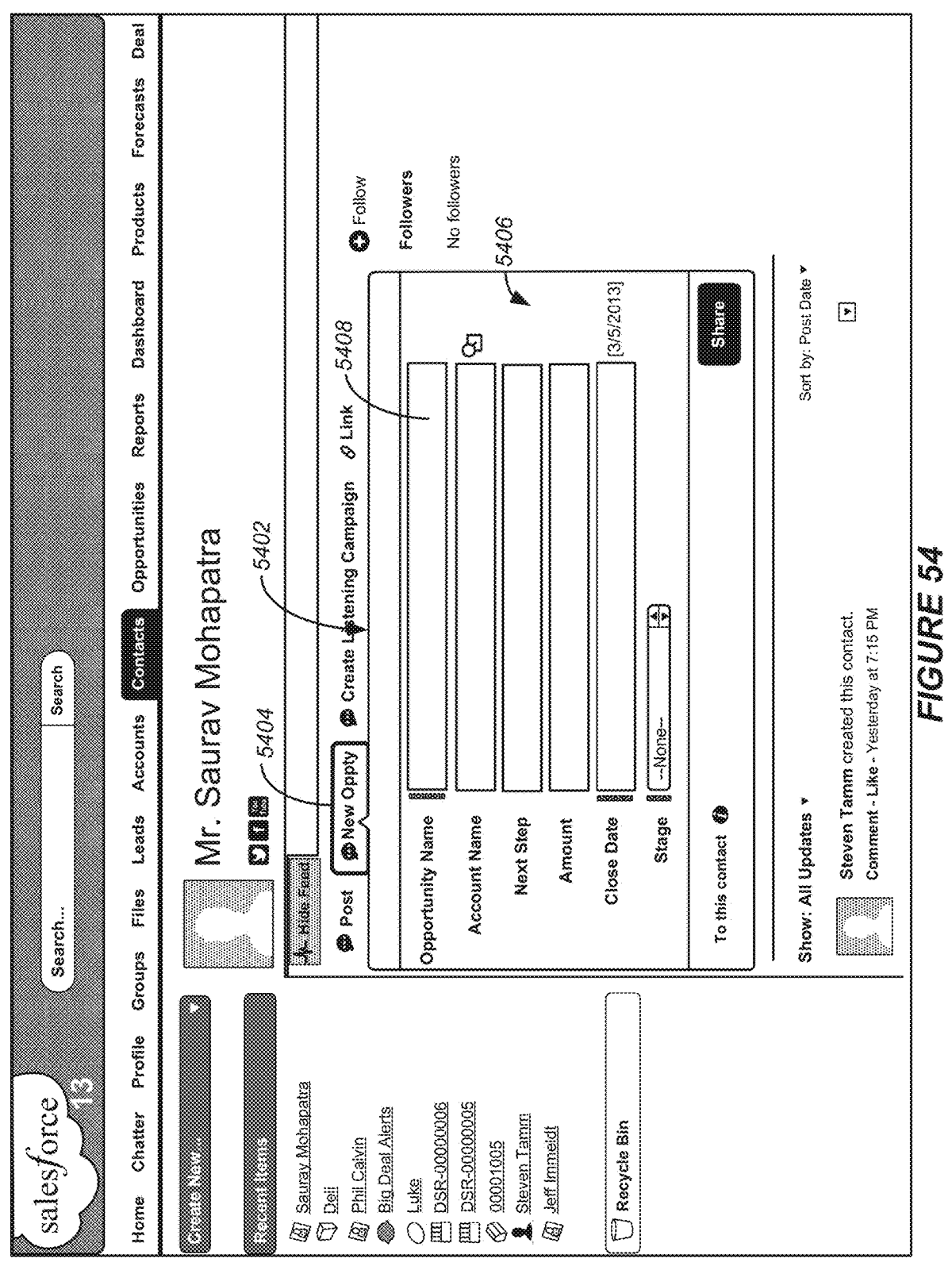

FIG. 54 shows an example of a user interface with a publisher exposing data fields for a custom action hosted natively in an on-demand service environment, according to some implementations. The publisher 5402 may include a custom action 5404 that is configured to interact with a record. The custom action 5404 may be configured to interact with the record according to custom action instructions provided by a first entity in ways that are described earlier in Section IX. The custom action 5404 can be an API-enabled action that can interface with the API and cause the API to display data fields 5408 associated with the record. The custom action 5404 causes the publisher 5402 to expose content in the publisher space 5406, where the content can consist of data fields 5408 associated with the record. Here, a user can select the custom action 5404 for a New Oppty to cause the publisher 5402 to expose data fields 5408 for creating a new opportunity. The data fields can include Opportunity Name, Account Name, Next Step, Amount, Close Date, and Stage. The API may interface with one or more database systems in the on-demand service environment. In the example in FIG. 54, the API may not communicate with external or third-party database systems.

Figure 55:
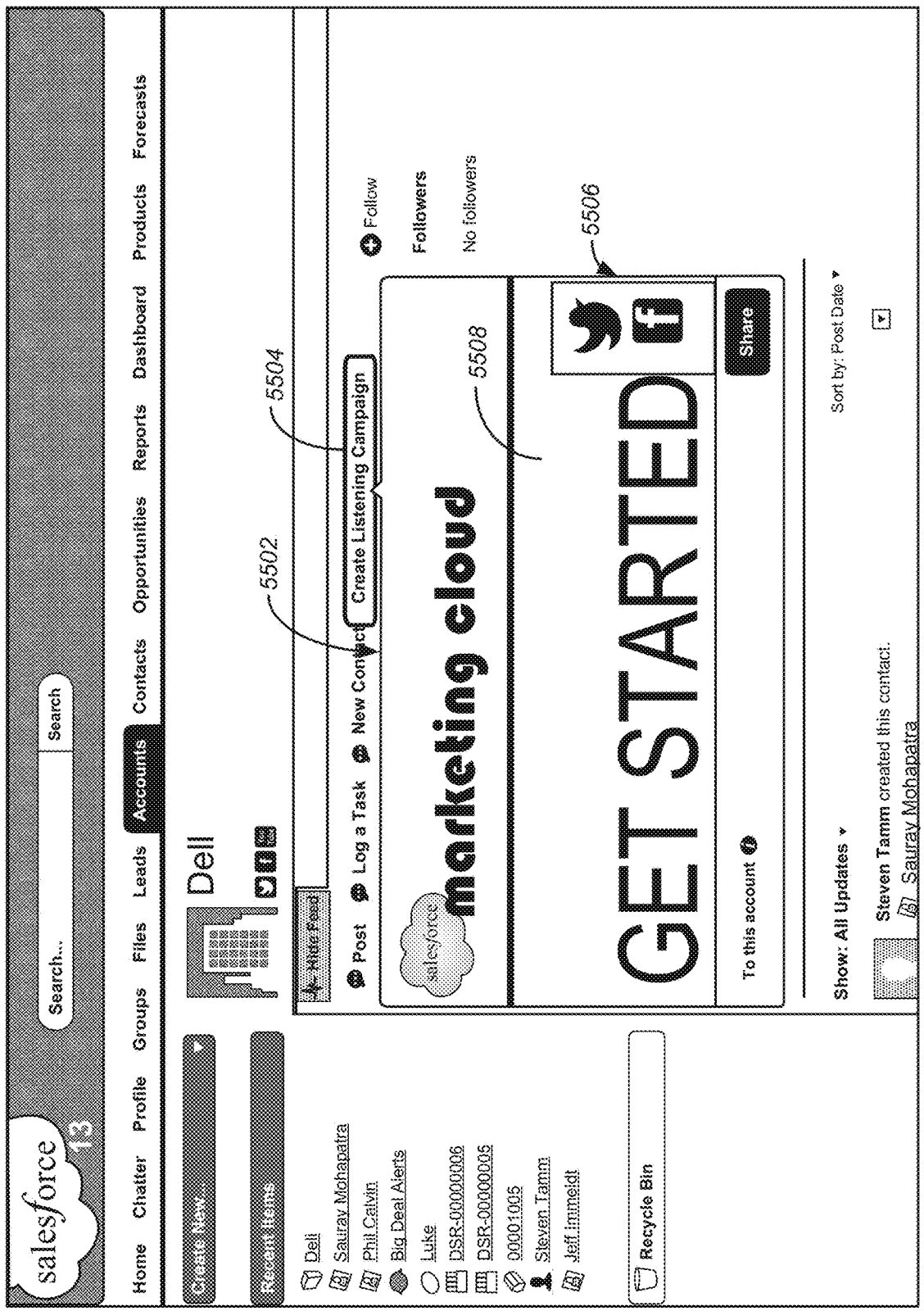
FIG. 55 shows an example of a user interface with a publisher exposing content from a web page hosted outside of an on-demand service environment, according to some implementations.

FIG. 55 shows an example of a user interface with a publisher 5502 exposing content from a web page 5508 hosted outside of an on-demand service environment, according to some implementations. The publisher 5502 may include a custom action 5504 that is configured to expose content hosted externally. Examples of such content can include articles, blogs, chat rooms, web pages, feeds from other online social networks, etc. The custom action 5504 is an API-enabled action that can interface with the API and cause the API to display content from an external data source. As shown in FIG. 55, the custom action 5504 can cause the publisher 5502 to display a web page 5508 in a publisher space 5506, where web page 5508 can include web-based application services. Even though the web page 5508 is hosted outside of the on-demand service environment, a user can interact directly with the web page 5508 through the API. In the example in FIG. 55, when a user selects the custom action 5504 for Create Listening Campaign, the publisher 5502 exposes the web page 5508 that the user can interact with to create a listening campaign.

Figure 56A:
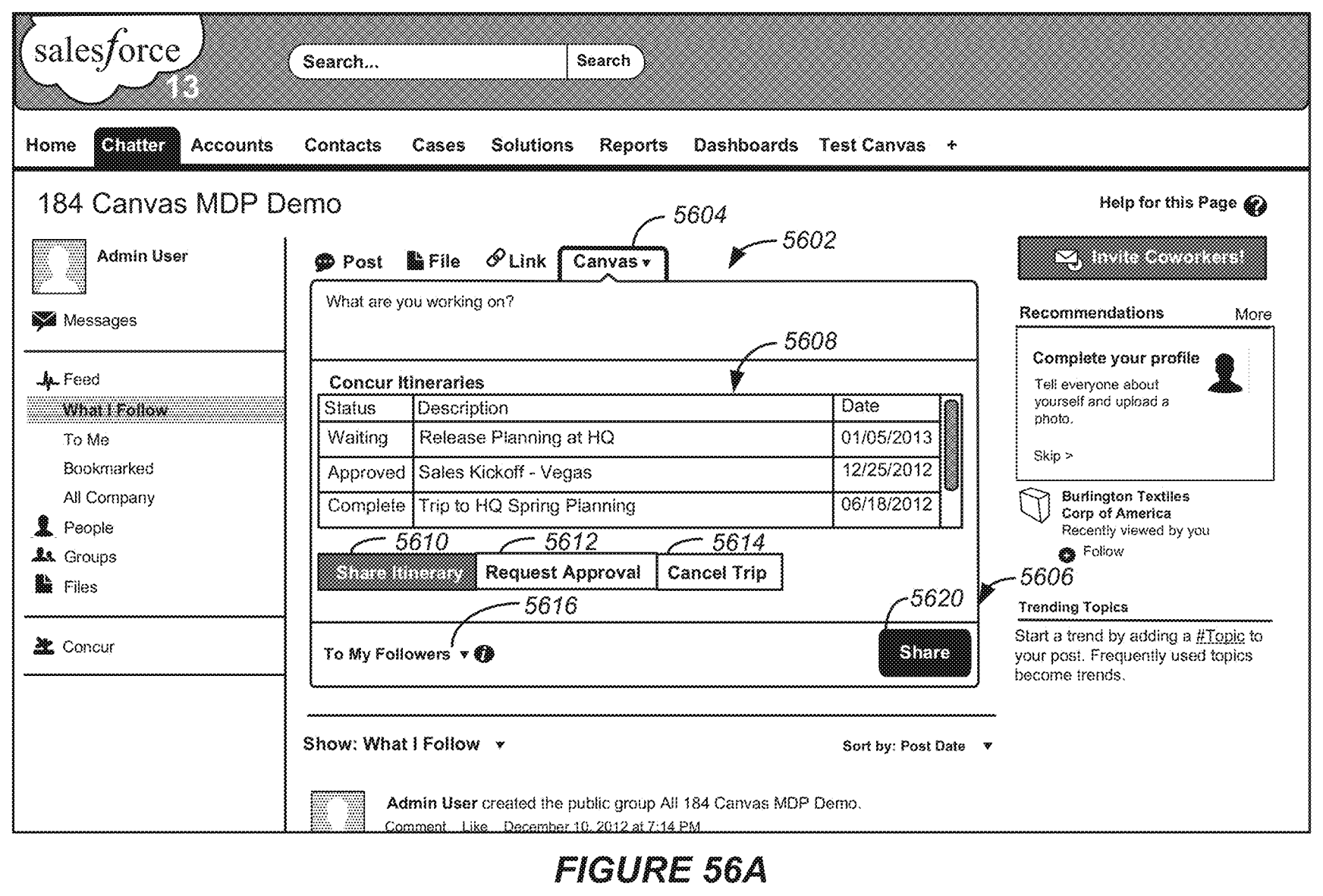

FIG. 56A shows an example of a user interface with a publisher exposing content from an application hosted on a third-party platform, according to some implementations. The publisher 5602 may include a custom action 5604 that is configured to interact with the application hosted on the third-party platform. The custom action 5604 is an API-enabled action that can interface with the API and cause the API to expose content from the application hosted on the third-party platform in a publisher space 5606. In some instances, exposure of the application in the publisher space 5606 may be performed using the custom action 5604 force.com® Canvas application. The Canvas application serves as an iFrame or a window for displaying the content from the application. The application may be hosted on a third-party platform, such as Heroku™. As illustrated in FIG. 56A, the application may be a travel service that is configured to display a list of itineraries 5608. Other services that can be exposed in the publisher 5602 can include but is not limited to CRM services, customer services, task management services, web services, social marketing services, performance management services, and data repository services, among others.

Returning to FIG. 18, at block 1816, a user input is received regarding the exposed content to interact with the application. The user input may be transmitted to one or more computing devices performing the method 1800, for instance, as a signal network 14 in FIGS. 1A and 1B. In some instances, the user input can include selection or entry of information for transmission to one or more computing devices.

From a user interface, a user can communicate with an application, such as a third-party application, via the API. In FIG. 56A, the user can select from a list of itineraries 5608 in the publisher space 5606 and perform a number of actions. For example, the user can share an itinerary listed in the publisher space 5606 by selection of the Share Itinerary button 5610. This can post the itinerary as a feed item into one or more feeds. As another example, the user can request approval for the itinerary from another entity by selection of the Request Approval button 5612. Thus, the user can initiate an approval workflow and post the itinerary as a feed item for approval in a specified entity's feed. The specified entity, such as the user's manager, can interact with the feed item by approving or denying the request. In another example, the user can cancel one of the itineraries by selection of the Cancel Trip button 5614. The user can identify the feeds of the entities to which the information will be published by selection of entities in a dropdown menu 5616. Furthermore, the user can publish the information to appropriate feeds by selection of a Share button 5618. Therefore, a user can take content off platform and manage it using the custom action 5604 and the API.

Returning to FIG. 18, at block 1820, the interaction with the application is performed using the user input via the API. When the interaction is initiated by the user input, the application directly interfaces with the API to implement updates with the application. Even if the application is hosted on a third-party platform, the application directly interfaces with the API to implement updates with the hosting page. In some implementations, the performed interaction occurs within the browser page of the user interface. For example, the application can be a mortgage calculator exposed in the publisher where the interaction outputs directly into the publisher space. In some implementations, the performed interaction does not occur with the browser page of the user interface. Instead, the performed interaction occurs with the API and the third-party application that avoids opening or refreshing a page in the browser. In other words, the browser page is unaware of the updates made to the application hosted on the third-party platform. In some instances, one or more database systems may be updated according to the performed interaction.

At block 1824, the information feed is updated via the API in the user interface according to the performed interaction with the application. The information feed directly interfaces with the API to update information in the information feed. As the API communicates with the application, the API links back information from the application to the browser page. Such information is rendered in the information feed of the user interface via the API. In some implementations, the information feed is updated without refreshing the user interface. In fact, each of the steps performed in the method 1800 may occur without refreshing the user interface. For example, updating the information feed can involve updating one or more data fields in the information feed based on the user input by "toggling" changes to the one or more data fields. Therefore, the API can enable interactions between a user and an exposed application, such as an application hosted on a third-party platform, such that updates occur seamlessly between a publisher and an information feed in a user interface.

Figure 56B:
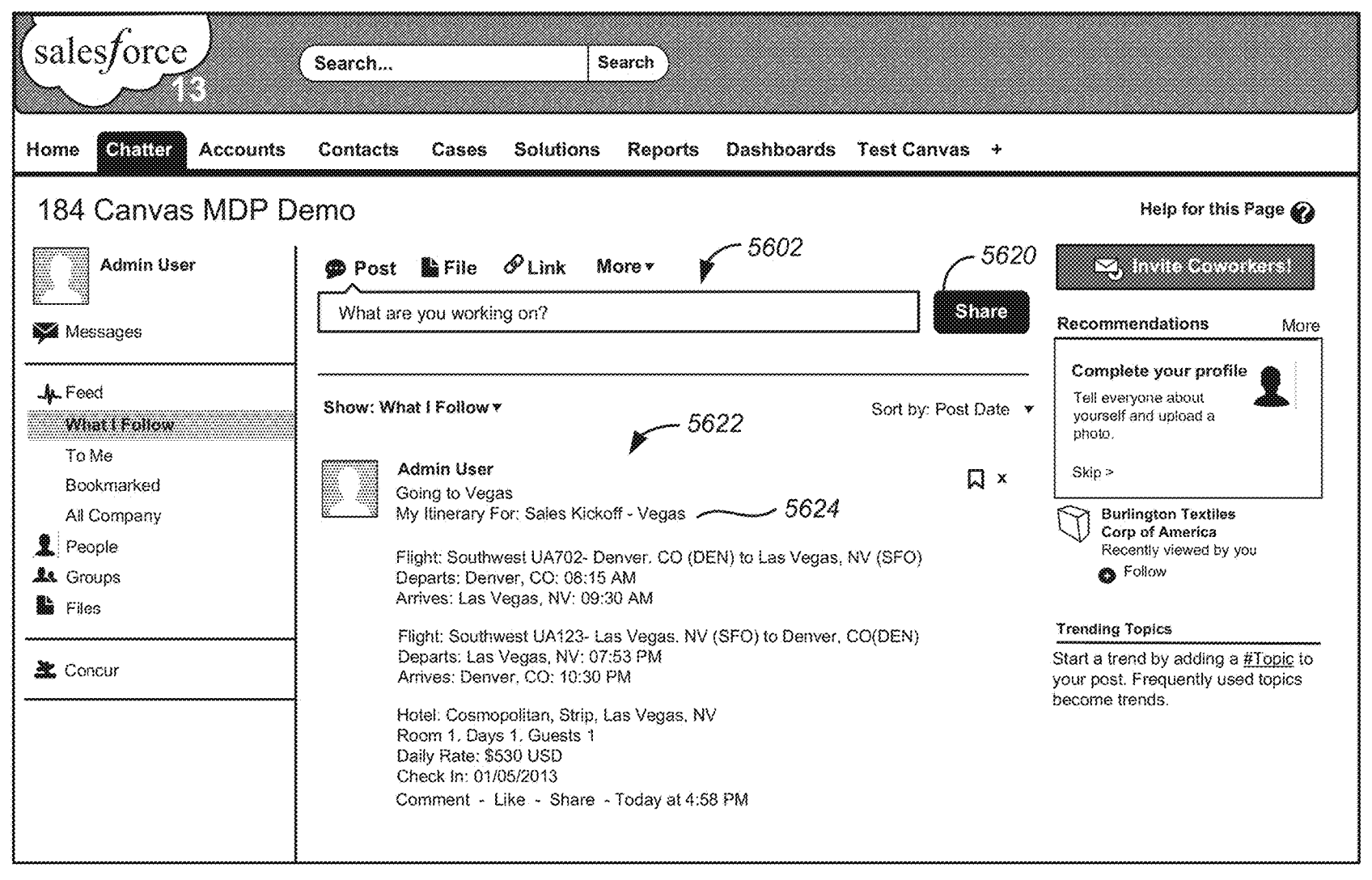

FIG. 56B shows an example of a user interface with a feed item 5624 displaying information based on a user input regarding content from the application hosted on the third-party platform in FIG. 56A, according to some implementations. In response to the user input, the API can communicate with the application and retrieve information from one or more database systems in the third-party platform. The information can be rendered into the feed item 5624 in an information feed 5622 via the API. The application calls the API, which in turn updates the information feed 5622 to present the feed item 5624 for inclusion in the information feed 5622. After selecting the Share Itinerary button 5610 in FIG. 56A, the user selects the Share button 5620 to post the feed item 5624 with the selected itinerary. Information in the feed item 5624 as retrieved from the application can include more data than the exposed content in FIG. 56A.

Figure 56C:
FIG. 56C shows an example of a user interface with a feed item displaying approval controls based on a user input regarding content from the application hosted on the third-party platform in FIG. 56A, according to some implementations.

In some implementations, the feed item can include one or more actionable selections providing a reference to the application. The one or more actionable selections may perform further operations on the application from the feed item. FIG. 56C shows an example of a user interface with a feed item 5628 displaying approval controls 5630 based on a user input regarding content from the application hosted on the third-party platform in FIG. 56A, according to some implementations. In response to a user input requesting approval for a selected itinerary in FIG. 56A, information regarding the selected itinerary can be rendered into the feed item 5628 in the information feed 5626 via the API. The information can be retrieved from one or more database systems in the third-party platform. The feed item 5628 can further include approval controls 5630, where an appropriate entity can approve or deny the selected itinerary. In some implementations, the approval controls 5630 may be rendered in the information feeds of entities specified by the user or information feeds of entities based on the user's profile and/or preferences. Selection of one of the approval controls 5630 may further update the information feed 5626 as well as the application hosted on the third-party platform.

While at least some of the sequence of steps for the method 1800 may be illustrated in FIGS. 56A-56C, other examples may also be illustrative of the sequence of steps for the method 1800. By way of example, a user interface can include a publisher and an information feed where the publisher includes a custom action for initiating a videoconference with a customer. The customer can use a video recording device and have a real-time conversation with the user through the publisher space of the publisher. Moreover, the user can perform an action on the exposed data stream by saving the videoconference from the publisher, and the saved video can be published to the information feed.

In another example, a user interface can include a publisher and an information feed where the publisher includes a custom action for placing an order with an SAP system. One or more items can be exposed from the SAP system in the publisher, and a user can select an item for placing an order. The user can select a button for placing the order, which can then communicate with the SAP system via the API. The API then allows the custom action to communicate with the information feed to publish a feed item showing that an order for the item has been placed.

In yet another example, a pharmaceutical company can develop a customized user interface for sales agents to sell free drug samples to doctors. When a sales agent pulls up an account for a particular doctor in the user interface, the sales agent can view the doctor's account and input new orders into the publisher. The sales agent can communicate with an application, such as a third-party application, to fulfill the order request, and a feed item can be posted in an information feed indicating the placement of the order request.

In yet another example, a gaming company can develop a customized user interface to submit a mass email to customers. If a flood of cases come in at a rapid rate regarding a bug in a video game, the gaming company can utilize a publisher to communicate with a mass email web service such as VerticalResponse Inc. or Constant Contact®, Inc. The gaming company can import or select all the recipients, compose the email, and submit the email through the mass email web service. Upon completion, an information feed can be updated by presenting a feed item indicating that an email was sent out.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A system comprising:
a database system implemented using a server system, the database system configurable to cause:
defining a messaging program associated with a web service using one or more commands, the one or more commands defining an action and/or a search;
providing the messaging program to a client to allow users to interact with the web service;
obtaining an instruction to interact with an external system by searching the external system or initiating one or more actions in the external system, the external system being a third-party system outside of the database system;
triggering, for completing a task in the external system, the one or more actions in the external system, the task including one or more items to be performed at least in part by one or more users;
sharing one or more results associated with completing the task in the external system with a conversation associated with the messaging program;
adding a poll to a channel or a chat associated with the messaging program, the poll linked through the database system with the one or more results associated with completing the task in the external system; and
adding question and answer options associated with the poll.

2. The system of claim 1, wherein the instruction is obtained through a compose message area, a command box, or directly from a message.

3. The system of claim 1, wherein the interaction with the external system includes reserving a resource, and the one or more results includes a day and/or a time of the reservation.

4. The system of claim 1, wherein the interaction with the external system includes completing a task using the external system.

5. The system of claim 1, wherein the interaction with the external system includes creating a bug in a tracking system based on a message and assigning the bug to a person, and the one or more results include bug details.

6. The system of claim 1, the one or more actions in the external system being configurable to cause one or more database records to be created or updated.

7. The system of claim 6, the one or more database records including a customer relationship management (CRM) object, the CRM object including one or more of: a lead, a case, an account, an opportunity, a task, a contact, a campaign, a contract, an event, a custom object, or a page.

8. A computer program product comprising a non-transitory computer-readable medium storing computer-readable program code capable of being executed by one or more processors, the program code comprising instructions configurable to cause:
defining a messaging program associated with a web service using one or more commands, the one or more commands defining an action and/or a search;
providing the messaging program to a client to allow users to interact with the web service;
obtaining an instruction to interact with an external system by searching the external system or initiating one or more actions in the external system, the external system being a third-party system outside of a database system;
triggering, for completing a task in the external system, the one or more actions in the external system, the task including one or more items to be performed at least in part by one or more users;
sharing one or more results associated with completing the task in the external system with a conversation associated with the messaging program;
adding a poll to a channel or a chat associated with the messaging program, the poll linked through the database system with the one or more results associated with completing the task in the external system; and
adding question and answer options associated with the poll.

9. The computer program product of claim 8, wherein the instruction is obtained through a compose message area, a command box, or directly from a message.

10. The computer program product of claim 8, wherein the interaction with the external system includes reserving a resource, and the one or more results includes a day and/or a time of the reservation.

11. The computer program product of claim 8, wherein the interaction with the external system includes completing a task using the external system.

12. The computer program product of claim 8, wherein the interaction with the external system includes creating a bug in a tracking system based on a message and assigning the bug to a person, and the one or more results include bug details.

13. The computer program product of claim 8, the one or more actions in the external system being configurable to cause one or more database records to be created or updated.

14. The computer program product of claim 13, the one or more database records including a customer relationship management (CRM) object, the CRM object including one or more of: a lead, a case, an account, an opportunity, a task, a contact, a campaign, a contract, an event, a custom object, or a page.

15. A computer-implemented method comprising:
defining a messaging program associated with a web service using one or more commands, the one or more commands defining an action and/or a search;
providing the messaging program to a client to allow users to interact with the web service;
obtaining an instruction to interact with an external system by searching the external system or initiating one or more actions in the external system, the external system being a third-party system outside of a database system;

triggering, for completing a task in the external system, the one or more actions in the external system, the task including one or more items to be performed at least in part by one or more users;

sharing one or more results associated with completing the task in the external system with a conversation associated with the messaging program;

adding a poll to a channel or a chat associated with the messaging program, the poll linked through the database system with the one or more results associated with completing the task in the external system; and adding question and answer options associated with the poll.

16. The method of claim 15, wherein the instruction is obtained through a compose message area, a command box, or directly from a message.

17. The method of claim 15, wherein the interaction with the external system includes reserving a resource, and the one or more results includes a day and/or a time of the reservation.

18. The method of claim 15, wherein the interaction with the external system includes completing a task using the external system.

19. The method of claim 15, wherein the interaction with the external system includes creating a bug in a tracking system based on a message and assigning the bug to a person, and the one or more results include bug details.

20. The method of claim 15, the one or more actions in the external system being configurable to cause one or more database records to be created or updated.

* * * * *